(12) United States Patent
Rolus Borgward

(10) Patent No.: US 8,072,423 B2
(45) Date of Patent: Dec. 6, 2011

(54) INPUT DEVICE FOR PORTABLE DIGITAL COMPUTERS AND PORTABLE DIGITAL COMPUTER WITH A MULTI-FUNCTIONAL MOUSE

(75) Inventor: Glenn Rolus Borgward, Munich (DE)

(73) Assignee: Brands & Products IPR Holding GmbH & Co. KG, Munich (DE)

( * ) Notice: Subject to any disclaimer, the term of this patent is extended or adjusted under 35 U.S.C. 154(b) by 979 days.

(21) Appl. No.: 10/563,741

(22) PCT Filed: Jul. 8, 2004

(86) PCT No.: PCT/EP2004/007514
§ 371 (c)(1),
(2), (4) Date: Jan. 9, 2006

(87) PCT Pub. No.: WO2005/006170
PCT Pub. Date: Feb. 20, 2005

(65) Prior Publication Data
US 2006/0152484 A1 Jul. 13, 2006

(30) Foreign Application Priority Data
Jul. 8, 2003 (DE) .................................. 103 30 773

(51) Int. Cl.
*G06F 3/033* (2006.01)
*G09G 5/00* (2006.01)
(52) U.S. Cl. ..... 345/157; 345/163; 345/173; 361/679.4; 361/679.02
(58) Field of Classification Search .......... 345/156–178; 361/679, 679.4, 679.02
See application file for complete search history.

(56) References Cited

U.S. PATENT DOCUMENTS
5,049,863 A 9/1991 Oka
(Continued)

FOREIGN PATENT DOCUMENTS
JP 9319483 A 12/1997
(Continued)

*Primary Examiner* — Amr Awad
*Assistant Examiner* — Randal Willis
(74) *Attorney, Agent, or Firm* — Roberts Mlotkowski Safran & Cole, P.C.; David S. Safran

(57) ABSTRACT

The invention relates to a portable digital Computer with an in-built coupling device which is arranged in order to receive mouse Signals from a radio mouse provided with a battery and fed by said battery. Said digital Computer comprises an in-built current source and an electric interface which is installed in a fixed manner and which is connected to the current source, the electric interface being arranged such that the battery can be charged. The invention also relates to an input device for a portable digital Computer comprising a radio mouse and an additional slide pad which is arranged on the top side of said radio mouse. The invention further relates to a special coupling bay comprising a recess which is a notebook. Said coupling bay is used for mechanically coupling a Cursor control device which is disposed below a notebook keyboard and in order to reconfigure the Cursor control device in a rear-sided Operation in order to use a notebook in a book-type and handheld form, whereby a flat mouse with annular-shaped finger Supports is provided in order to improve the handling and Operation thereof, in addition to a Cursor control device which is provided with an identification and locking function. Additionally, a notebook is disclosed, comprising a decoupling Cursor control device and a keyboard which can be decoupled. A desktop PC can be configured by means of a configuration via a hinge foldable functional part of a notebook.

32 Claims, 39 Drawing Sheets

U.S. PATENT DOCUMENTS

| | | | |
|---|---|---|---|
| 5,805,144 | A | 9/1998 | Scholder et al. |
| 5,914,703 | A * | 6/1999 | Herng-Chuen ............... 345/157 |
| 6,035,350 | A | 3/2000 | Swamy et al. |
| 6,104,317 | A | 8/2000 | Panagrossi |
| 6,107,990 | A * | 8/2000 | Fleming, III ................ 345/157 |
| 6,166,722 | A * | 12/2000 | Kawabe et al. ............... 345/169 |
| 6,219,037 | B1 * | 4/2001 | Lee ................................ 345/167 |
| 6,424,335 | B1 | 7/2002 | Kim et al. |
| 2003/0021086 | A1 * | 1/2003 | Landry et al. ................. 361/683 |
| 2004/0196265 | A1 * | 10/2004 | Nohr ............................ 345/169 |
| 2004/0263484 | A1 * | 12/2004 | Mantysalo et al. ........... 345/173 |

FOREIGN PATENT DOCUMENTS

| | | |
|---|---|---|
| JP | 10-97377 A | 4/1998 |
| WO | 99 15982 A1 | 4/1999 |
| WO | 01 73673 A2 | 10/2001 |
| WO | 02 27460 A1 | 4/2002 |

* cited by examiner

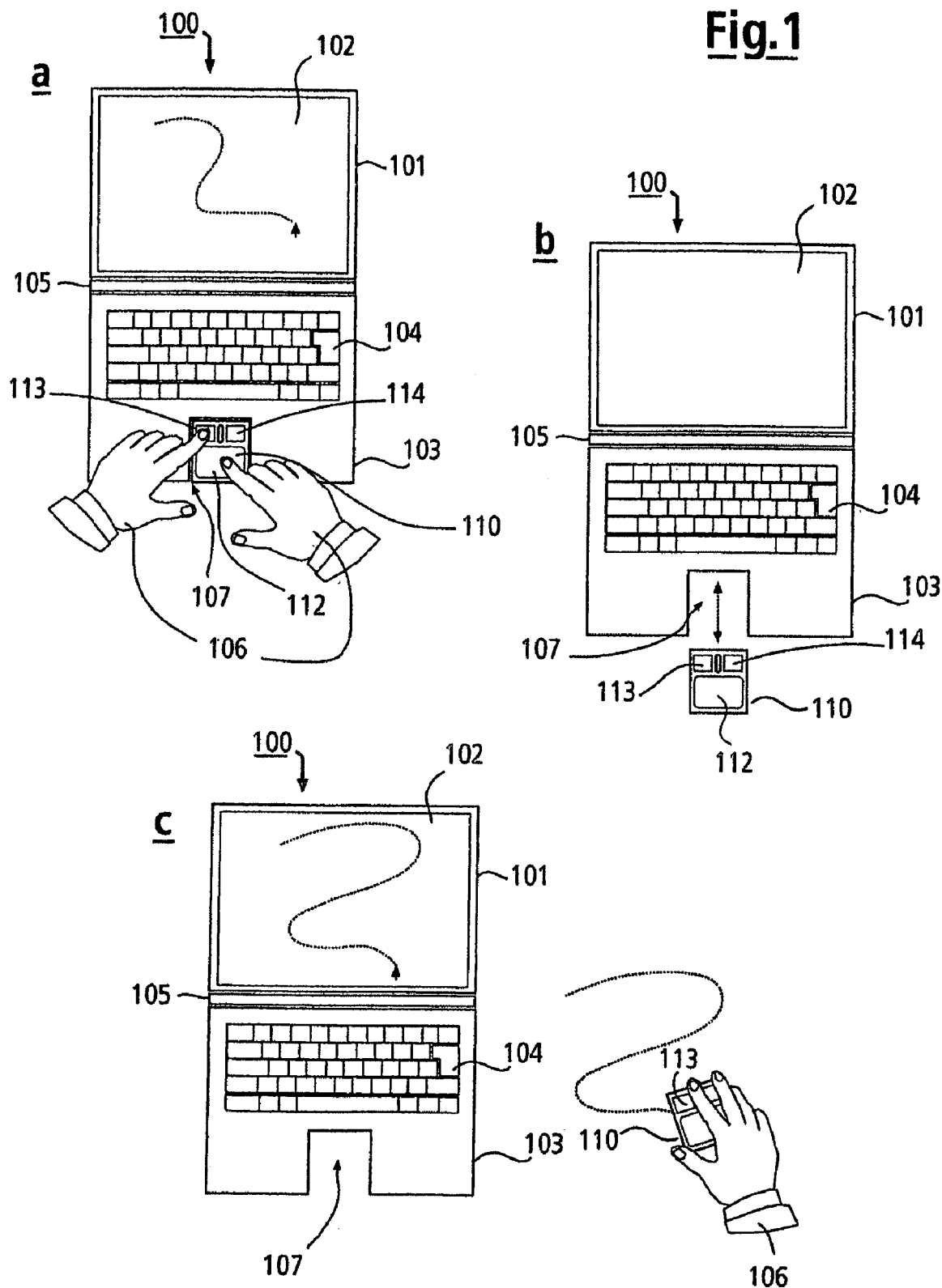

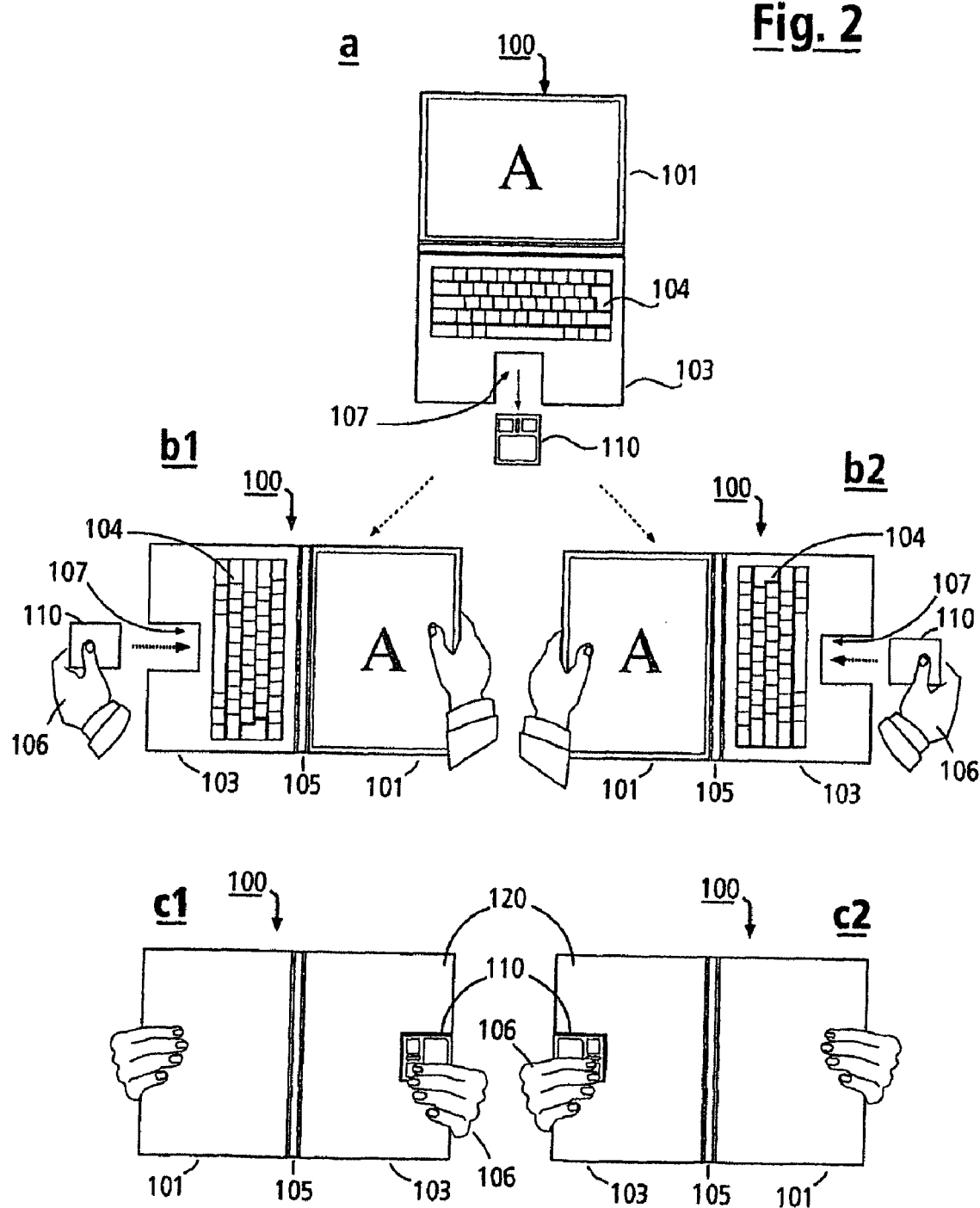

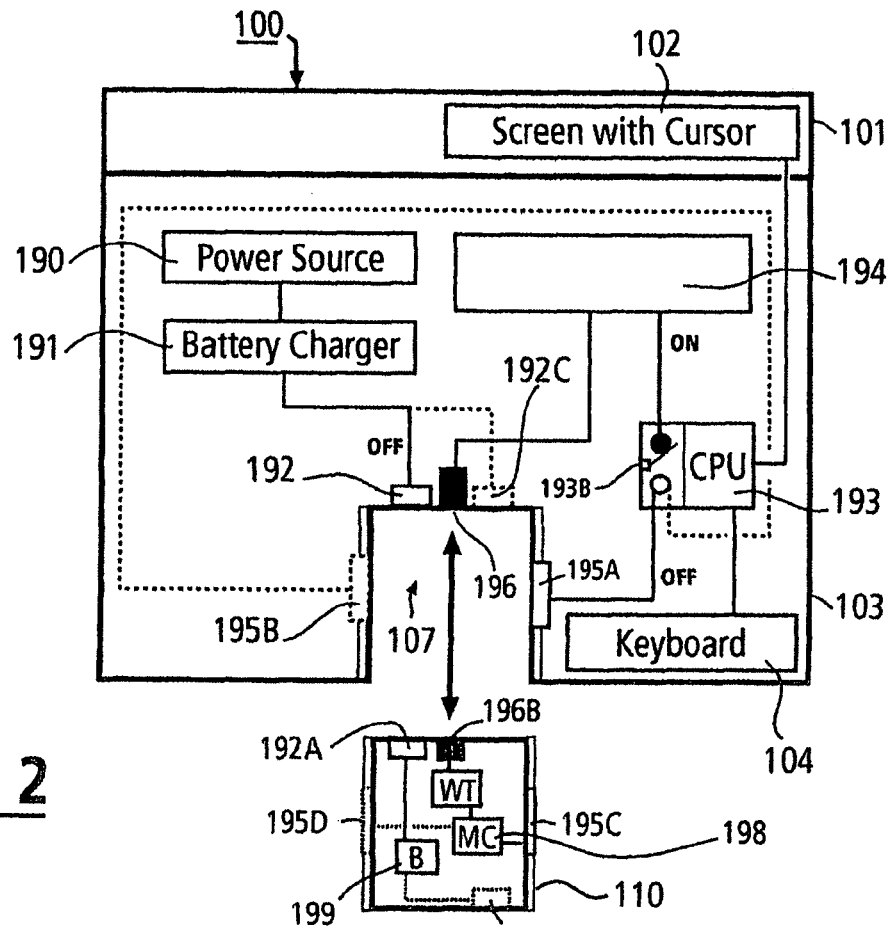
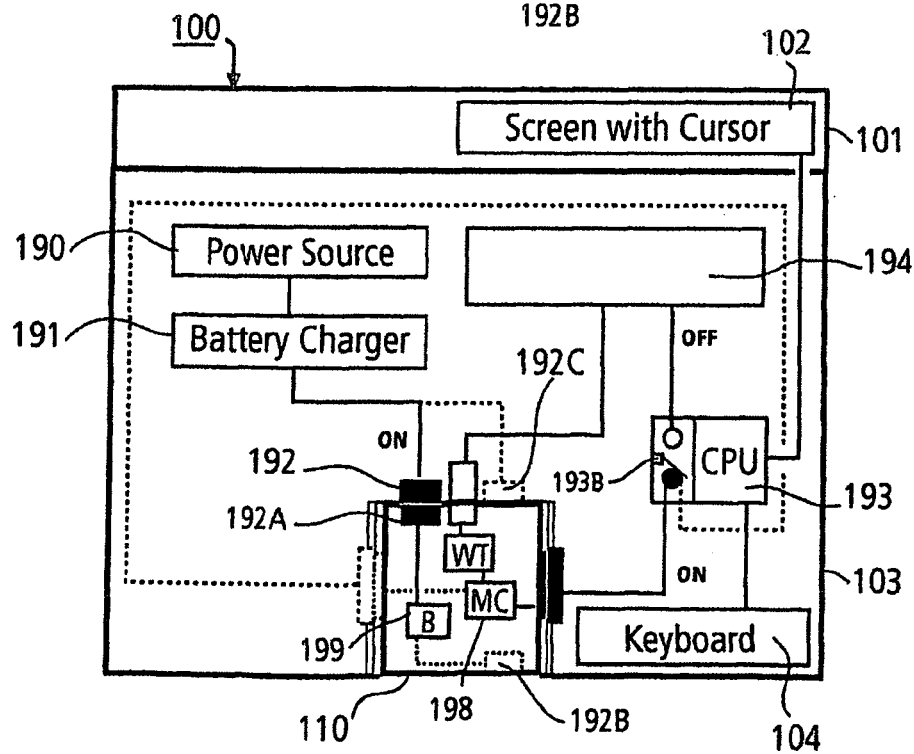
Fig. 2

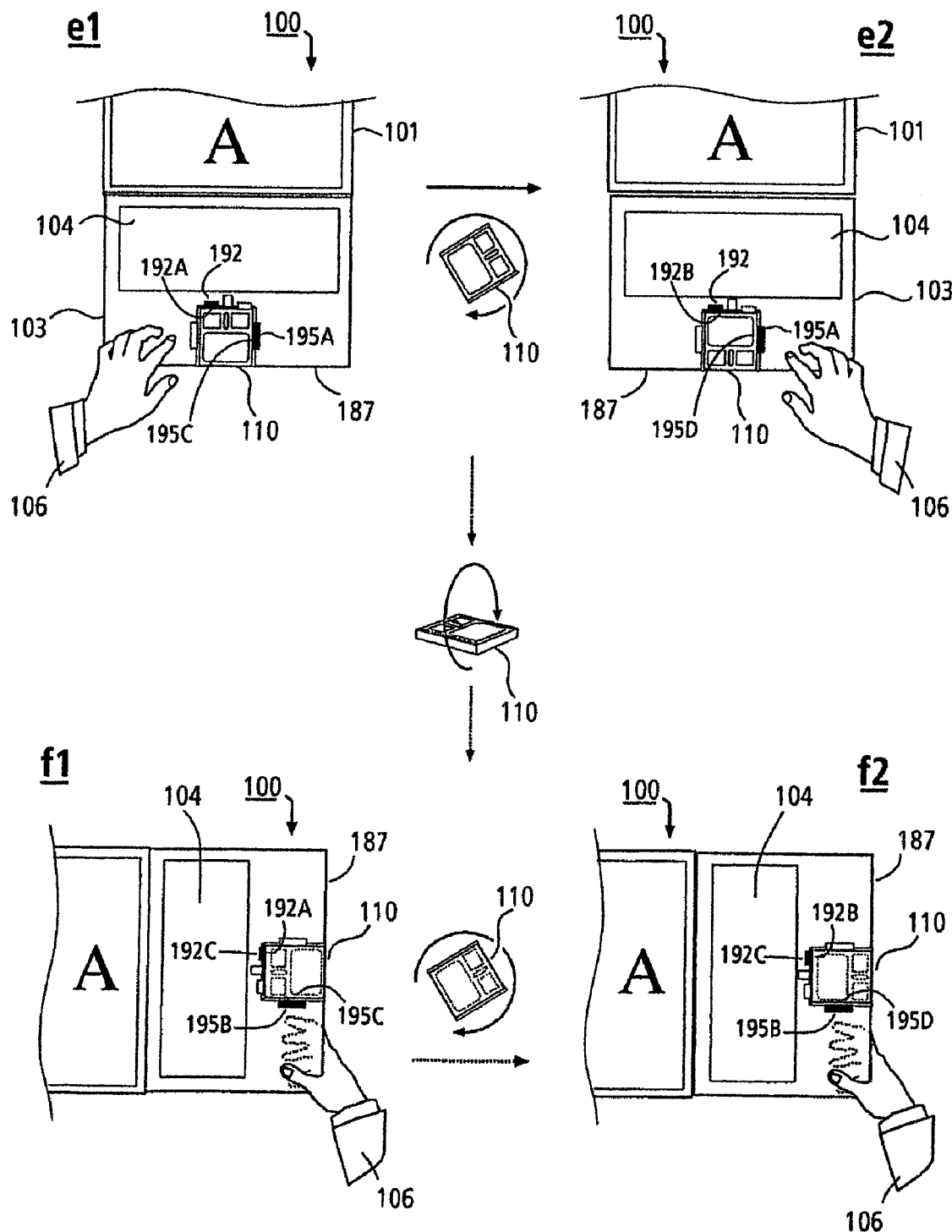

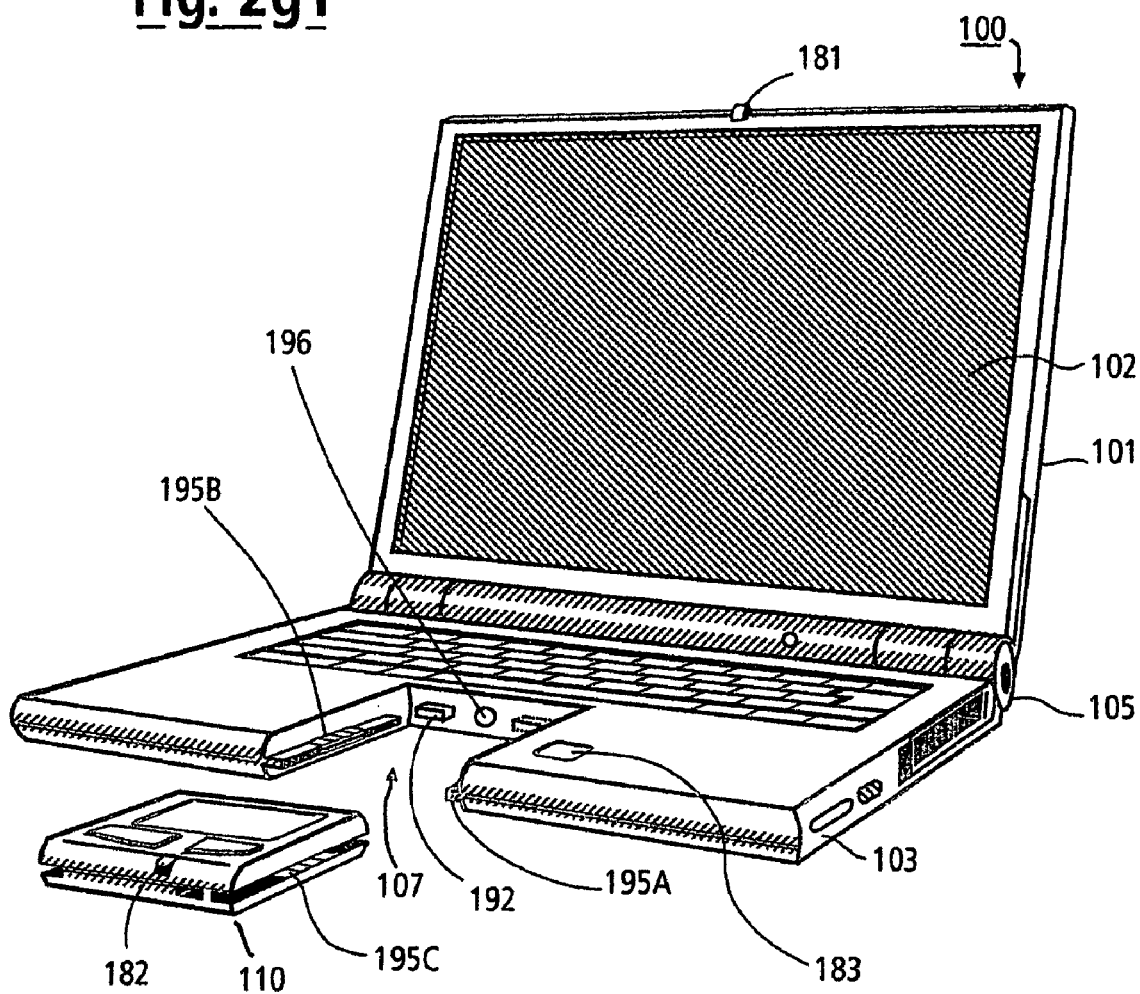

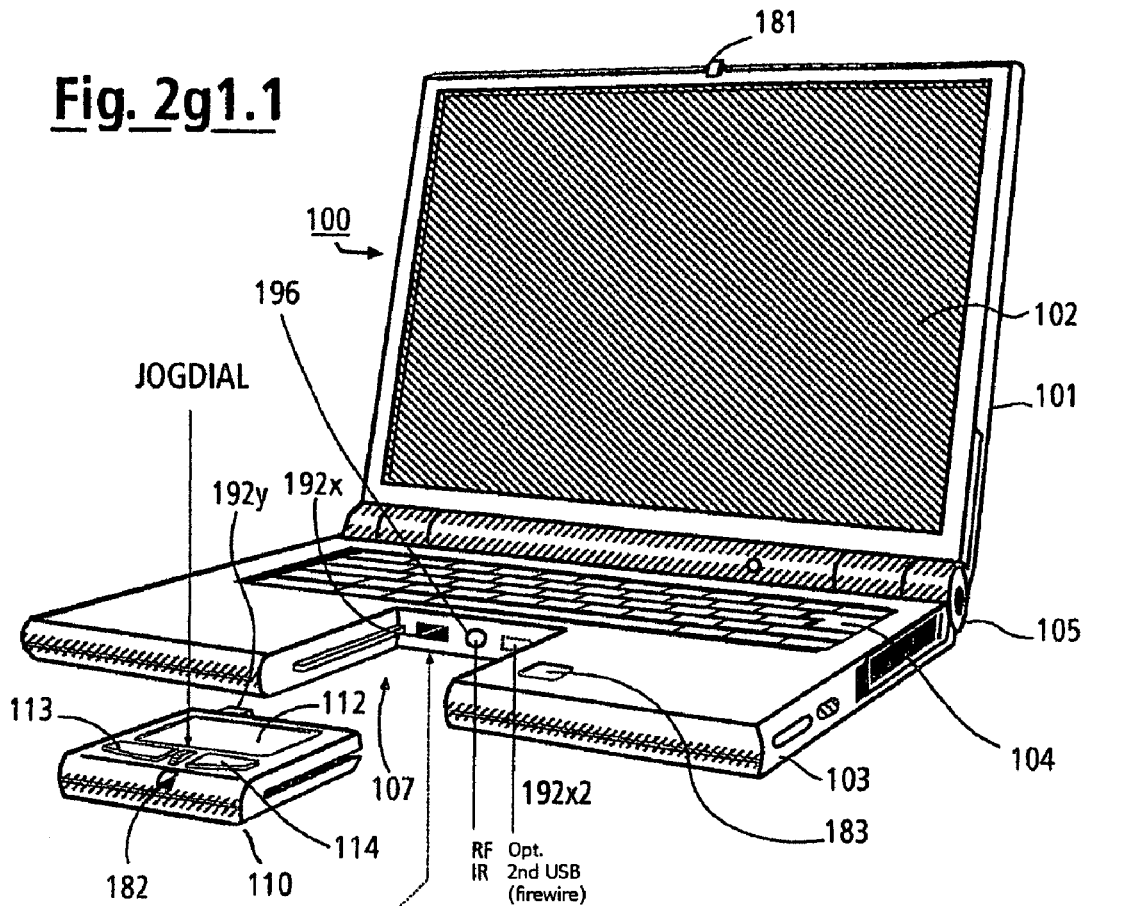
Fig. 2g1.1
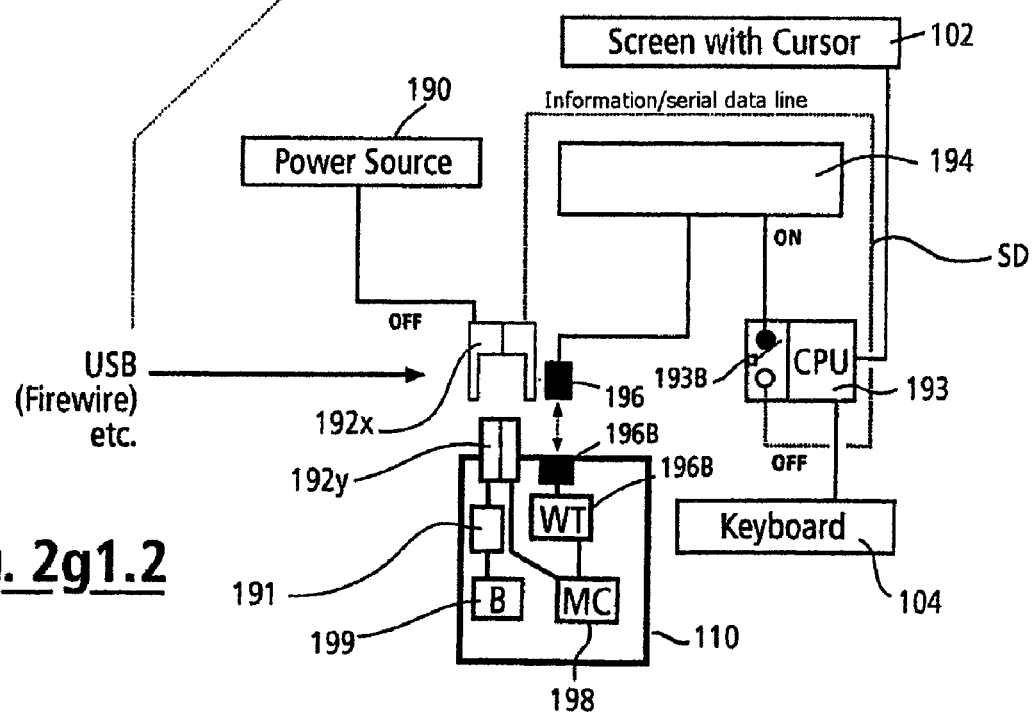
Fig. 2g1.2

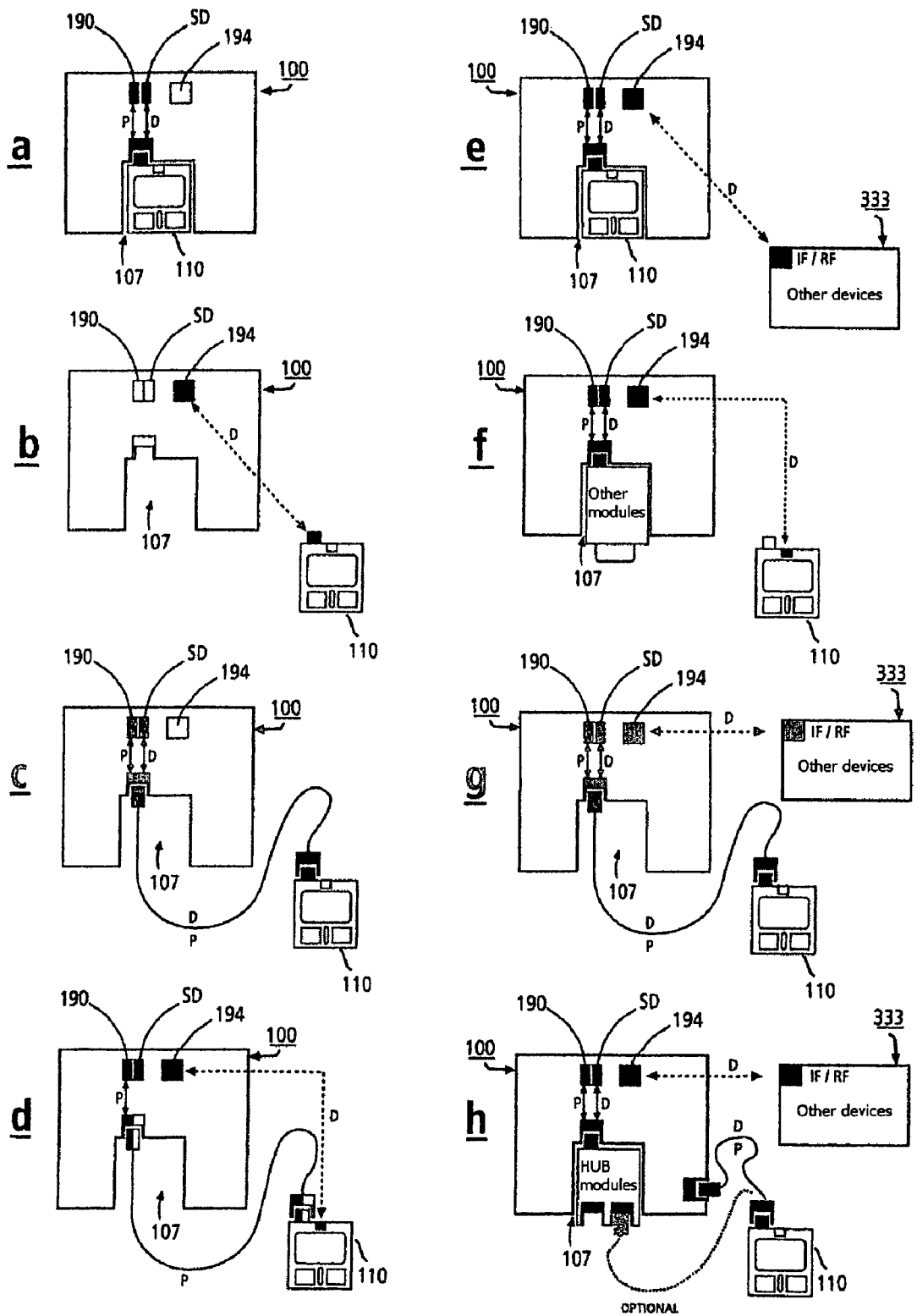
Fig. 2g1.3

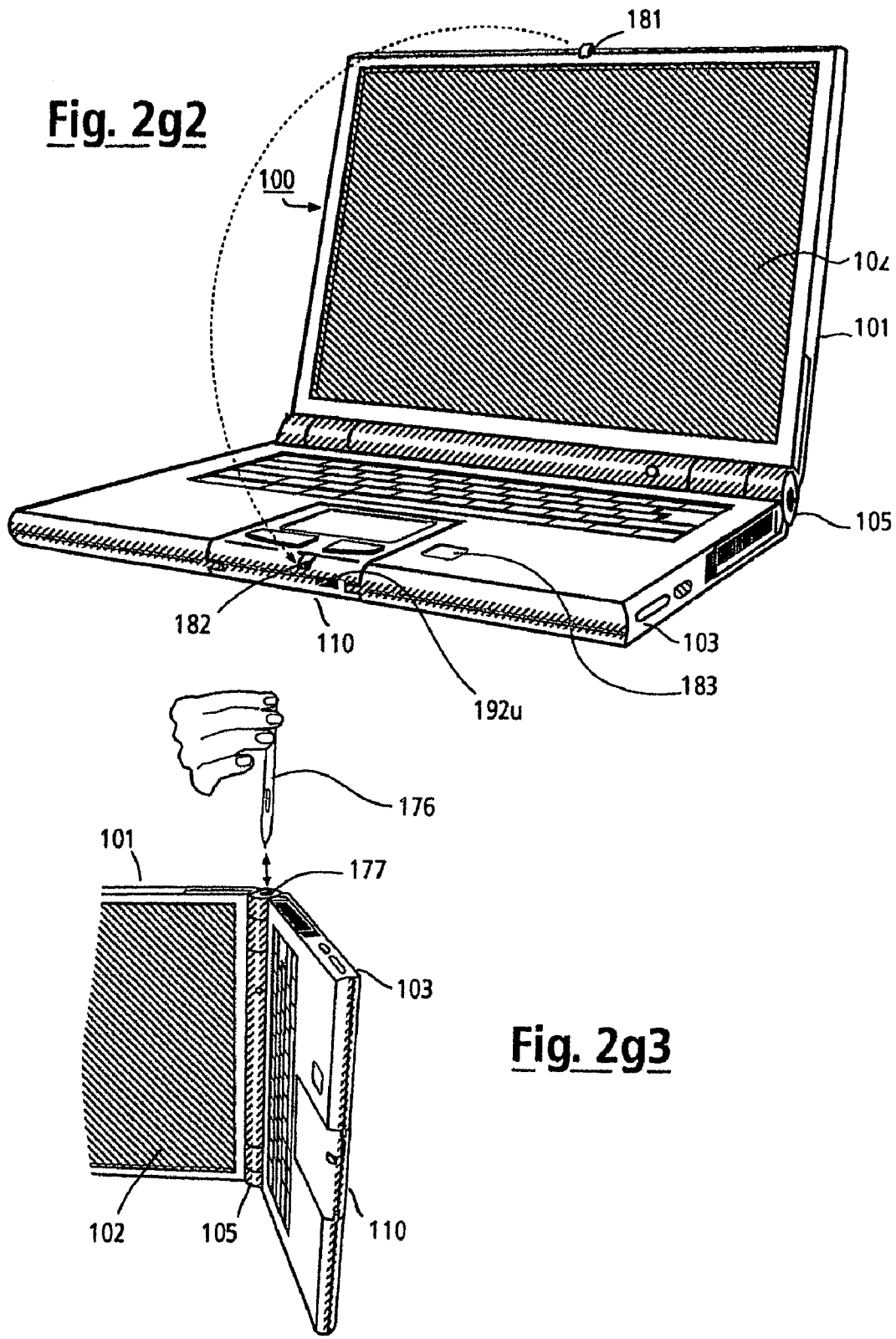

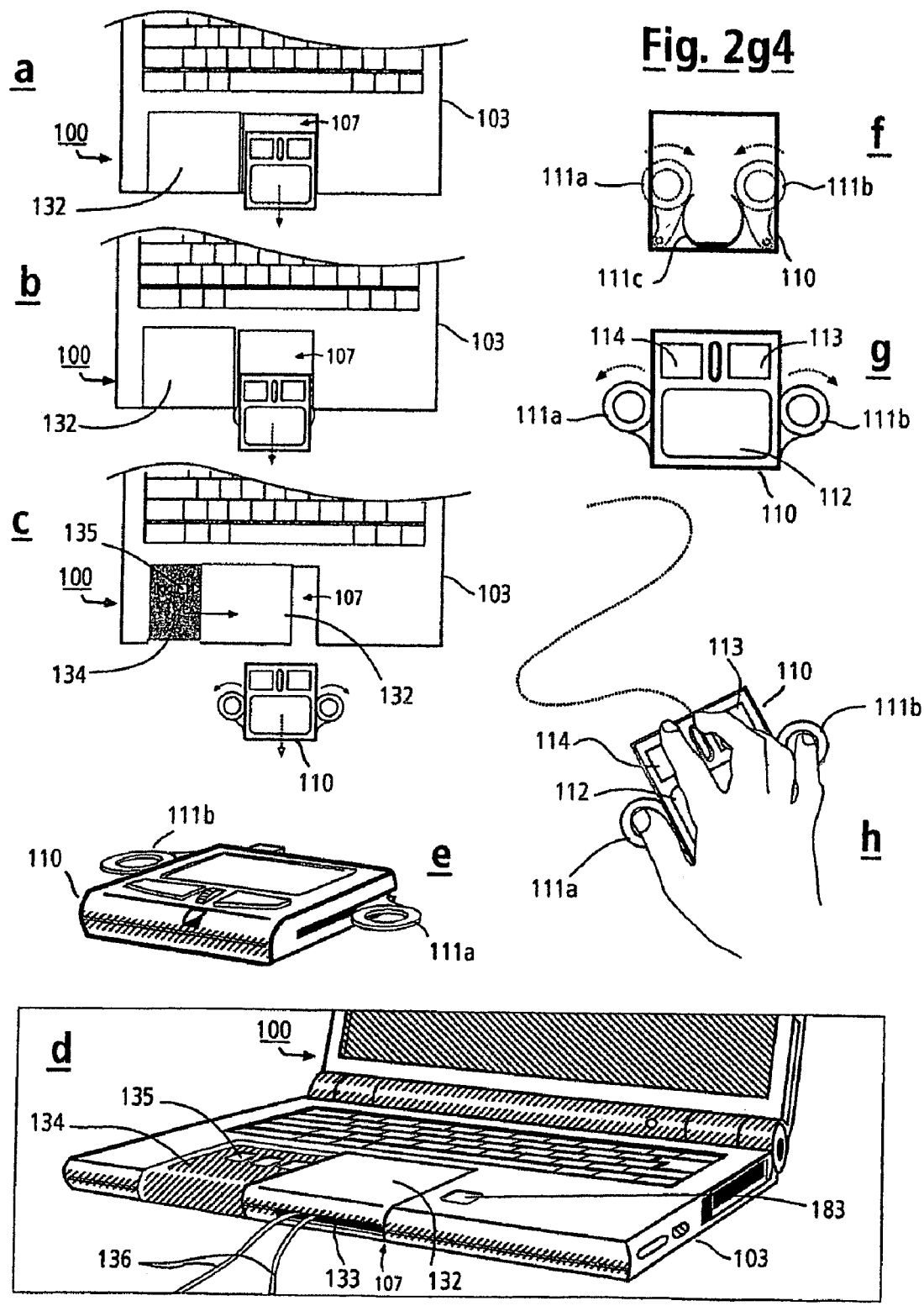

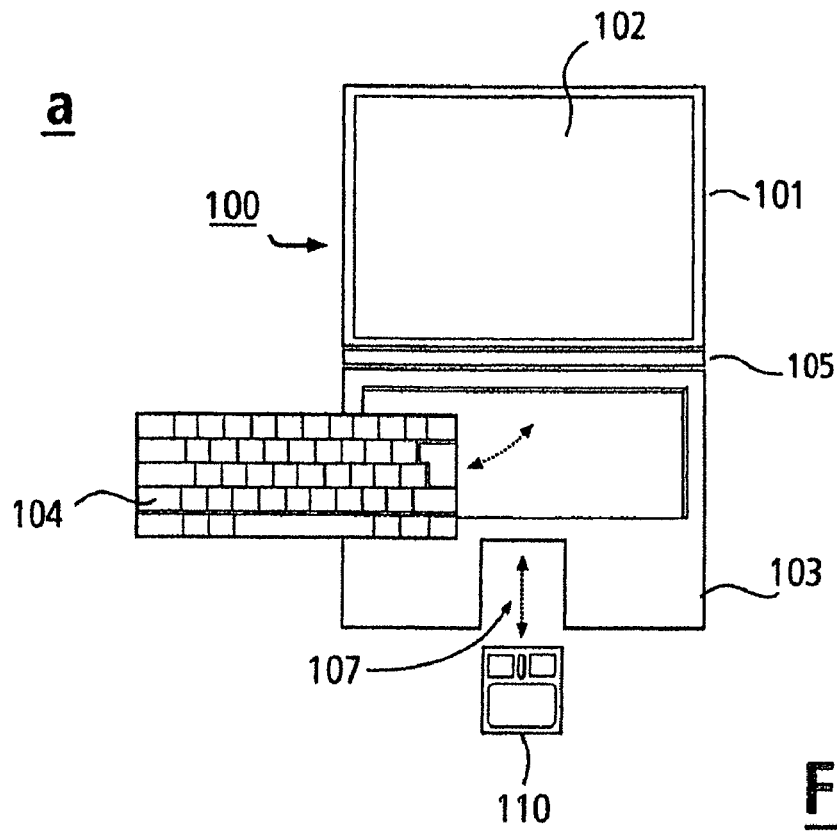
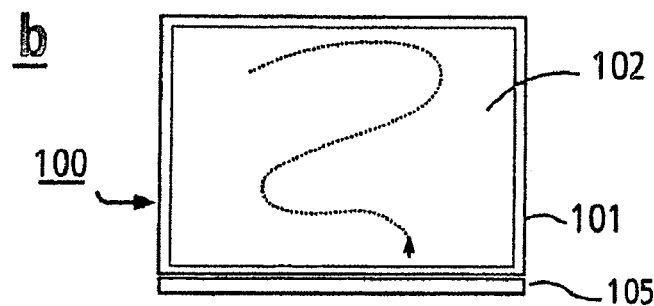
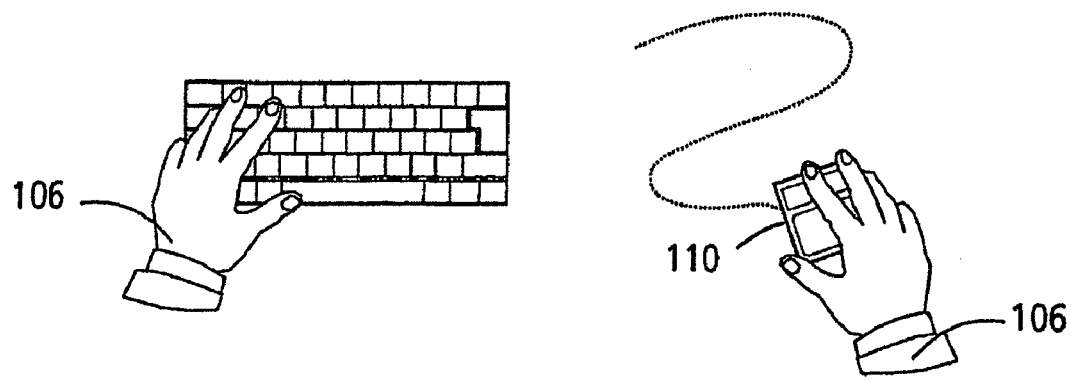
Fig. 12

Fig.14
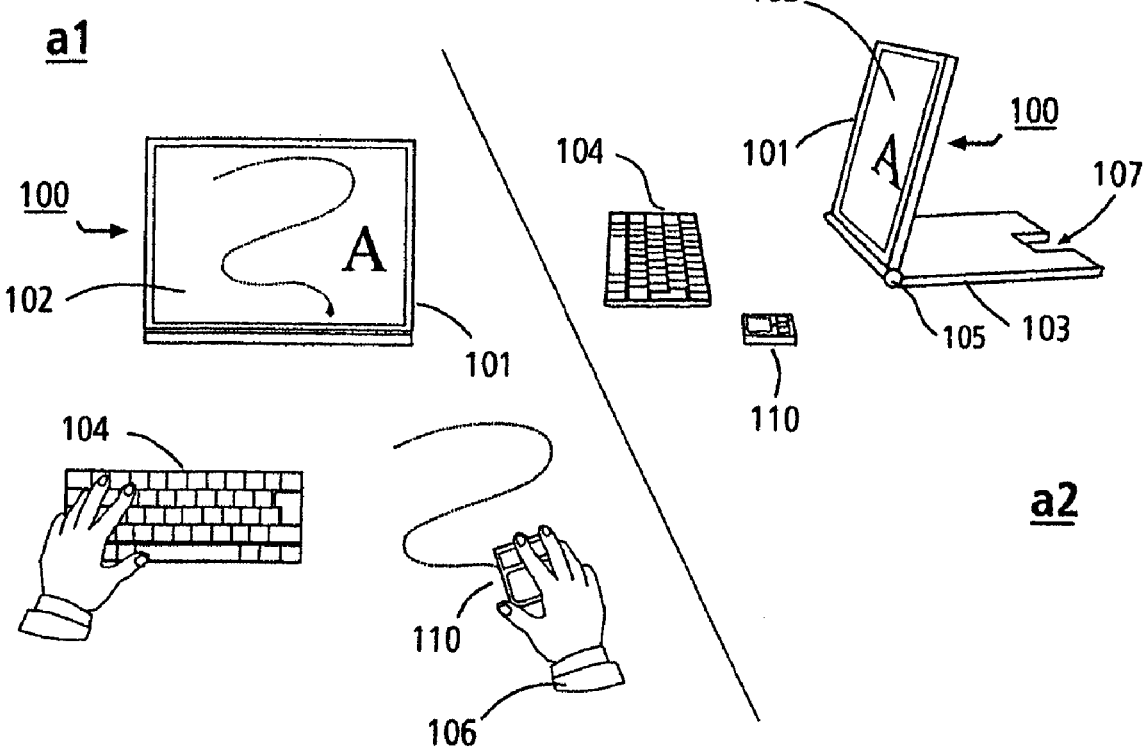
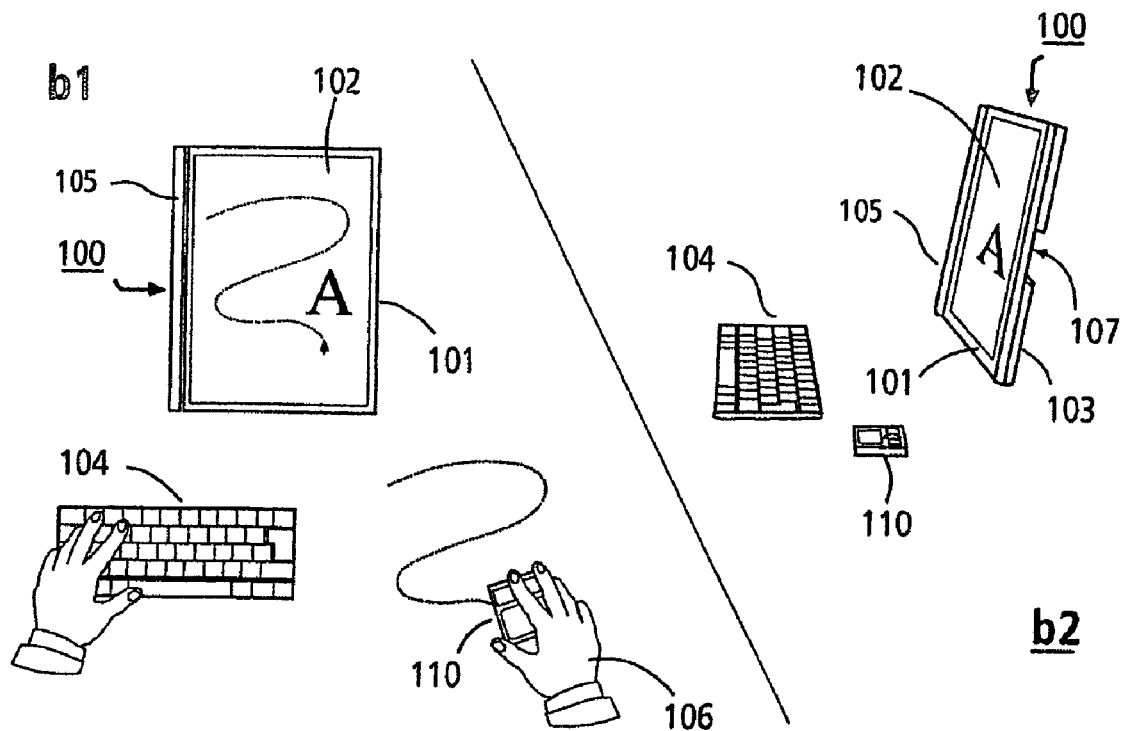

Fig. 15
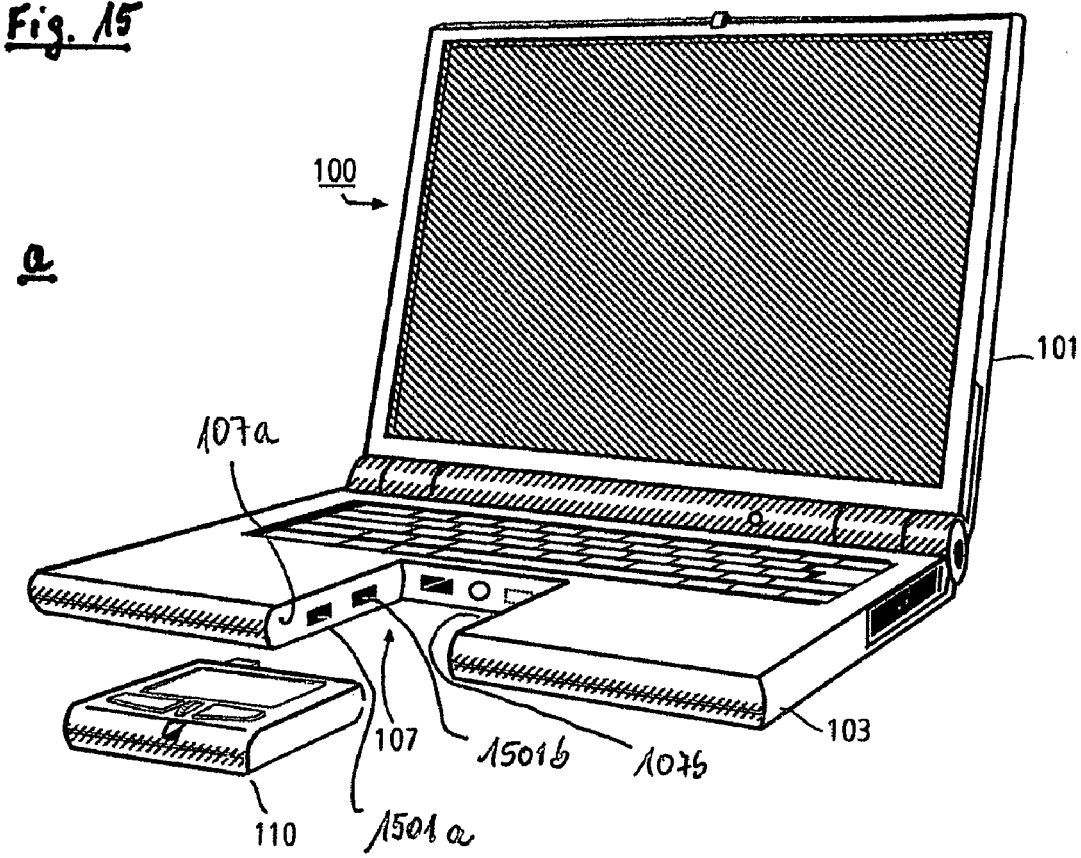
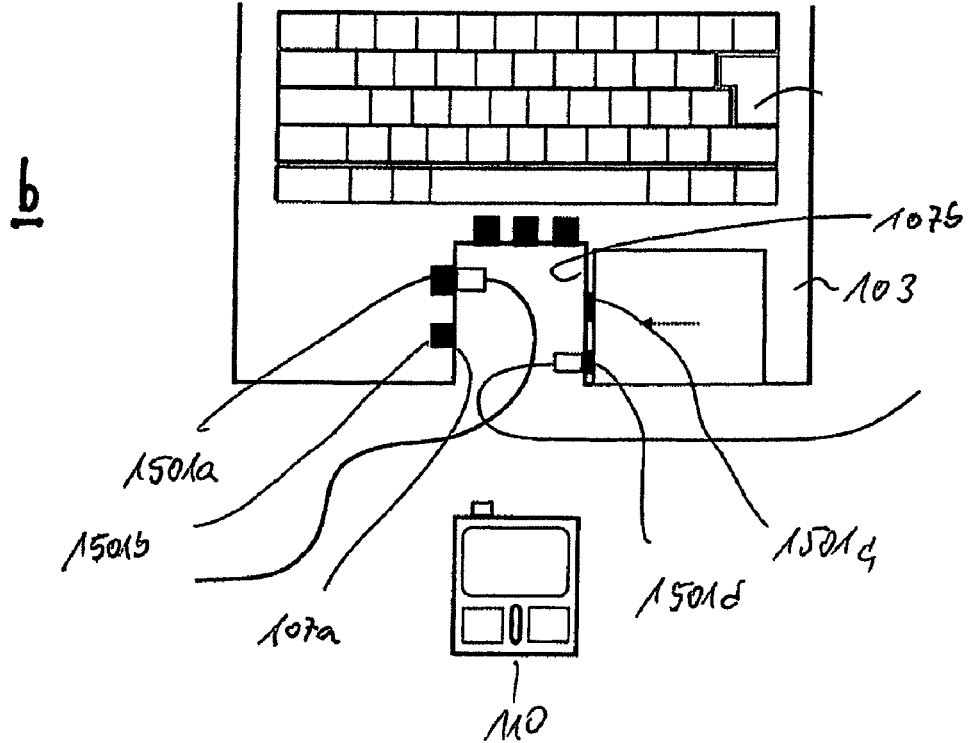

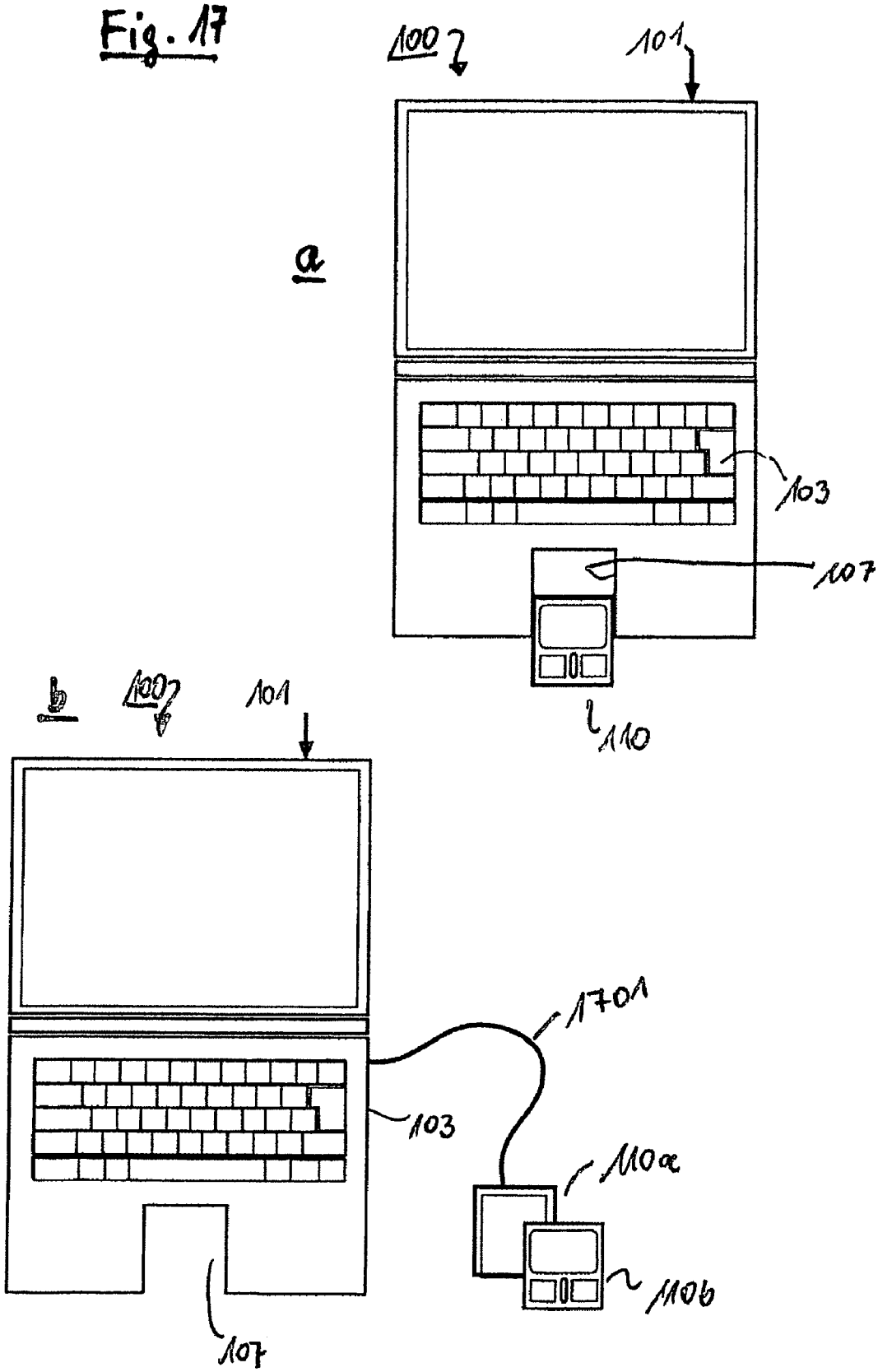

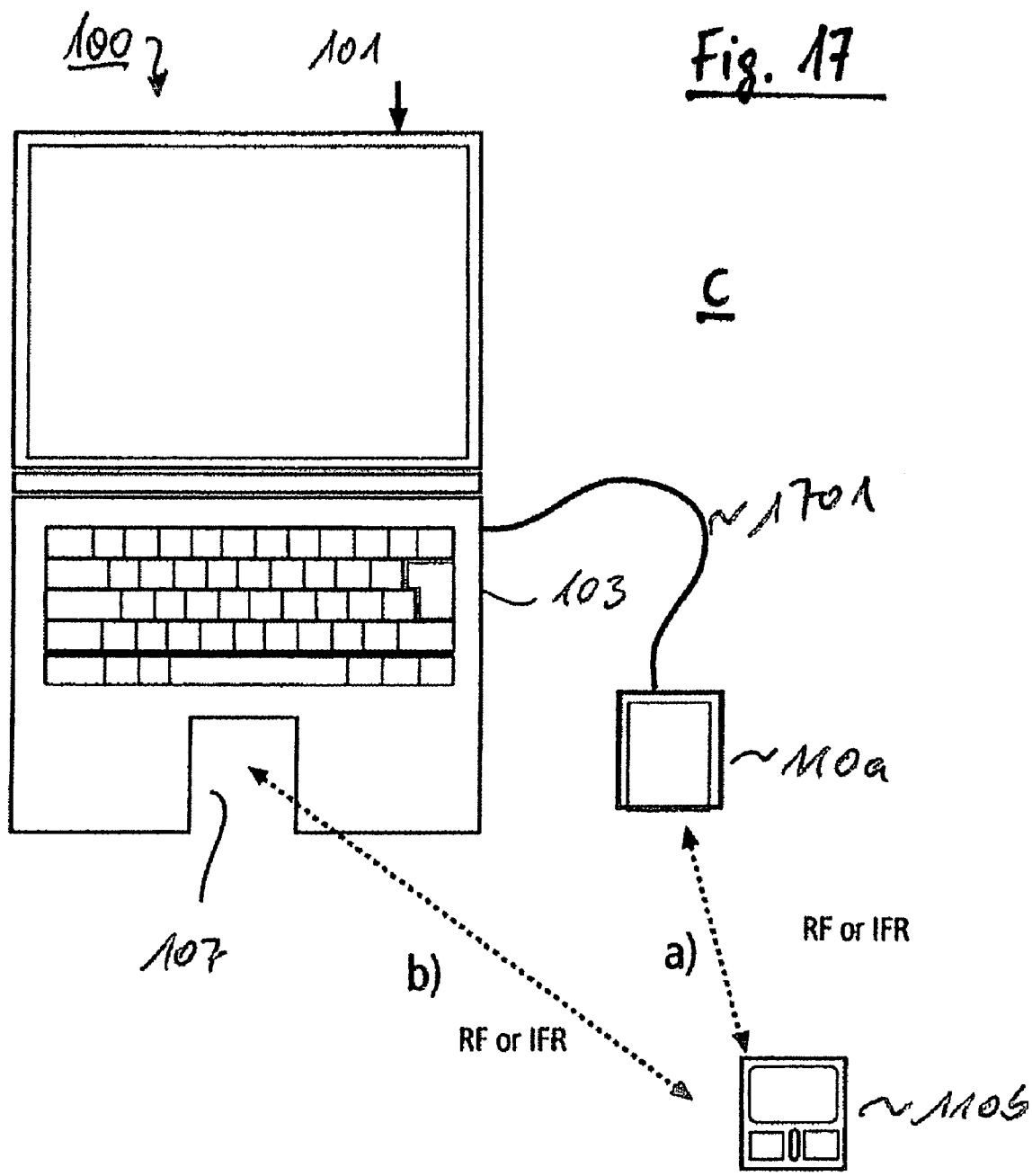

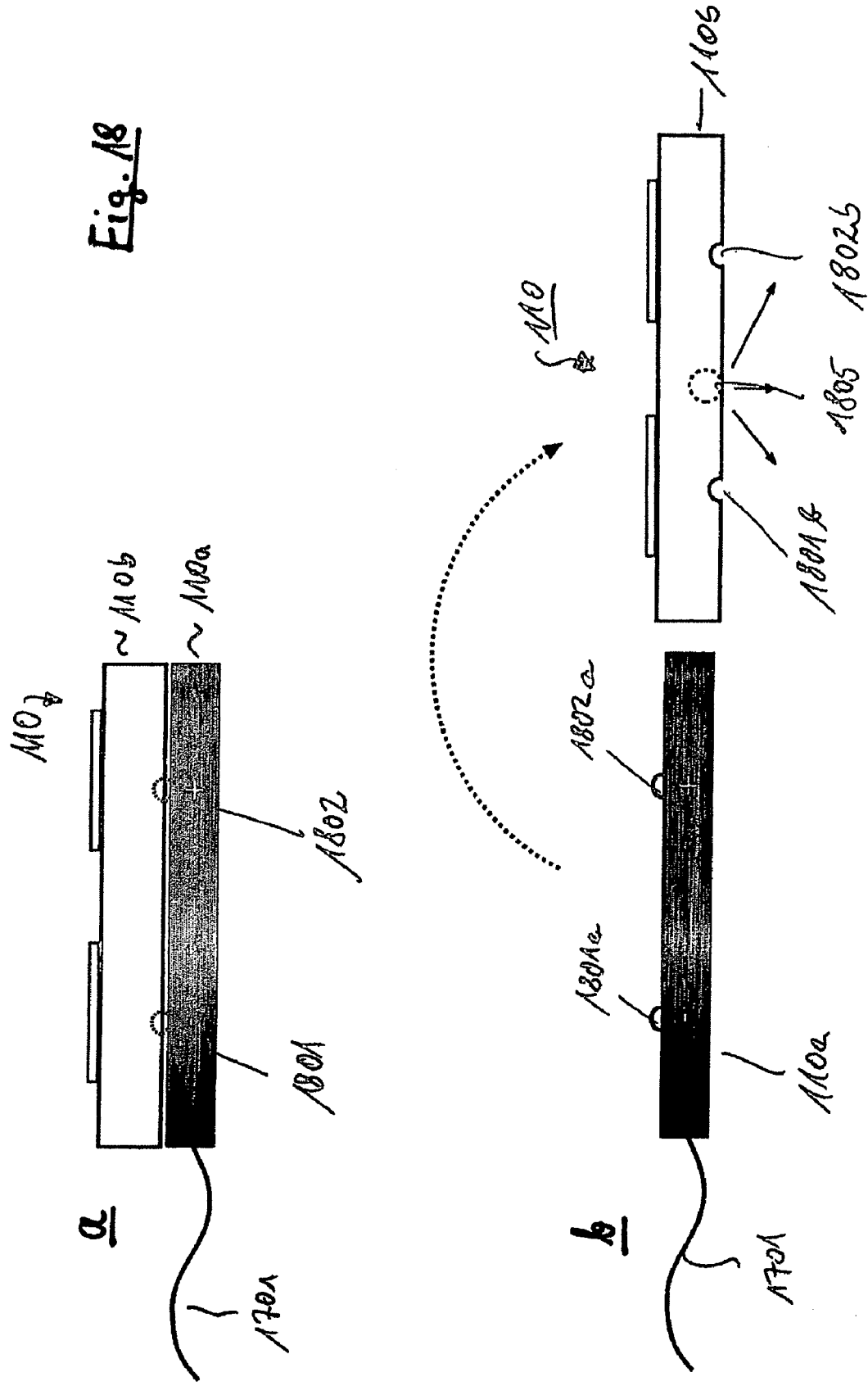

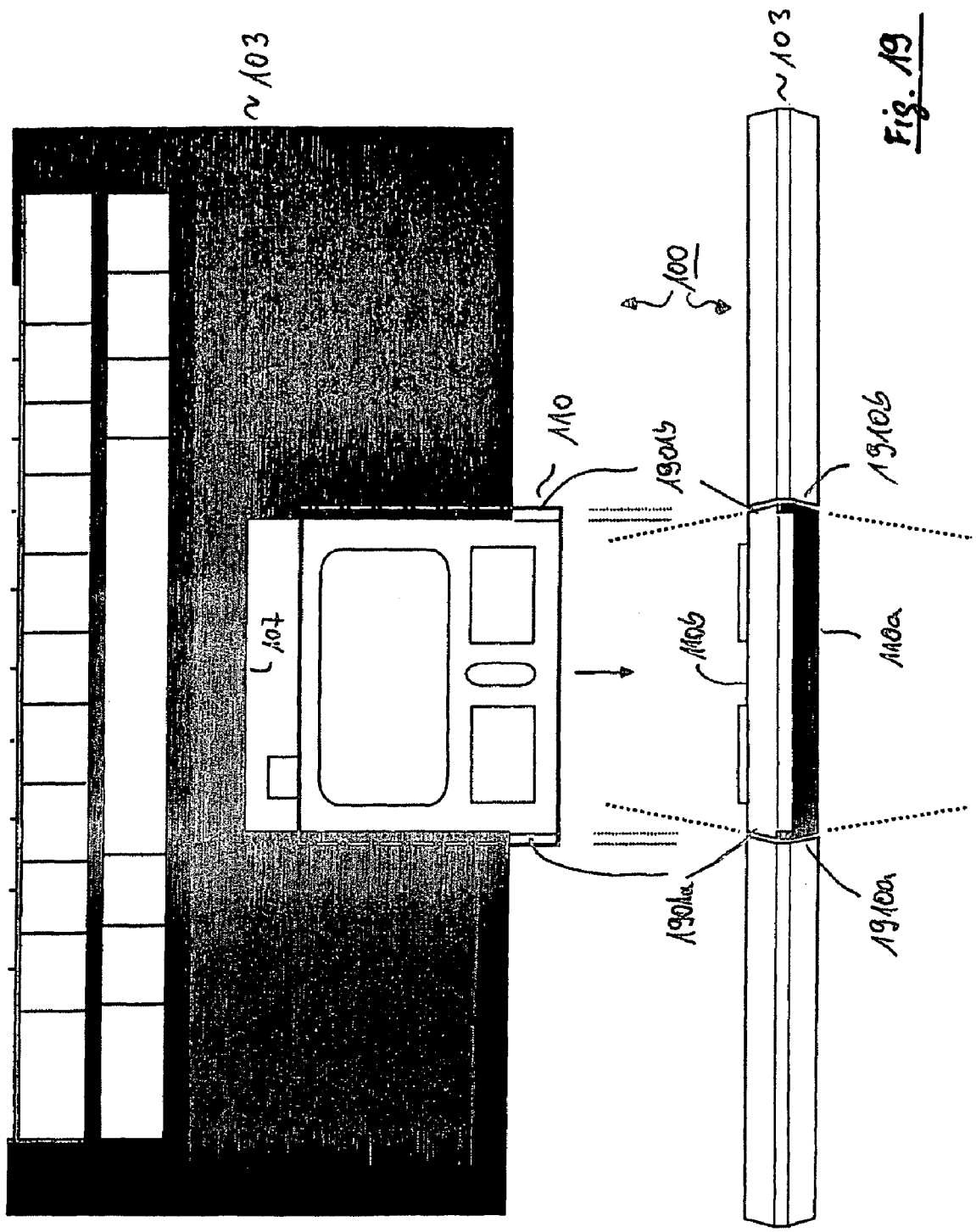

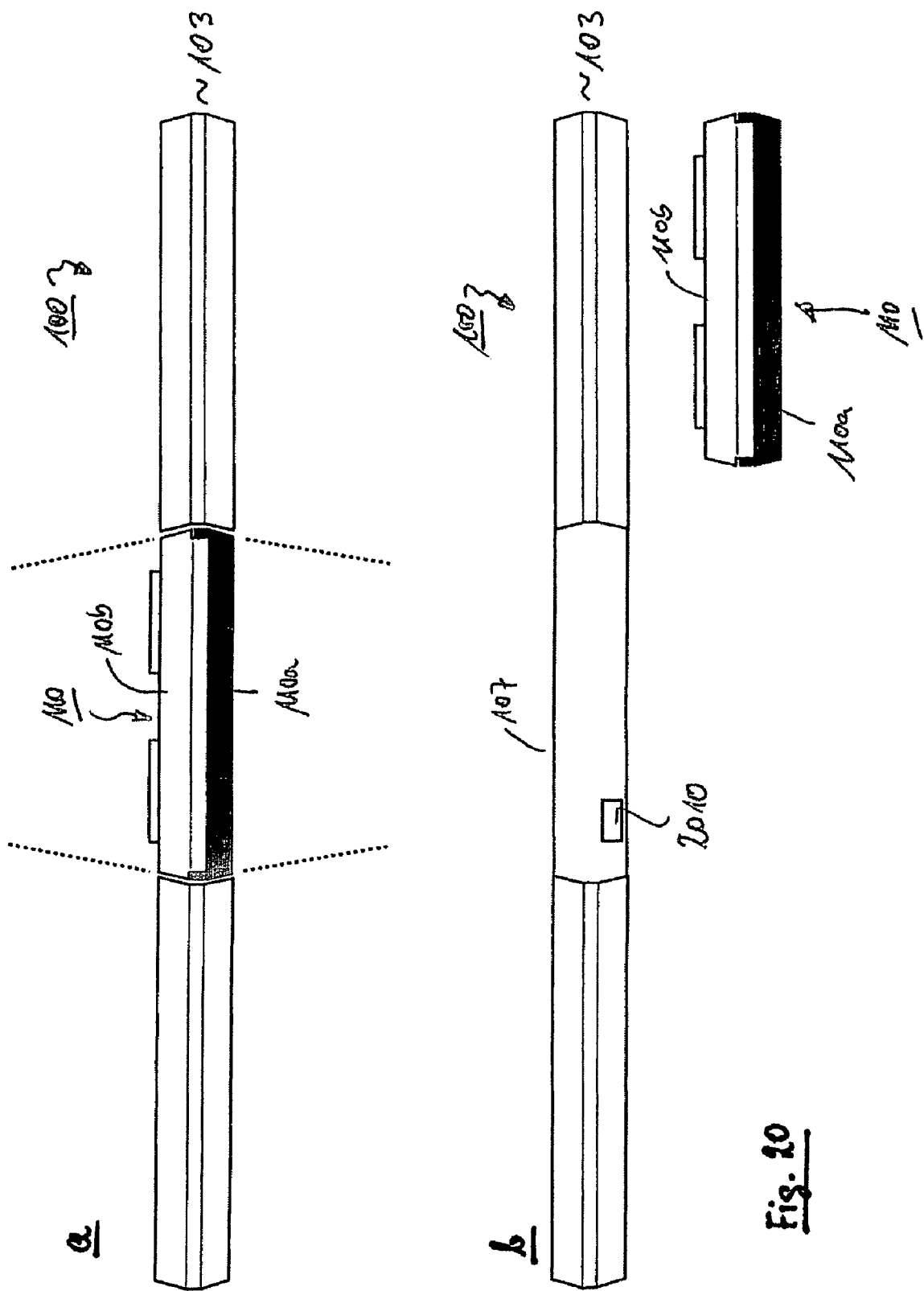

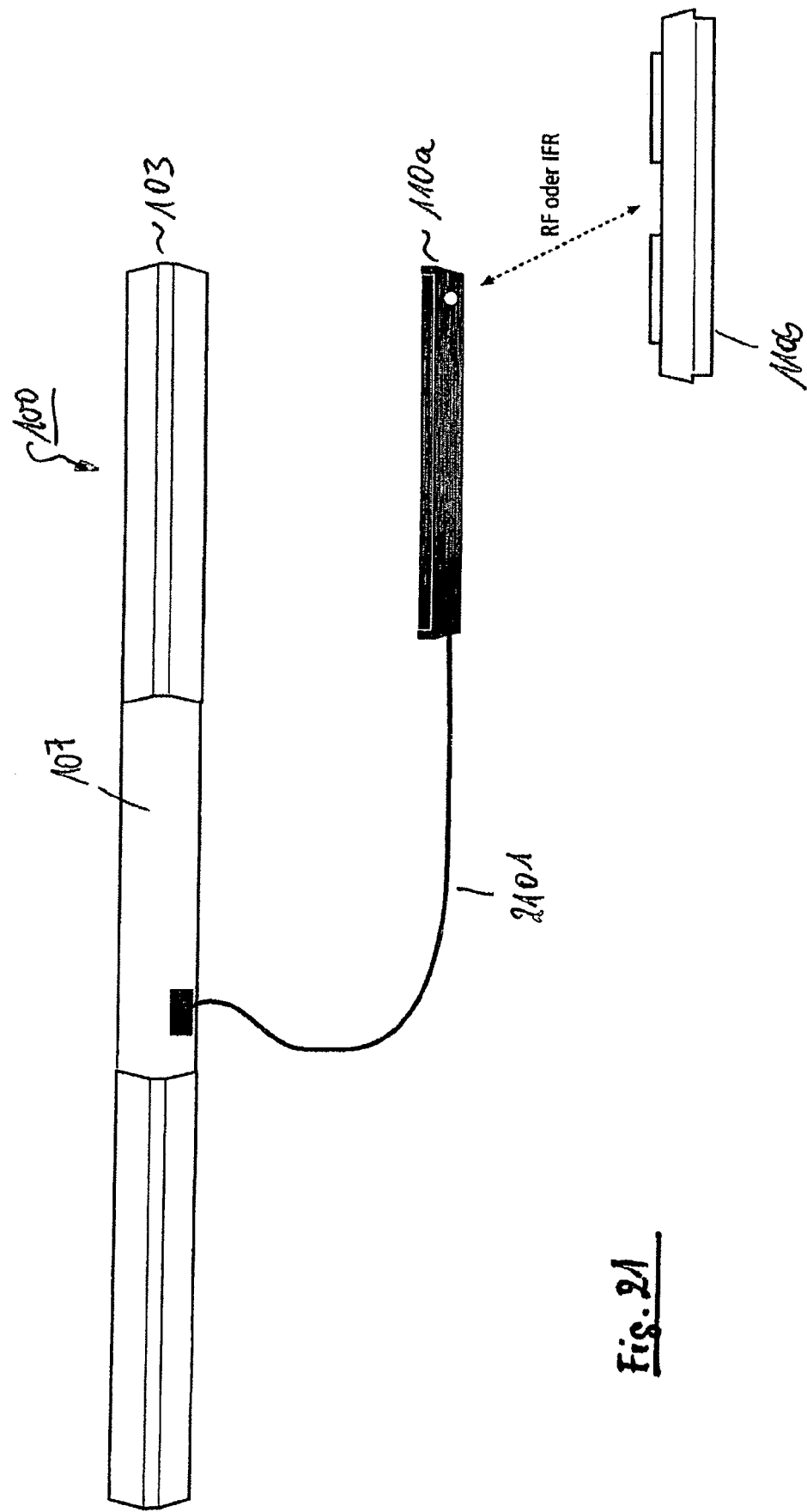

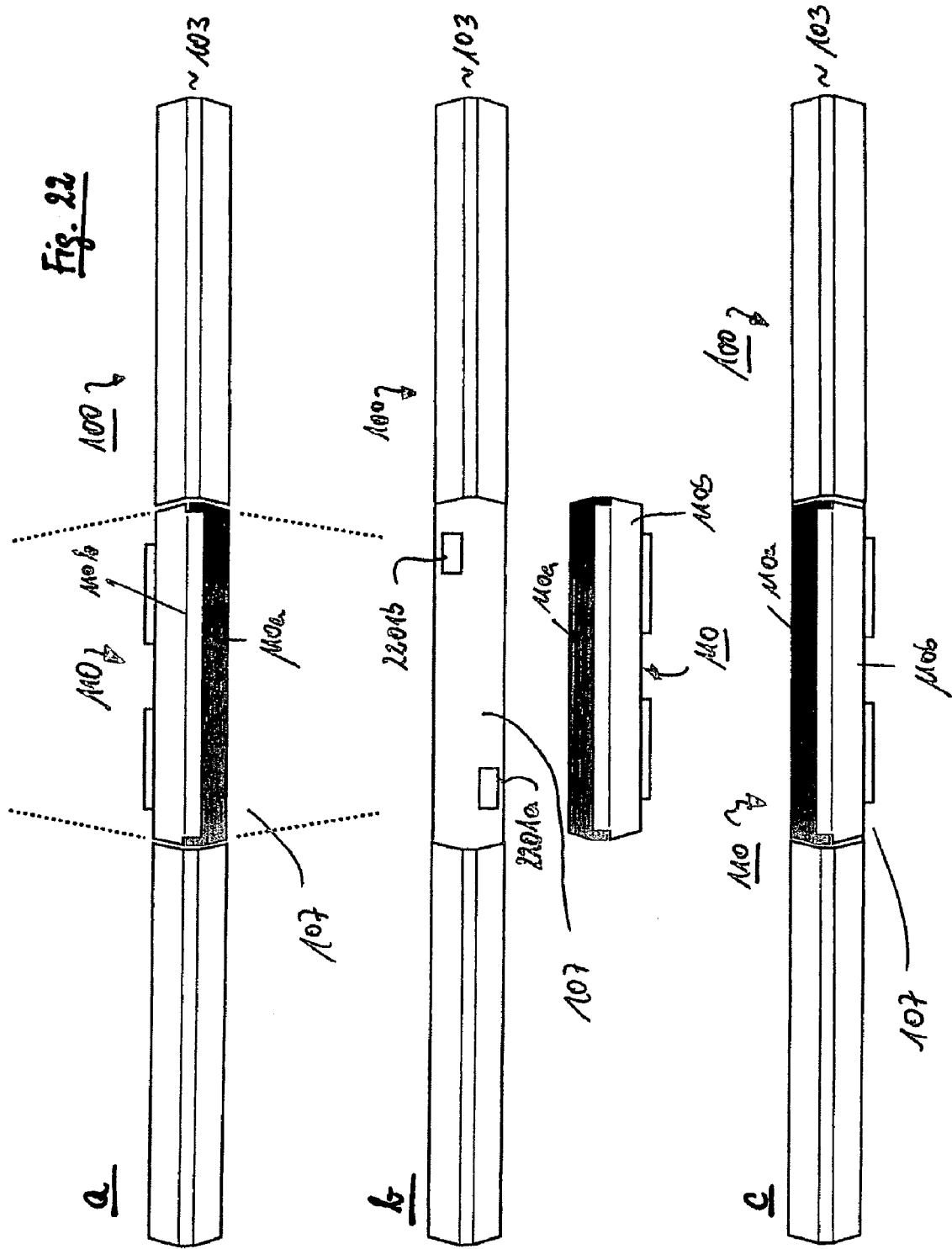

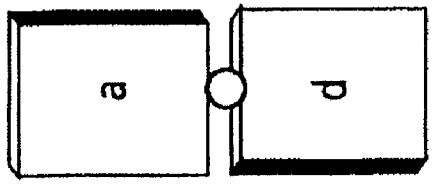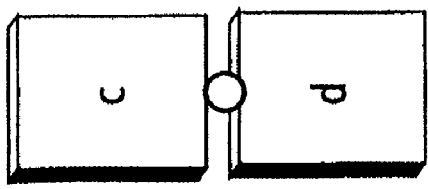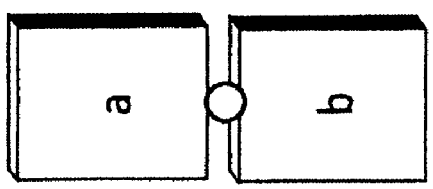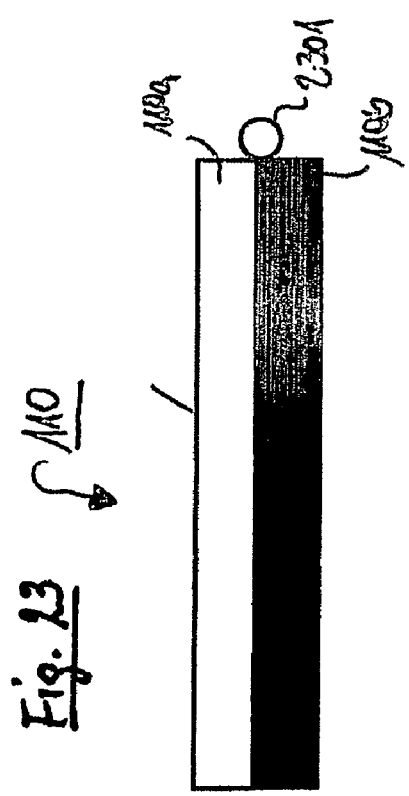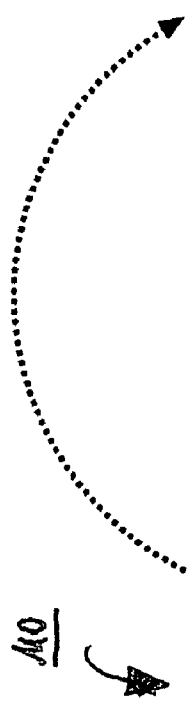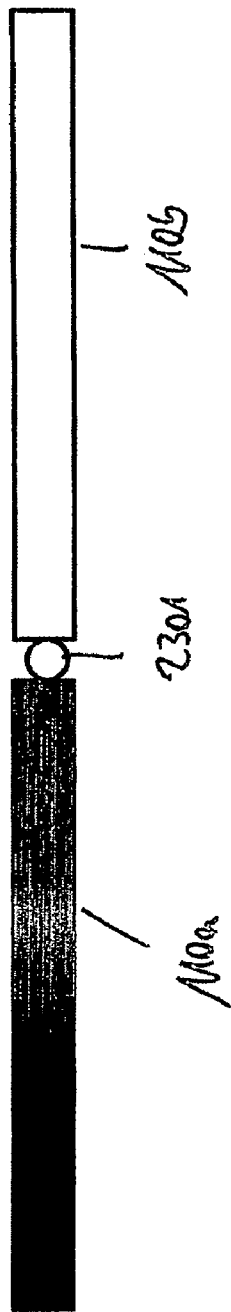
Fig. 23
Fig. 24

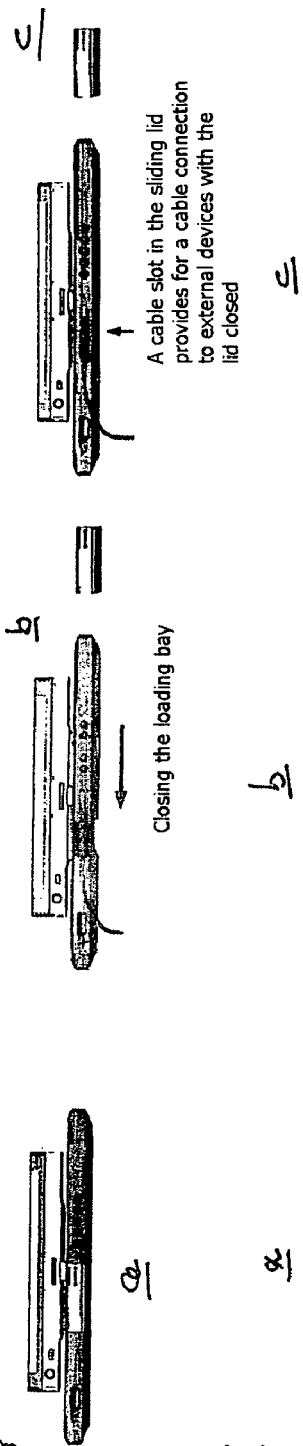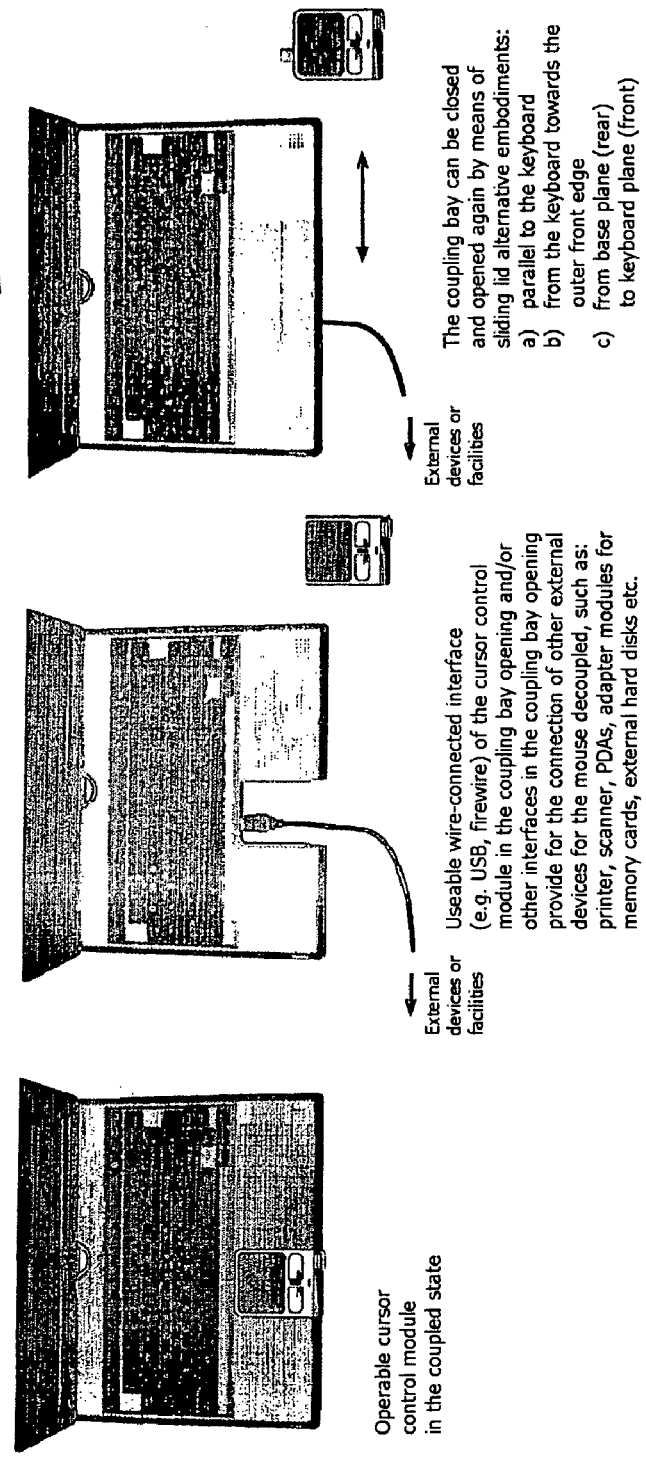

Integrated decoupleable function module, can be used as portable data memory

(increased flexibility, portability and data security)

Figure 30

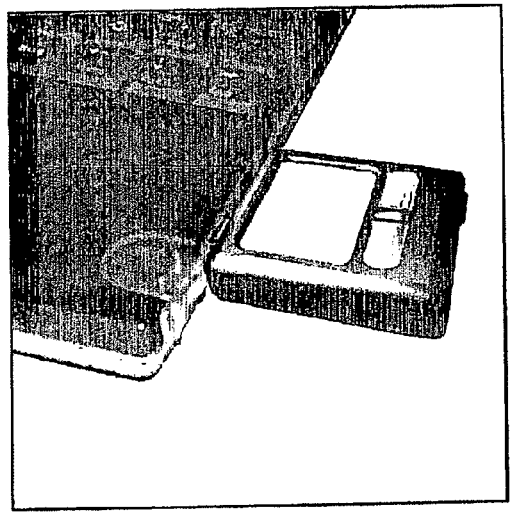

The decoupled function module, by being constructed with a flash data memory, can be used for transmitting data to other computers (depending on construction, with or without connecting cable, via the standard interface provided for the purpose, e.g. USB or firewire)

Personal or confidential data can be stored on the module and taken along even without notebook.

As a virtually system-internal memory, the memory can be extended or reduced arbitrarily via the decoupleable module.

Due to large market fluctuations in the flash memory prices, a construction with card reader for flash memory cards is particularly advantageous.

Integrated cursor control module with external coupleable adapter cable
(increased flexibility and greater operational reliability and protection against failure)

The cursor control module removed from the coupling bay can be connected like a conventional mouse by means of cable (also to other computers). e.g. with empty battery or for situations in which wireless communication is disadvantageous or prohibited.

Figure 31

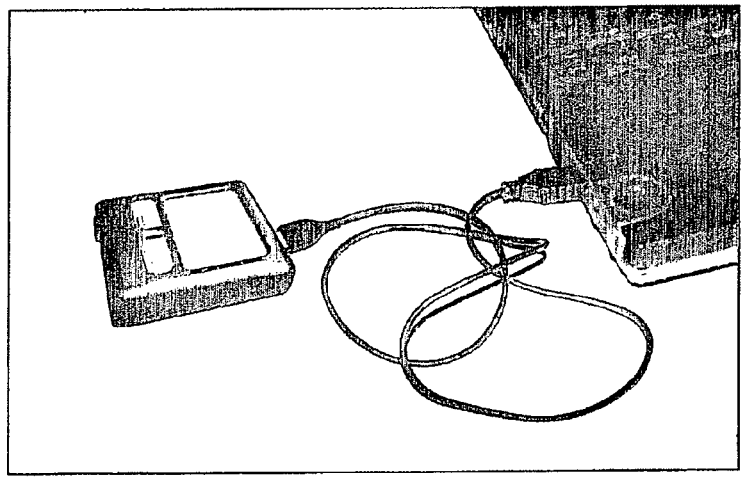

The plug-in connection of the adapter cable is constructed in such a manner that it can be connected like an extension cable at one end to the interface of the module and at the other end to the standard interface of the display device to an external computer.

If it is not used or for transport purposes, the cable can be stowed on the side in a hollow space next to the coupling bay.

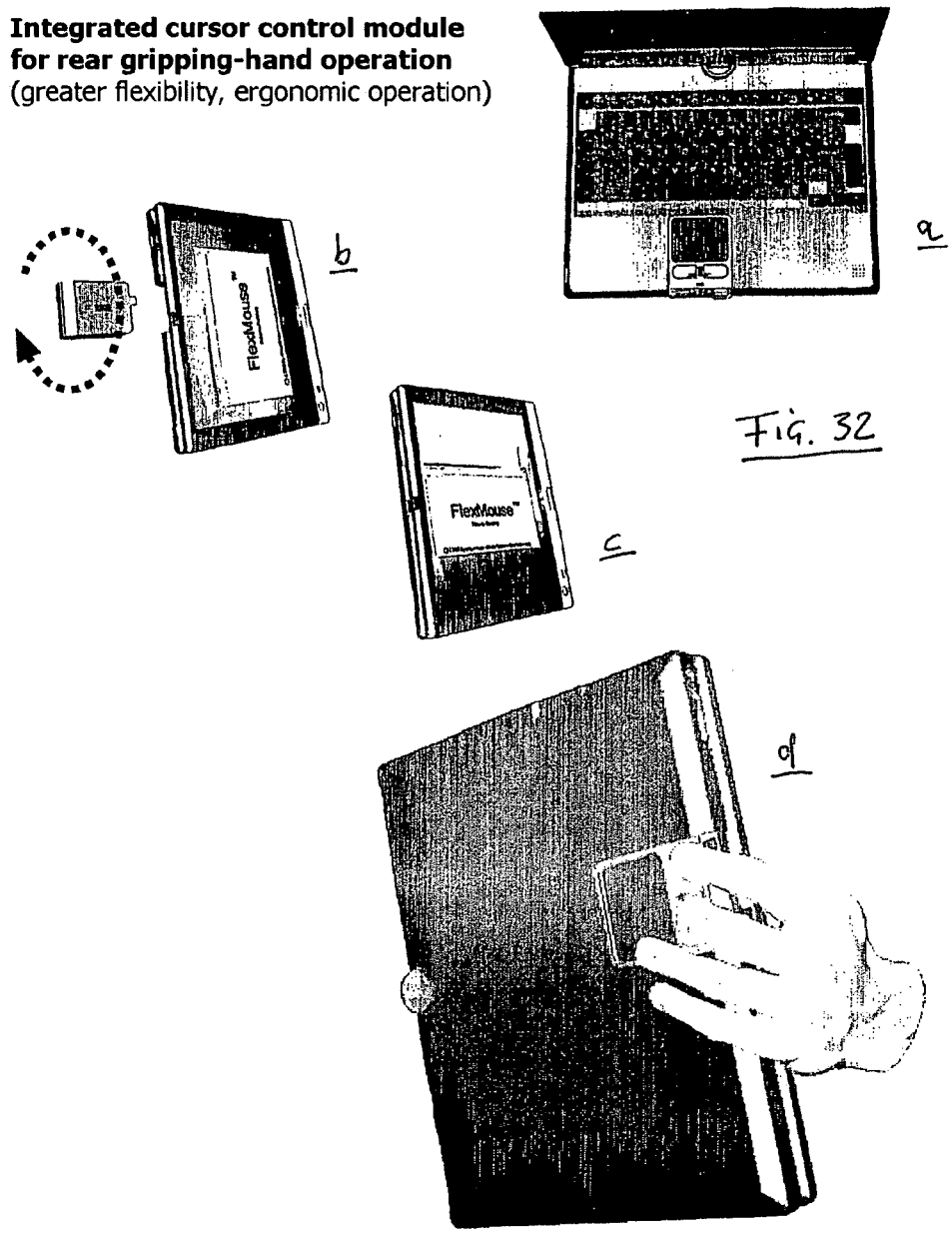

Figure 32

The possibility of use and embodiment is particularly advantageous for tablet PCs with rotatable screen, for ergonomically operating in the hand-held state of operation, and for avoiding disadvantageous additional miniature keys on the front of the display.

The key functions are set up for hand-gripping operation by turning the cursor control module. For example for paging or scrolling screen pages, for inserting selection menus and/or selecting information displayed

Integrated decoupleable function module which can be used as access and rights card

(increased flexibility and data security)

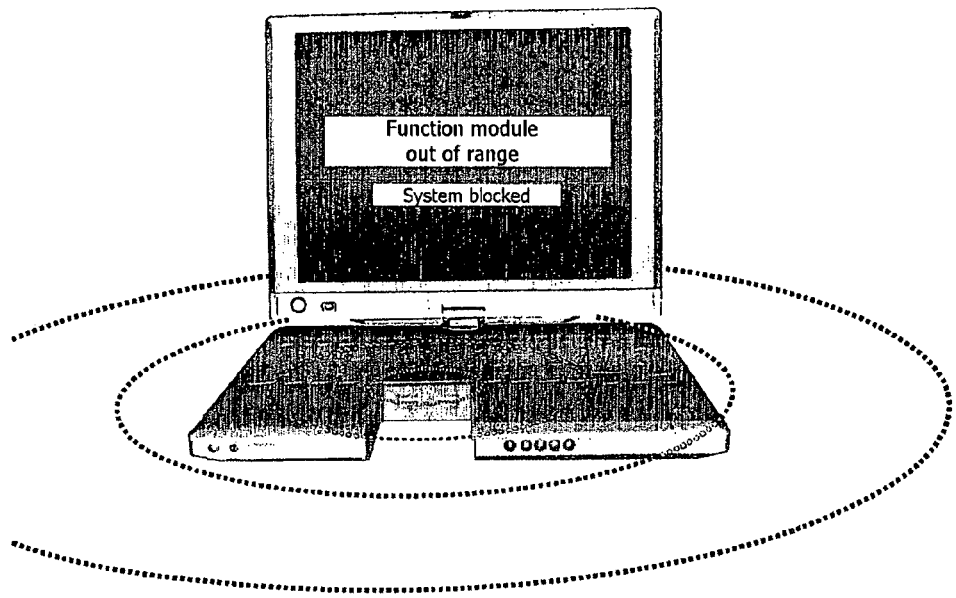

FIG. 33

Moving the function module outside a predetermined radio or infrared range of the display device (e.g. by taking along the mouse) causes the system to be blocked and the screen saver to be activated.

The blocking can be automatically cancelled again by moving the module into range, by identification and/or authentication.

Spying out the device by third parties is no longer possible without cursor control module and by additionally blocking all external connector interfaces. When the module is lost or has been forgotten, access is possible via, for example, PIN and/or TAN number.

Other modules, e.g. cursor control modules, can be registered and licensed by the administrator, which can be coupled with the setting-up of corresponding user profiles and access rights.

INPUT DEVICE FOR PORTABLE DIGITAL COMPUTERS AND PORTABLE DIGITAL COMPUTER WITH A MULTI-FUNCTIONAL MOUSE

BACKGROUND OF THE APPLICATION

1. Field of the Invention

The invention relates to an input device for mobile, and particularly portable digital computers, and to a portable digital computer with input device.

2. Description of Related Art

Portable digital computers have recently become widely used. These portable digital computers include, in particular, the so-called notebooks, by which two-leaf portable digital computers are meant in which a lid part containing a display device and a base part provided with a keyboard are moveably coupled with one another by means of a hinge device so that they can be opened and shut like a book. Apart from this, there are, in particular, so-called Tablet PC computers which are constructed to be single-leafed. Finally, a large variety of portable digital computers constructed as mini devices have conquered the markets in the form of so-called personal digital assistants (PDA).

In this context, so-called e-book readers must not be forgotten which frequently also utilize mouse functions. Such technologies have been described, in particular, in the earlier printed documents International Patent Application Publications WO 2001073673 A2 and WO 1999015982 A1; the content of these printed documents is expressly incorporated by reference herein.

Portable devices are always also meant to be "mobile" devices in the sense of the present patent. This also includes devices which can be used in means of transport such as motor vehicles.

The numerous situations of application in connection with the practical use of these portable digital computers outlined above that is required that the user can move and position a pointer, commonly called "cursor", on the screen of the display device by means of a suitable input device. The traditional aid for this is the so-called "mouse". A mouse is a moveable input device which enables the user to position and/or to select objects shown on the display device in interaction with an operating system and other software. Such a mouse is known, for example, from the document U.S. Pat. No. 5,805,144.

A mouse typically consists of a sliding part which can be gripped by the user with the fingers of one hand or also with a flat hand and pushed to and fro on a level surface, for example a table surface. A sensor device provided in the sliding part detects the movement of the mouse in accordance with path length and path direction relative to the surface on which the mouse is moved, and conveys these movement quantities in a suitable manner with a digital computer via a cable link. The digital computer then interprets these movement quantities by processing certain data processing programs which are usually components of the operating system and/or of application programs. Typical mouse-controlled functionalities are the following:

1. Selecting functions by positioning the mouse pointer on the display device in a screen area which, in accordance with suitable conventions, is considered by the user as a graphic symbolization of a function.
2. Actuating functions, i.e. single or rapidly successive double-activation of a mouse key when the mouse pointer is located over a screen area which, in accordance with suitable conventions, is considered by the user as a "button" on the display device;
3. Marking information items between a first position on the screen and a second position on the screen within the framework of a predetermined geometric model, i.e. positioning the mouse pointer on the display device at a first position, then operating and keeping a mouse key operated and then, whilst keeping the mouse key operated, moving the mouse pointer to a second position, finally releasing the mouse key, wherein the geometric model can be, for example, a rectangle, a linear arrangement, an ellipse or the like;
4. Scrolling functions;
5. Inserting selection information such as, for example, context menus.

The above list of functions is only intended to be by way of example; the context of this patent specification also includes all functions possible by means of a mouse pointer.

Almost all programs which have a graphical user interface provide the user at least optionally with the possibility of performing the entire navigation in the program functions by means of a mouse or equivalent input devices. Examples of this are the navigational concept of the "Windows" operating system software by Microsoft or the navigational concept of the user interface "KDE" for computers which are operated under the Linux operating system. The expert knows these user interfaces and no further explanation will therefore be provided here.

Mice in which a roller ball arranged on the underside of the sliding part and freely rotatably rolls along on the support on which the mouse is moved are in widespread use, the relative motion between roller ball and sliding part housing produced as a result being detected in a suitable manner, for example by means of measuring rollers and converted into an electrical signal. Since the roller ball is mechanically sensitive and, moreover, is susceptible to soiling, there are also attempts to detect the motion of the sliding part over the surface on which the mouse is pushed, contactlessly optically in that optically detect able surface patterns present in any case or arranged on a mouse support are detected by optical sensing means and converted into motion signals.

In principle, mice provided with a roller ball can also be used in an alternative mode in which the housing is located stationary on a support, for example a table top, the roller balls being rotated with fingers or at the ball of the thumb of one hand of the user. Mouse devices optimized for this operating mode are also called "trackball".

It is usually found to be expedient to provide mice or, respectively, trackball devices, with keys, adjusting wheels and other operating elements at a suitable place on the housing in order to be able to carry out, for example, complete selection processes in a simple and clearly understood manner by the user.

In the practical use of portable digital computers, mice and trackball devices provided with cables have always been found to be unwieldy in as much as the user, in addition to the actual digital computer, must also carry the mouse or the trackball device, respectively, as a further object. A mouse or trackball device, respectively, provided with a sufficiently long cable presents problems since, on the one hand, the cable must be wound up before being transported or secured in another manner against being twisted and, on the other hand, requires a corresponding unwinding process before being used. During operation, the cable can become caught on other objects located in the vicinity and present discomfort and inconvenience to the user. To deal with these problems, so-called "cableless" mice or trackball devices are known in which the motion data of the sliding part are transferred to the digital computer wirelessly via a short-range radio link or by infrared data transmission.

For the user of a portable digital computer, however, the use of such a cableless mouse or of a cableless trackball device means that he has to carry along three parts, namely the portable digital computer, a base station provided with a short cable stub for connection to the digital computer, and the sliding or trackball part. In practice, it has been found to be problematic always having to pack up and reliably carry along all three parts during the transport.

The power supply represents a further problem because either sufficient batteries must be kept in stock which can rapidly become discharged due to frequent use and thus have to be frequently replaced, or a charging device must be carried along as a further component in the case of a rechargeable battery.

An approach at remedying these problems, known from the prior art, consists in dispensing completely with the mouse or the trackball device as an independent part and instead installing a sensor for transmitting location and displacement data directly into the portable digital computer. A widely used exemplary embodiment of this approach is the so-called "slide pad". A "slide pad" is a small area with sides of a few centimeters' length which is equipped with suitable sensors in such a manner that during a sliding contact with a fingertip moving on the area, a signal representing the motion path and motion direction can be detected and processed further by the digital computer. Solutions are also known in which a pin slightly protruding from the keyboard plane is arranged in the keyboard which can be bent in one direction via the full force acting on it with a fingertip. This action of the force is measured by suitable sensors and transmitted as motion direction and motion length signal to the digital computer. Finally, solutions are known in which a trackball device is permanently installed in the portable digital computer.

Although these approaches at improvement considerably simplify the transport problem for the user since now only a single part, namely the portable digital computer must be packed up and transported; according to experience, however, the ergonomic characteristics of such permanently installed mouse substitutes considerably lag behind those of an external mouse or of an external trackball device, respectively, because of the close proximity to the keyboard and due to the mechanical housing dimensions which are always kept small.

From U.S. Pat. No. 5,126,955, a notebook is known which exhibits a scanner mouse unit connected by means of a cable. It is only intended to store the scanner mouse part in the storage part for purposes of transport. There is no mouse functionality in the storage part of the keyboard. The cable restricts the freedom of motion and limits the possibilities. A roller ball is used for the mouse function.

From U.S. Pat. No. 5,049,863, a keyboard unit is known which, although it can be applied with PCs and notebooks and specifies an infrared connection instead of a cable connection, a part-keyboard segment is used for it in order to create, due to a possibility of decoupling the key segment, a mouse which generates mouse signals via a roller ball. On the top, the removed keyboard segment is only equipped with the cursor keys of the keyboard which does not offer a functionally equivalent alternative to an integrated notebook mouse due to its arrangement and its restricted usefulness. An integrated mouse would have to be constructed in addition. Moreover, the removable key unit is fed with a non-rechargeable dry battery which would have to be replaced more frequently, especially with more intensive use. In this context, it is very disadvantageous always to have to keep spare batteries in stock. A further disadvantage is the infrared link which can also restrict the freedom of movement. Moreover, it is disadvantageously provided expressly that when the keyboard segment is inserted into the keyboard, it operates a switch which switches off the power supply for the keyboard segment.

From U.S. Pat. No. 5,546,334, a decoupleable keyboard and a decoupleable integrated trackball mouse is known which, however, are only to be decoupled for repair purposes or when the notebook is to be used without trackball. Neither the keyboard nor the trackball mouse are electrically connected to the notebook and functionally operable after the mechanical decoupling.

From U.S. Pat. No. 5,726,684, a notebook with a decoupleable integrated mouse with trackball is known, wherein these can be operated both by cable, infrared or radio. For this purpose, the decoupled mouse, after removal from the notebook housing is turned over so that the roller ball can generate mouse signals by being moved over a level surface. Here, too, a non-rechargeable dry battery is provided which must be replaced after having been used up.

From printed document U.S. Pat. No. 6,476,795 A, a notebook is known by means of which it is possible to charge up radio mice. However, this is done in a complex manner with the aid of a module to be inserted for this purpose into a drive bay of the notebook, for example for inserting a CD ROM drive. In this arrangement, a radio mouse can be charged up via an intermediate battery in the auxiliary module. It is intended, however, to charge up conventional radio mice. The solution shown does not have the aim of decoupling an integrated mouse so that it can also be used as external mouse. Instead, the mouse must be transported and stored as second external mouse. The charging module can remain in the notebook but this blocks the coupling interface for modules which may be more important. Any permanent integration of the module would, therefore, be rather disadvantageous for space and cost reasons.

From U.S. Patent Application Publication 2001/0033267 A1, a notebook having a number of coupling possibilities for function modules such as an external infrared mouse is known which can be wirelessly effectively connected to the notebook. However, this is shown as additional possibility to a permanently integrated mouse. The notebook mouse cannot be removed from the notebook. The solution is based on the placement of IR transmitters at various points on the notebook in order to increase the freedom of movement with a radio mouse shown externally. The charging up of a coupleable mouse module is not shown.

SUMMARY OF THE INVENTION

It is, therefore, the object of the invention to propose an improved input device for portable digital computers and an improved portable digital computer with an input device, in which disadvantages of the prior art are eliminated or at least greatly reduced.

According to the invention, the object forming the basis of this patent is achieved by the subject matters of the subordinate patent claims. In the subclaims, developments of the subject matters of the dependent claims to which they are referred in each case can be found in each case.

The invention enables a maximum of ergonomics and functionality which take into account the time-honored habits of use of the user to be achieved with minimum constructional and technical means.

A first aspect of the invention is connected with the creation of an input device which is capable of providing the typical functionalities of a mouse, of a slide pad or of a trackball and at the same time is, on the one hand, an integral component of a portable digital computer, particularly of a notebook, of a tablet PC, of an e-book reader, of a pocket computer, of a beamer or similar devices and is also able to fulfill its function in this state connected to the reference device, particularly in applications under conditions of a lack of space but which, on the other hand, can be mechanically decoupled from the reference device in one manner or another in order to provide the user with the possibility of ergonomically optimized and pleasant relaxed working in a greater range of action around the digital computer in situations of applications in which the user is provided with a level support area and sufficient space. In this context, it is of great significance to make this input device both handy, practical, both ergonomically and functionally, for which purpose a combined wire-connected/wireless embodiment is proposed in a preferred embodiment, in which, among other things, the charging of a battery located in the input device is very advantageous from the point of view of operator ergonomics if the input device is located in the mobile digital device for the case of application of a mechanically/electrically coupled state. Switching from a preferred cableless data link for use of the input device in the mechanically decoupled state to a wire-connected data link for use of the input device in the mechanically/electrically coupled state is also advantageous. In particular, a cableless link to the computer in conjunction with a sensor-type scanning device for detecting mouse movements on a surface allow a compact mouse module free of mechanics which can be used anywhere, protected against contamination, i.e. without bothersome cable or bothersome cleaning of a soiled trackball. On the other hand, there are situations for which a radio link of the mouse to the digital computer is less suitable and in which the use of radio devices may be prohibited. This includes, for example, aircraft in which, however, the use of notebooks per se is allowed. Since, in particular, taking along notebooks is common for business travelers, particularly in order to work with it on relatively long flights or trips, switching from radio-connected to a wire-connected contact of the input device to the mobile digital device is an advantage. Since in most cases, there is insufficient surface for using the input device as a mouse on trips (e.g. aircraft), using the input device in the mechanically/electrically coupled state is appropriate, in any case. One possibility would also be switching from a radio link to an infrared link in order to avoid such problems. It is also possible to use a mechanically/electrically coupleable connecting cable, e.g., USB, in these cases if the user prefers to work with the mouse.

A second aspect of the invention is connected to the ergonomic operability of a relatively compact input device, or one of flat construction, in the case of the decoupled use as mouse. By integrating the input device into a relatively flat leaf of the case, the input device is logically also correspondingly flat and of compact construction in the decoupled state. Although it is simpler to store and to transport than conventional mice and supports the functional capabilities described below, the user is unaccustomed to the maneuverability and operability of such mice. It is of an advantage here, to equip the device with a mechanism which allows the user to grip and operate the decoupled input device better as a mouse. A further possibility consists in the advantageous use of the aforementioned grab hand mechanism also for mechanically locking or fixing the input device in the mobile digital computer. This embodiment is not restricted to the solution of an input device integrated in a digital mobile device for use as mouse, especially shown here, and can be applied to all mice from the prior art if this solution is to be applied for the ergonomic operation of a particularly compact mouse.

A third aspect of the invention consists in that the portable digital computer is also enriched and improved in its functionality when the input device is used as an integral component of the reference device, in that the reference device, in interaction with the input device, can be placed in a simple manner into an alternative operating state in which operation from the rear is also possible without problem if the reference device is not operated lying on a support (table top or the like) but is held at least partially freely with one hand or with both hands. By switching the mouse operation to manual gripping operation, documents, books and other texts can be consumed in a book-type form, where the hand gripping the device can perform all operations required for this purpose by means of the manual gripping operation with the hands whilst simultaneously holding the device. This includes, e.g. paging and/or scrolling, inserting selected information (e.g. menus), selecting information, e.g. via cursor keys and many other functions which can be performed with a relatively quiet hand. Thus, for example, the acrobat reader and other programs can be operated intuitively and in a simple manner and navigation functions can be performed. This invention is not restricted to the solution, shown here especially, of an input device for use as a mouse, integrated in a digital mobile device, and can be applied to all mice from the prior art by means of which a manual gripping operation can be effected by means of coupling to a mobile digital computer.

A fourth aspect of the invention consists in that the function of the input device can be advantageously constructed with further additional functions because of its small size and the associated good transportability.

A first, especially advantageous additional function of the input device consists in a first security aspect and the associated possibility of controlling possible accesses to personal data in a mobile digital computer. As personal security module, for the aforementioned reason, the input device according to the invention is particularly well suited to being able to leave the operating position for a short or even relatively long time without continuously having to shutdown the device or having to watch that no unauthorized third party is tinkering with his computer. Depending on the security requirement, screen savers are not always suitable, especially since it only becomes active after some time or the user must activate it each time if he does not forget to do so. Due to having to plug in and take along the input device according to the invention, it is even simpler and more secure, apart from software-controlled access control, if the possibilities for input themselves, which is both the integrated input device and the external mouse in this case, are no longer present. In this case, predetermined functions of the mobile digital device, if not all, are locked and rendered inoperable and also external connector interfaces are coupled but not rendered effective in order to prevent an external mouse or the like from being coupled, e.g. via another USB interface and an unauthorized person from using the digital computer via detours. For this purpose, for example, the input device according to the invention can be enriched by characteristics of an authentication token in that a secret representing the identity of the legitimate user is stored in the input device by means of suitable cryptographic techniques and provided to the reference device by means of known cryptographic protocols (challenge-response and many other protocols) in further developments. In the case of pure identification functionalities without authentication component, the relevant computer can, for example, perform the authentication by means of an identification-specific password interrogation, i.e. the relevant user is recognized from the identification code stored in the input device, but must still authenticate himself by inputting his personal password into the keyboard. This extension of the security function for the input device does not need to be restricted to identification and authentication functions.

A second, particularly advantageous additional function of the input device consists in a further security aspect and the associated possibility of making the input device into a "safe haven" for confidential information. Thus, the input device can be equipped with a memory such as, for example, a flash memory or a small hard disk storage device. A coupling interface in the input device for a removable memory card is also possible. This makes it possible to store confidential data in the input device for controlling a cursor so that they do not even have to be physically present on the mobile digital computer. The advantage lies in the fact that the user takes along his private or personal data or even strictly confidential data when he intends, for example, to leave the room for a short time or wishes to go on a trip without mobile digital computer. A further possible embodiment consists in extending the input device with a chip or with chip cards which cover numerous other functions, for example proof of rights in the context of digital rights management systems or payment functionalities. For this purpose, the input device can be provided, in particular, with a slot for receiving PCMCIA cards (PC cards) or smart cards (memory and/or processor cards). This invention is not restricted to the solution, shown here especially, of an input device integrated in a digital mobile device for use as mouse, and can be applied to all mice from the prior art if it fulfills the embodiment and/or functions described above.

A third, particularly advantageous additional function of the input device consists in a further security aspect and the associated possibility of ensuring, by means of a provision made in the input device, that, for transport purposes, the mobile digital computer is basically conFigured by means of the base input device. For this purpose, a locking recess in the input device is shown by way of example which allows the notebook leaf parts to be properly closed, the input module additionally being fixed in the coupling bay and not being able to slip out even with large and permanent shaking movements. Other modules or a wrong configuration of modules do not permit the leaf parts to close and draw only attention to using and/or configuring the input module in a corresponding manner. The protective range of the advantageous embodiment is not restricted to input devices for controlling a cursor and can be used for securing any types of modules in a multi-leafed digital computer.

A fourth, particularly advantageous additional function of the input device consists in a further security aspect and the associated possibility of locking and unlocking the closed leaf parts of a two-leaf portable digital computer via the input device according to the invention. Locking the hardware is advantageous if the input device for cursor control coupled in the mobile digital device is contained for transport purposes and a possibly unauthorized person attempts to use the device including the input device. Opening the leaf parts or even just booting the mobile digital device would only be possible by means of a corresponding input in the input device or in the mobile digital device, respectively.

A fifth, particularly advantageous additional function of the input device consists in a further security aspect and the associated possibility of using the input device for setting up user interfaces. For this purpose, configuration and setup parameter data are stored in the input device which are necessary for the reference device so that the reference device, for example a notebook, automatically conFigures and sets itself up by inserting or coupling with a user-oriented input device according to the invention. Naturally, setup parameters for this purpose can also be stored in the mobile digital computer so that, after successful identification of the relevant input device and any authentication required, corresponding parameters can be taken from the memory of the mobile digital computer. Setting up the user-specific interface is particularly advantageous for, among other things, company notebooks which are used by a number of users. This invention is not restricted to the solution, shown here especially, of an input device integrated in a digital mobile device for use as mouse, and can be applied to all mice from the prior art if the setting-up of user-specific interfaces can be effected with it.

A sixth, particularly advantageous additional function of the input device consists in the possibility of equipping it with a laser pointer, the input device, in the mechanically decoupled state, being used for presentation purposes by means of beamer or the like in order to be able to carry out remote control functions via the input device, which is advantageously connected to the mobile digital device via radio, and also to be able to produce, e.g. light spot displays on the presentation surface of a beamer by means of the input device. This invention is not restricted to the solution, shown here especially, of an input device integrated in a digital mobile device for use as a mouse and can be applied to all mice from the prior art.

A fifth aspect of the invention consists in that the function of the mobile digital device, due to the special embodiment of the coupling bay for coupling the input device can be advantageously used for other modules and/or for connecting to external devices and facilities so that, in the case of use of decoupling the input device for use as mouse, the advantageous coupling bay can be used for extending the mobile digital computer in its functionalities or its system capabilities by means of other modules or other interfaces. A particularly advantageous embodiment of the coupling bay is a recess, which is arranged relatively centered on the side edge below the notebook keyboard, via at least two, advantageously three side faces of the mobile digital device, in the area where, as a rule, the integrated input device for controlling a cursor is located in a notebook. The recess shown in later Figures, at least of the size of the input device, results in a number of possibilities as have already been described before, among others the possibility for configuring the input device for manual gripping operation at the rear. Further advantages obtained by other possible embodiments. Thus, it is possible to electrically and/or mechanically couple other modules into the free coupling bay, in addition to the input device according to the invention. This includes adapter modules for effectively connecting the most varied memory cards or processor cards such as multimedia card or smart card, system extension modules for extending the functionality of the mobile digital device, for example by means of GSM, GPRS, DSL, modem, GPS, satellite receiver, TV, etc., and recording device modules, replay device modules, DRM modules, external memory modules, processor modules etc. It is also possible to insert, i.e. electrically and mechanically couple special interface modules such as, e.g. a HUB module for extending USB ports or an access point module for cableless LAN communication for connecting external devices. Naturally, the mechanically decoupled input device is still electrically connected to the digital computer and can be used as mouse in spite of other modules inserted in the coupling bay, if this is provided. This is possible by switching from a wire-connected connection to a cableless connection with respect to the input device since due to the switch-over, the power supply and the wire-connected contacting point become available. Other operating devices in other embodiments are also possible which can be inserted electrically/mechanically into the coupling bay and/or can be connected to the mobile digital computer cablelessly and/or by means of cable in the same manner as the input device described above. This indicates a further advantage of the system according to the invention because there can be cases in which simply only a more modern or different type of input device is to replace the original input device for controlling a cursor or, in other cases, in which a special requirement requires other operating capabilities for a short time. For example, a joystick operating unit for computer games or a remote control unit for media players. Especially for these two applications, but not restricted thereto, it is also possible to provide the plug-in module, as a computer games unit or, for example, MP3 player, with its control unit, memory and any security mechanisms for preventing pilot copies, at which, in turn, various input and output possibilities are arranged or can be connected.

It is also possible to design the coupling bay in such a manner that a multiplicity of interfaces additionally set up can be arranged there which also increase the functionality of the mobile digital computer. In the state where the input device is mechanically/electrically coupled such as, e.g. on trips, these interfaces would be automatically covered or protected and in addition, the mobile digital device can be designed to be visually slightly more elegant and uncomplicated since not necessarily all existing connector interfaces are used continuously and especially not at the same time. Thus, it is advantageous to arrange the standard interfaces which are used less, or special interfaces for special applications or redundant interfaces which should be present several times, in the coupling bay of the mobile digital computer.

A sixth aspect of the invention consists in using the input device according to the invention for a further advantageous configuration of the mobile digital computer in order to render possible a desktop configuration from a notebook configuration and conversely. For this purpose, the keyboard integrated in the notebook is also mechanically decoupled and the leaf parts are folded back via the connecting hinge so that the leaf with the screen points to the user in the manner of a PC monitor, and the leaf part for the mechanically decoupled keyboard can be used as foot or support for the mechanically decoupled input device. The rotating hinge is constructed and/or arranged between the leaf parts of the notebook in such a manner that a greater rotation to the rear then is usual with notebooks can be performed so that an angle of at least 90° between the two leaf rears (from the point of view of the user) is possible. Naturally, all possible data and/or power coupling possibilities can be implemented here but a preferred embodiment is the at least cableless connection of the input device and/or of the keyboard to the mobile digital computer. In addition to the variants of the embodiments already mentioned, a connectable cable connection between the input device and the keyboard could be effected, advantageously via the aforementioned USB or firewire interface. The keyboard can also be equipped with a battery which, in another embodiment, can also be charged up via the power supply of the notebook, at least in the mechanically/electrically coupled state with the notebook. The solution provides the user with even more freedom of movement since thus the distance of the screen from the user is also freely selectable and the keyboard, in any case, uses less space, like the entire leaf part of the notebook. In addition, the notebook can be erected in the vicinity of a remote beamer for reasons of cable links for presentation purposes and the entire operation can be performed by means of keyboard and input device from the presenter.

To implement such input devices, it will be necessary to provide a power source and complex electronics. The power source can be constructed as battery and, in addition, it is possible to use the reference device as charging station for recharging the battery. For many fields of application it will be sufficient to control mouse, slide pad and/or trackball functionalities with a hard-wired or preprogrammed electronics system. However, it can also be provided within the framework of the solution according to the invention to provide the input device as such with its own independent computer. For example, a touch-sensitive screen can be used instead of a conventional slide pad. Such approaches make it possible to design a mobile telephone or a PDA pocket computer technically, for example, by providing a touch-sensitive screen and a mechanical and electrical docking interface to the reference device in such a manner that these devices, which can also be used independently, can again be used in their form modified with respect to purpose as input device in the sense of the solution according to the invention.

In the text which follows, the invention will be explained in greater detail with reference to exemplary embodiments which are illustrated in the drawing for illustration without restricting the general applicability of the invention being expressed therein:

BRIEF DESCRIPTION OF THE DRAWINGS

FIGS. 1a-1c are diagrammatic representations of a first embodiment according to the invention with a two-leaf notebook digital computer in three different operating states.

FIGS. 2a-2g diagrammatically show various possible uses and also specially preferred embodiments of the input device according to the invention with the mobile digital computer according to the first embodiment shown in FIGS. 1a-1c.

FIGS. 12a & 12b show a third development of the solution according to the invention, in which the portable digital computer is provided with a removable keyboard.

FIGS. 14a & 14b are diagrammatic perspective representations of various operating states of a development of the embodiment shown in FIG. 12.

FIGS. 15a & 15b are, respectively, a perspective view and a top view of a further embodiment of the solution according to the invention with a multifunctional coupling bay.

FIGS. 17a-17c shows a top view of a further embodiment of the solution according to the invention with a two-part input device.

FIGS. 18a & 18b show a cross-sectional view of the two-part input device from FIGS. 17a-17c.

FIGS. 19a & 19b are, respectively, a top view and a diagrammatic cross-sectional view of a notebook digital computer according to the invention with a development of a two-part input device from FIG. 17a-17c.

FIGS. 20a & 20b show the notebook digital computer according to the invention from FIGS. 19a & 19b with the input device inserted and removed, respectively.

FIG. 21 shows a development of the notebook digital computer according to the invention from FIGS. 19a & 19b with a bottom part of the input device coupled to the notebook digital computer by means of a cable.

FIGS. 22a-22c show a development of the notebook digital computer according to the invention from FIGS. 19a & 19b with a turnable input device.

FIG. 23 shows a development of an input device according to the invention assembled from two parts.

FIG. 24 shows another development of an input device according to the invention assembled from two parts.

FIGS. 28a-28c and 29a-29c, are side and top views show a coupling bay for integrated decoupleable coursor control used for coupling other devices.

FIG. 30 shows use of an integrated decoupleable function module as a portable data memory.

FIG. 31 shows used of the cursor control module with an external adapter cable.

FIGS. 32a-32d show a tablet PC with an integrated cursor control module which provides for rear gripping-hand operation.

FIG. 33 shows a PC in which the decoupleable function module serves as an access and rights card, in the state in which the PC system operation is blocked.

DETAILED DESCRIPTION OF THE INVENTION

Figure 3:
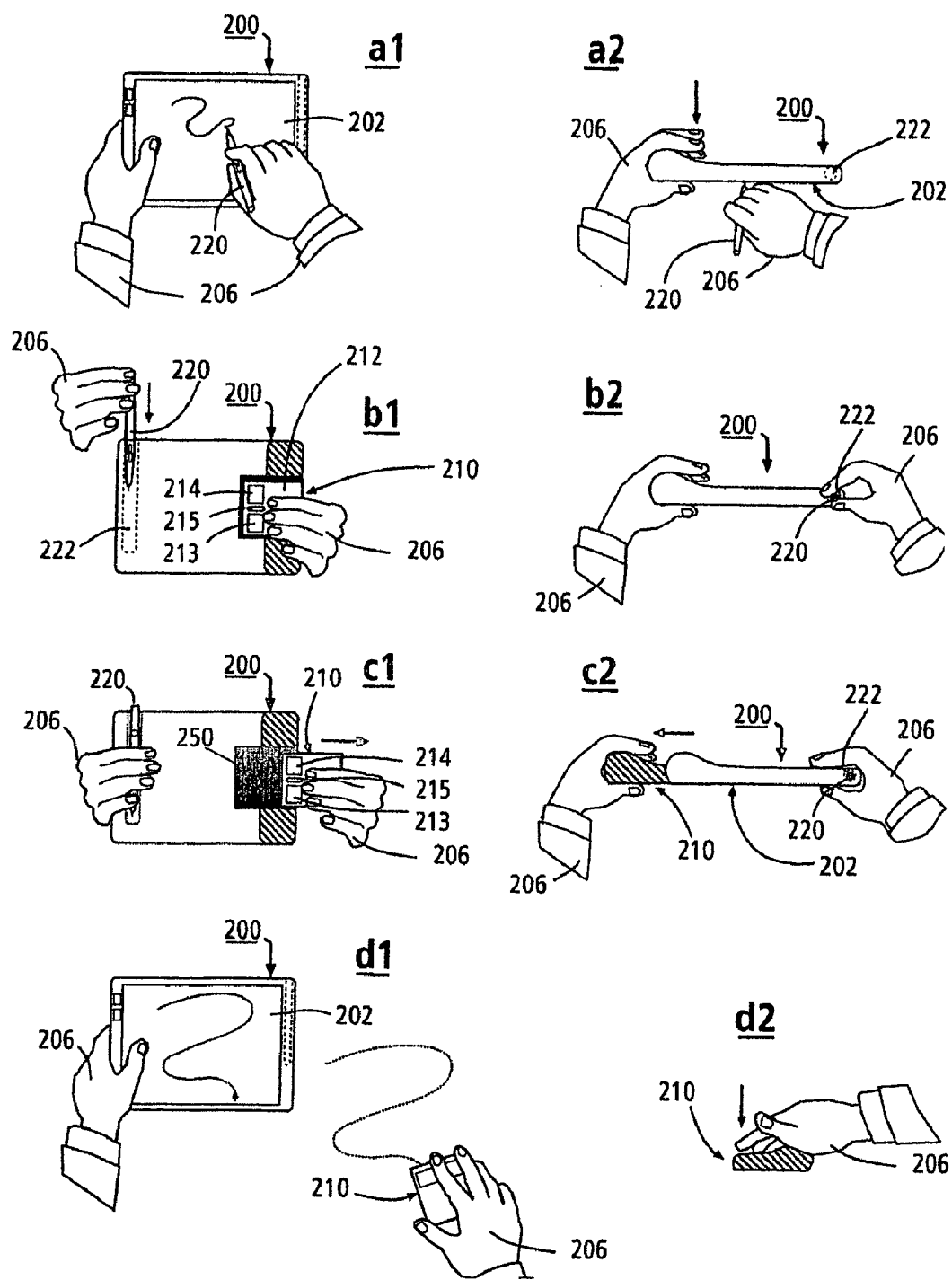
FIGS. 3a-3d are diagrammatic representations of a second embodiment according to the invention with a single-leaf "tablet PC" in various operating states.

FIGS. 1a, 1b & 1c show a diagrammatic representation of a first embodiment of the portable digital computer according to the invention with a two-leaf, notebook digital computer 100 in three different operating states a, b and c. The two-leaf notebook 100 comprises a lid part 101 and a display 102 inserted therein and a processor part 103 with a keyboard 104 arranged thereupon. The lid part 102 and processor part 103 are mechanically coupled to one another with a hinge device 105 so that they can be opened and shut in the manner of a book. The processor part 103 comprises in its interior system components, not shown in greater detail, such as a main board with a central processing unit, with working and mass storage and other components normally used for a notebook. As is generally customary with notebooks, the display 102 is electrically connected to the electronic components in the processor part 103 through the hinge unit 105.

Naturally, the exemplary embodiments described cannot restrict the general applicability of the invention presented. In particular, for example, it must be assumed that in other exemplary embodiments covered by the invention, the processor can also be arranged in a lid part. The keyboard can also be arranged differently or omitted. The invention relates to all known electronic mobile devices which also include PDAs, mobile telephones, e-book readers, media players, remote control devices, mobile TV, radio and video devices and cameras and beamers.

The housing of the processor part 103 has in its area facing away from the hinge unit 105 and facing the user 106 a bay 107 which is set up for accommodating an input device 110. In the exemplary embodiment shown, the input device 110 has on the top a slide pad 112 and a first operating key 113 and a second operating key 114. On the underside, the input device 110 contains a roller ball with associated roller ball motion sensors (neither of which are shown) or an optical underground scanning device (not shown) which could in each case also be encountered in a mouse. Furthermore, the input device 110 contains a power source like a battery or an accumulator (not shown) and a suitable electronic circuit (not shown), by means of which the functions described in the text which follows can be produced.

When the input device 110 is inserted into the bay 107 as shown in FIG. 1a, the input device 110 can be locked in this bay 107 by means of suitable latching devices (not shown). In this operating mode, shown in FIG. 1a, the user 106 can influence the notebook 100 by operating the slide pad 112 and/or the keys 113, 114.

The processor part 103 and the input device 110 in each case have a suitable device for wireless data transmission (not shown) such as, for example, a device for transmitting data via a short-range radio link (for example, according to the Bluetooth standard, etc.) or a device for transmitting data via an infrared link (for example, according to the IRDA standard).

It can be provided that, in the operating mode shown in FIG. 1a, the processor part 103 and the input device 110 are electrically coupled to one another by means of at least one electrical plug-in connector device (not shown) or other suitable contact arrangements (not shown) in order to feed the information signals resulting from the operating processes of the user 106 to the components arranged in the processor part 103. In this operating mode, supplying the input device 110 with power can be handled by the processor part 103 through the plug-in connector device or through other contact arrangements.

If—as shown in FIG. 1b—the input device 110 is detached from the processor part 103 and pulled out of the bay 107, the user 106 can use it in a manner of a mouse as shown in FIG. 1c. The motion signals generated by the roller ball sensors or by the optical scanning device, respectively, and signals which indicate an operation of the keys 113 and/or 114 are transferred to the processor part 103 via the device for wireless data transmission (not shown) and are there evaluated like conventional mouse signals and—if necessary—displayed.

After completed usage, the user again locks the input device 110, for transport or for using the input device in the electrically/mechanically coupled state, into the bay 107 of the processor part 103 as shown in FIG. 1a.

FIGS. 2a-2g diagrammatically shows various possible uses of the invention according to the first embodiment of the portable digital computer according to the invention, shown in FIG. 1, with a two-leaf, notebook digital computer 100 in a preferred development. The operating state shown in FIG. 2a corresponds to the operating state from FIG. 1b. In the developed embodiment, the input device 110 can be inserted into the bay 107 in the processor part 103 not only—as already shown in FIG. 1—in a first orientation in which the operating elements, particularly the slide pad 112 and the keys 113, 114 are arranged on the same side of the processor part 103 as the keyboard 104. Instead, in the developed embodiment, the input device 110 can also be inserted into the bay 107 in the processor part 103 in a second orientation in which the operating elements, particularly the slide pad 112 and the keys 113, 114, are oriented on the side opposite to the side of the processor part 103 on which the keyboard 104 is located (the underside 120 of the processor part 103). Due to this characteristic, the input device 110 can be operated on the rear with the fingers of a hand 106 holding the notebook 110 when the notebook 110 is held in the manner of a book with an essentially vertically oriented hinge unit 105. This reorientation of the input device 110 with the slide pad 112 and the keys 113, 114 towards the rear of the device 100 makes it possible to perform a multiplicity of functions which are triggered with the fingers of the hand holding the device whilst simultaneously gripping or holding the device 100.

Advantageously, a hand-gripping operating mode is set up by the recoupling process itself so that corresponding functions can be used with the rear fingers of the device-gripping hand for optimum operation via the input means of the input device, but are also ergonomic and logical. Thus, by means of software-controlled programming of the input means, a multiplicity of functions can be executed by the switched-on hand-gripping mode by means of for example the keys and/or the jog dial, which would not be possible in this way or logical as decoupled mouse or integrated input device on the keyboard side. This includes, among other things, paging with the keys and/or scrolling and/or driving for selecting an information item displayed on the display horizontally or scrolling and/or driving for selecting an information item displayed on the display vertically by means of the jog dial. It is also possible to insert an information selection (e.g., menu) by pressing both keys 113 and 114 from FIG. 1, or to insert selection information by pressing the jog dial (confirming).

In particular, e-book display programs or, for example, Acrobat Reader for representing and operating PDF files are possible in a particularly advantageous manner. In one embodiment, corresponding functions are automatically reprogrammed or conFigured when the input device 110 is inserted. This includes, in particular, switching the digital computer or the screen on and off, activating or deactivating a pen input mode, an energy saving mode, etc., paging and/or scrolling, switching to another operating mode, setting up device and/or software characteristics, providing information on the display, selecting information on the display, selecting and/or marking information displayed on the display, moving information displayed on the display, acknowledging marked or input information and exercising other functions displayed or not displayed on the screen. The embodiments of the input device 110 can be different with regard to the construction of the sensors built into it (slide pad, key, roller ball, capacitive sensors, pressure-sensitive screen, multi-function key, four-way rocker switch and other keys etc. pp). It is also possible to operate arranged input keys in combination or simultaneously and/or in combination with an input by the thumb on a key or on the sensitive display area on the front. Special reference is made in this connection to the International Patent Application Publications WO 2001073673 A2 and WO 1999015982 A1, mentioned initially. The possibilities will not be listed again here since the expert is familiar with these from the printed documents specified.

FIG. 2b1 shows a top view of the keyboard and screen side of the two-leaf notebook 100 in a preferred alignment for left-handed persons, whereas FIG. 2b2 shows a top view of the keyboard and screen side of the two-leaf notebook 100 in a preferred alignment for right-handed persons. FIG. 2c1 shows the rear of the notebook 100 shown in FIG. 2b1 which is held like a book by a left-handed user 106. FIG. 2c2 correspondingly shows the rear of the notebook 100 shown in FIG. 2b2 which is held like a book by a right-handed user 106. The orientation of the information shown on the screen of the mobile digital computer is advantageously dependent on the configuration of the input device and/or the way the device is held or positioned. This can be done automatically by means of a gravity switch (sensor) known from the prior art and not explained in greater detail here, or by means of an input by the user or in combination of both.

FIG. 2d1 diagrammatically shows an exemplary rough electronic block diagram of a development of the embodiment shown in FIG. 1 of a notebook 100 equipped according to the invention with a bay 107 for inserting the input device 110. A power source 190 is connected to the input of a charge control device 191. The output of the charge control device 191 is connected to a first electrical plug-in connector or contact device 192 in the bay 197. The central processing unit CPU 193 of the notebook 100 can enable a (possibly also bidirectional) datastream between a communication device 194 and an electrical contact connection 195A and/or 195B by means of a switch-over device 193B. In another operating state of the switch-over device 193B, the central processing unit 193 enables a (possibly also bidirectional) datastream between the communication device 194 and a transceiver device 196 for wireless data transmission (for example according to the Bluetooth protocol, IRDA or the like).

The input device 110 has a first electrical plug-in connector device 192A which can be brought into contact with the first electrical plug-in connector device 192 in the bay 197. Furthermore, the input device 110 has a second plug-in connector device 195C and/or 195D which can be brought into contact with the electrical plug-in connection 195A and/or 195B in the bay 107. Finally, a transceiver device 196B for wireless data transmission (for example according to the Bluetooth protocol, IRDA or the like) is provided in the input device, which transceiver device is set up for communicating with the corresponding device 196 in the notebook 100. The data exchange between the notebook 100 and the input device 110 can thus take place optionally in a wire-connected manner via the electrical plug-in connector device 195A, 195B, 195C and/or 195D or wirelessly via the transmission device 196. The input device 110 is supplied with power by a battery 199. The internal processes of the input device 110 and the data exchange with the notebook 100 are controlled by suitable electronics such as, for example, a control unit 198, in particular.

The particularly developed electronic equipment and the arrangement of electrical contact connectors, shown diagrammatically in FIGS. 2d1 and 2d2, provides for a particularly flexible orientation of the input device 110 in relation to the processor part 103. A minimum configuration of the notebook provides the following:

a) a charge control device 191 with a first electrical plug-in connector or contact device 192 for charging the battery 199 in the input device 110, b) a transceiver device 196 for wireless data transmission (for example according to the Bluetooth protocol, IRDA or the like) or a plug-in connector or contact interface for cable connectors for electrically connecting the input device 110 to the notebook 100 for the decoupled operating state of the input device 100, c) an electrical contact connection interface 195A in the bay 107 for the coupled operating state of the input device 110.

A further equipment variant includes all required contacts for providing for two different orientations of the input device with 180° rotation about an axis perpendicular to the slide pad 112, for example in order to align keys 113, 114, arranged on the input device 110, more towards the hinge device 105 or more towards the front edge of the processor part 103 as preferred by the user 106. In particular, this equipment variant requires additionally a further battery contact 192B at the input device 110 and a side contact 195D at the input device 110. Other positions and arrangements are possible.

For an additional possibility of creating a further operating state of the inserted input device 110 in which the input device 110 is rotated by 180° about an axis extending in parallel with the plane of the slide pad 112 and in parallel with the housing edge, as a result of which the input means 112, 113 and 114, shown by way of an example, of the input device 110 are made to be operable from the rear, a further charging current contact 192C in the bay 107 and a further datastream contact 195B in the side wall of the bay 107 are additionally needed.

An essentially square design of the housing of the input device 110 and of the bay 107 provides for further operating states of the input device 110 inserted in the bay, which differ in each case by a rotation by 90° about the perpendicular axis. Naturally, this makes it possible to set up different operating states or operating modes which are automatically set up either by hardware or by software due to the coupling, or by input by the user or by a combination of automatically providing selectable configuration capabilities which, for example, are indicated after the coupling, in order to select and confirm these by means of input.

Instead of the arrangement of the charge control device (charge controller, resistors) in the digital mobile device, it can also be accommodated in the input device or in a coupling module of whatever construction.

FIG. 2*e*1 shows the operation of the notebook with inserted input device 110, the slide pad 102 and the keys 113, 114 being located on the keyboard side (front) of the processor part 103 and being arranged in such a manner that the slide pad is aligned towards the front housing edge 187 of the processor part 103 whereas the keys 113, 114 are oriented towards the hinge unit 105. In this arrangement, for example, the contact connector interfaces 192, 192A, 195A, 195C are arranged or, respectively, active. FIG. 2*e*2 shows the operation of the notebook with inserted input device 110, the slide pad 112 and the keys 113, 114 being located on the keyboard side (front) of the processor part 103 and being arranged in such a manner that the slide pad is aligned towards the hinge unit 105 whereas the keys 113, 114 are oriented towards the front housing edge 187 of the processor part 103. In this arrangement, the contact connector interfaces 192, 192B, 195A, 195D are arranged or, respectively, active. FIG. 2*f*1 shows the operation of the notebook with inserted input device 110, the slide pad 112 and the keys 113, 114 being located on the rear of the processor part 103 and being arranged in such a manner that the slide pad is aligned towards the front housing edge 187 of the processor part 103 whereas the keys 113, 114 are oriented towards the hinge unit 105. In this arrangement, for example, the contact connector interfaces 192C, 192A, 195B, 195C are arranged or, respectively, active. FIG. 2*f*2 shows the operation of the notebook with inserted input device 110, the slide pad 112 and the keys 113, 114 being located on the rear of the processor part 103 and being arranged in such a manner that the slide pad is aligned towards the hinge unit 105 whereas the keys 113, 114 are oriented towards the front housing edge 187 of the processor part 103. In this arrangement, for example, the contact connector interfaces 192C, 192B, 195D, 195B are arranged or, respectively, active.

FIG. 2*g*1 shows a corresponding perspective view of the notebook 100 with input device 110 removed, whereas FIG. 2*g*2 shows a corresponding perspective view of the notebook 100 with inserted input device 110.

In the perspective view of FIG. 2*g*1, an exemplary embodiment of the contact devices 192 (for supplying power during the charging of the battery 199) and of the contact devices 195A, 195B, 195C for wire-connected data transmission between notebook 100 and input device 110 can be seen. In this arrangement, the contact devices 195A, 195B in the bay 107 of the notebook are constructed as spring-like protrusions and the contact devices 195C and 195D (not visible) are constructed as corresponding grooves at the input device 110, in which grooves electrical contact surfaces are arranged for producing a conductive electrical connection. Naturally, corresponding grooves can also be arranged in the bay 107, and the spring-like protrusions can be arranged at the input device 110.

In a preferred development, the lid part 101 has in the area of the front edge a protruding latching nose 181 which latches into a corresponding latching recess 182 in the input device 110 inserted into the bay 107 during the closing of the notebook 100.

An appropriate detailed development of this latching mechanism 181, 182 makes it possible to achieve that, on the one hand, any accidental falling of the input device 110 out of the bay 107 with the closed lid part 101 is impossible and that, on the other hand, the user 106 cannot latch up the latching mechanism 181, 182 when the input device has not first been properly inserted into the loading bay of the mobile digital computer. This advantageous mechanism is intended to prevent that, for example after having been used as mouse, the input device 110 is forgotten and left lying around. It is also important and advantageous to construct a provision in the input module 110 itself for securing a basic configuration of the mobile digital device 100 for transport purposes since otherwise another module then the input device 110 could be inserted into the loading bay by means of which cursor control is not possible. The interaction between the latching nose 181 and the latching recess is shown and described more clearly in FIG. 2*g*2.

FIG. 2*g*1.1 shows a particularly preferred variant of the embodiment shown in FIG. 2*g*1. Currently, more and more serial data bus systems are being used which, in addition to the data signals, can also be used for supplying power. A prominent example of this is the USB Universal Serial Bus. As an alternative, for example, the firewire bus could also be considered. In FIG. 2*g*1.1, a variant based on the USB is shown. In the bay 107, a USB plug-in socket 192X is arranged at the place at which the power supply plug-in connector 192 is arranged in the other embodiment from FIG. 2*g*1. On the corresponding outside surface of the input device 110, a corresponding USB plug 192Y is arranged. When the USB plug 192Y is inserted, the input device receives power for operation and for charging the battery 199 from the notebook 100 via the USB socket 192X and data traffic is also handled via the USB. It is also possible to arrange the charge controller 191 not in the notebook 100 but, as shown in FIG. 2g1.2, in the input device 110. When the USB connection 192X, 192Y is separated by pulling the input device 110 out of the bay 107, the input device 110 automatically switches to battery operation and the input device 110 and the notebook 100 communicate, possibly automatically, via a wireless data communication system also provided. In the exemplary embodiment shown, a radio-frequency or infrared communication coupling point 196 is provided in the bay 107. Naturally, however, this radio-frequency or infrared communication coupling point 196 can also be arranged at other places in or on the notebook depending on the provisions of the technology used in detail. The considerations of symmetry with regard to possible rotations of the input device 110, explained in connection with the description of FIGS. 2e1, 2e2, 2f1 and 2f2, also apply in this case. In the present example, a second USB plug-in socket 192X2 is provided when the input device 110 is to be useable rotated for rear operation. In a simplified variant of the embodiment, a normal power supply for charging the battery can be provided in the input device 110 and exclusively means for wireless information transmission in order to be able to exchange by this means data with the notebook 100 via the wireless connection both in the coupled state and in the decoupled state of the input device 110. An optional key 183 for unlocking or ejecting the input device or other modules is arranged, for example, next to the charging bay below the keyboard. Other mechanisms for locking and unlocking and, respectively, for fixing the module in the charging bay (recess) are possible.

FIG. 2g1.2 shows a highly diagrammatic electronic block diagram according to FIG. 2g1.1, but in another embodiment which, however, is preferred. The input device 110 has a USB plug device 192Y which can be brought into contact with the USB plug socket 192X arranged in the bay 107. A power source 190 in the mobile digital computer is connected to the input of a charge control device 191 in the input device 110 via the interfaces 192x and 192y. The output of the charge control device 191 is connected to the power supply connection of the USB plug-in socket 192Y in the input device 110. The charge control device (or also resistor) 191 is advantageously arranged, together with a charge indicator, in the input device 110 instead of in the notebook 100 since other modules can thus also be connected to the USB connection 192X. The central processing unit CPU 193 of the notebook 100 can enable a (possibly also bidirectional) datastream between a communication device 194 and data lines of the USB plug-in socket 192X via a switch-over device 193B. In another operating state of the switch-over device 193B, the central processing unit 193 enables a (possibly also bidirectional) datastream between the communication device 194 and a transceiver device 196 for wireless data transmission (for example, in accordance with the Bluetooth protocol, IRDA or the like).

Finally, the input device is provided with a transceiver device 196B for wireless data transmission (for example according to the Bluetooth protocol, IRDA or the like) which is set up for communicating with the corresponding device 196 in the notebook 100. The exchange of data between the notebook 100 and the input device 110 is thus optionally possible in wire-connected manner via the USB bus 192X, 192Y or wirelessly via the transmission device 196. The input device 110 is supplied with power by a battery 199 which can be charged up via the power supply connection of the USB plug 192Y. The internal processes of the input device 110 and the data exchange with the notebook 100 are controlled by suitable electronics which has, for example, a control unit 198 located in the input device 110.

In the case of premature flagging of the battery 199, a USB cable can also connected as an alternative to the interfaces 192X and 192Y for using the input device 110 as a mouse, in order to charge it up with power. In this case, it is possible to switch from cableless data transmission to the wire-connected data communication as described before. The switchover can occur automatically or also after an input by the user (not shown). This makes it possible to connect other devices and/or facilities (not shown) for, among others, other purposes of data transmission with the mobile digital computer 100 by means of the cableless communication system 194 which has become free. Naturally, the battery 199 contained in the input device 110 can be removed from the input device 110 and, if necessary, replaced, by means of suitable constructions in the input device 110. It is also possible to charge the input device via an external device which also applies to the battery(ies) 199 removed.

In another case of application, other devices and/or facilities (not shown) can be connected to at least one USB interface 192X, wherein the input device 110 is connected at the same time cablelessly but effectively as mouse to the mobile digital device for at least controlling the cursor. In accordance with other embodiments, it is possible also to arrange, in addition to a further USB interface 192x2 for reconfiguring the input device 110 in the mobile digital computer 100, other interfaces (not shown) in the charging bay 107 in order to connect a multiplicity of devices and/or facilities (not shown) for the input device 110 when it is mechanically decoupled. The connection can be effected by means of plugging-in a module (not shown) or via a cable (not shown) which is suitable and provided for the corresponding interface (not shown). It is also possible mechanically/electrically to couple an interface module, for example in the form of a USB hub (not shown), into the charging bay in order to be able to provide a multiplicity of USB interfaces for connection to other devices.

FIG. 2g1.3 shows by means of greatly abstracted exemplary embodiments, the USB interface solution according to FIG. 2g1.1 and FIG. 2g1.2 and their various possible applications or uses for the mechanical and electrical coupling of the input device 110 to the mobile digital computer 100. In the examples following, "P" is used for the effective power supply or connection and "D" is used for the effective data communication link for simplicity. For example, 190 as power source and SD as serial data cable means a USB connection. Naturally, other serial databus systems or those not explicitly mentioned are possible, if it is possible to achieve the functions listed in the document. USB is referred to as specially preferred solution and for simpler understanding due to its popularity.

In FIG. 2g1.3 a, the input device is inserted into the loading bay 107 of the digital computer 100 and connected to the USB interface which both supplies the input device with power P via a power source 190 and provides for data communication D via a serial data cable (SD).

In FIG. 2g1.3 b, the input device is used as mouse outside the loading bay 107 of the digital computer 100, the data communication being effected via a wireless connection, e.g. radio (Bluetooth) or infrared (IrDA) between the input device 100 and the mobile digital device 100.

In FIG. 2g1.3 c, the input device is used as mouse outside the loading bay 107 of the digital computer 100, the data communication being effected via a USB cable connection to the mobile digital device 100, which has been subsequently coupled between input device 110 and digital computer 100, in order to, for example, charge up the battery (not shown) in the input device 110 whilst it is used as mouse.

In FIG. 2g1.3 d, the input device is used as mouse outside the loading bay 107 of the digital computer 100, the data communication being effected via a wireless connection, e.g. radio (Bluetooth) or infrared (IrDA) between the input device 110 and the mobile digital device 100 and, in addition, a cable for power supply being coupled between input device and digital computer in order, for example, to charge up the battery (not shown) in the input device 110 whilst it is being used as mouse. For this purpose, the user can first effect a corresponding input in the digital device in order to set a corresponding configuration via a switch-over device, not shown.

In FIG. 2g1.3 e, the input device is inserted into the loading bay 107 of the digital computer 100 and connected to the USB interface which both supplies the input device with power P via a power source 190 and enables data communication D via a serial data cable (SD), the communication device for wireless communication communicating with another or, respectively, an external device or facility. This can be another computer such as, e.g. PC or notebook, a printer etc. pp.

In FIG. 2g1.3 f, another module in the form of an adapter module for, e.g. multimedia cards, flash memory cards etc., is inserted into the loading bay 107 of the digital computer 100 and connected to the USB interface which both supplies the module with power P via a power source 190 if required and enables data communication D via a serial data cable (SD). As in FIG. 2g.1.3-b, the input device 110 is wirelessly effectively connected to the communication device 194.

In FIG. 2g.1.3 g the input device is used as mouse outside the loading bay 107 of the digital computer 100, the data communication being effected via a USB cable connection to the mobile digital device 100 which has been subsequently coupled between input device 110 and digital computer 100 in order, for example, to charge up the battery (not shown) in the input device 110 whilst it is being used as a mouse. In this case, other or, respectively, external devices and/or facilities communicate as in FIG. 2g1.3-e, via the communication device 194, which, as a result, has become free, preferably via radio (e.g. Bluetooth).

In FIG. 2g1.3 h, the input device is used as mouse outside the loading bay 107 of the digital computer 100, the data communication being effected via a USB cable connection to the mobile digital device 100 which has been subsequently coupled between input device 110 and digital computer 100 in order to, for example, charge up the battery (not shown) in the input device 110 whilst it is being used as mouse. However, this time the input device is connected to another USB interface in order to keep the loading bay available for other purposes. For example, a module in the form of a USB hub is inserted into the loading bay 107 of the mobile digital device 100 and mechanically and electrically connected to the USB interface in the loading bay of the digital computer in order to be able to connect other USB devices. Optionally, the input device 110 can also be connected to the hub. The exemplary embodiments show the manifold and variable possibilities for using the invention. In addition, the loading bay 107 can be equipped with a multiplicity of connector interfaces.

FIG. 2g2 shows the notebook 100, shown in FIG. 2g1.1, with a completely inserted input device 110. In this case, the interaction of the latching nose 181 arranged in the leaf part 101 of the mobile digital computer 100 with the latching recess 192u formed in the input device 110 is shown. When the two leaf parts 101, 103, which are at least rotatably connected to one another via a hinge 105, are closed, the latching nose 181 slides into the latching recess 192u provided for the purpose, for locking and fixing both the two leaf parts 102 and 103 and for locking and fixing the input device 110 in the digital computer 100. As described in FIG. 2g1, it is no longer possible for the input device to slip out during the transport, for example even with extreme shaking motions, and, at the same time, it ensures that the basic configuration of the mobile digital computer 100 with the necessary input device 110 is set up for transport.

Other modules advantageously do not have this latching recess, in as much as these do not contain the basic functions of the input device, so that during travel, a wrong module is not inadvertently coupled and the digital computer 100, as a result, is no longer operable. Forgetting the input module 110 is also made more difficult due to this solution since the leaf parts 101 and 113 cannot be properly closed without input module 110.

It is also possible, when a transport can only be undertaken with the input device in the basic configuration, that a locking by means of a corresponding latching mechanism is also provided and possible if the input device 110 is inserted differently conFigured (not shown) into the mobile digital device for transport purposes, for example when the input means of the input device are to be arranged on the rear (not shown) according to FIG. 2c1 and FIG. 2c2. This may be required if inputs are to be performed in the closed state of a notebook (not shown), either for the purpose of locking or unlocking the notebook or for other already predefined reasons. A further possible embodiment (not shown) provides a second latching nose with orientation towards the display area rear (not shown) or a swivelable latching nose with, for example, two locking anchors (not shown) to be arranged so that the leaf parts 101 and 103 can also be mutually fixed when a special hinge construction (not shown) makes it possible to rotate the display part 101 by 180° in order to reconFigure the notebook into a tablet PC (not shown). Thus, it is possible, to fix the input device 110 also in a tablet PC configuration or to use it as a mouse for the tablet PC (not shown) in the mechanically decoupled state, or to conFigure the input device 110 differently in the tablet PC (not shown), in such a manner that a rear operation is set up by means of the input device 110 for the tablet PC. For this purpose, a further latching recess (not shown) can be arranged in the input device 110 if the first latching recess 182 is not constructed and arranged in such a manner that the leaf part 110 can be fixed with the leaf part 103 via the input device 110, reconfigured for gripping-hand operation, even in a tablet PC configuration.

Other advantages of the special locking or closing mechanism by the input device 110 are the following:

Since the latching nose 181 fixes the input device 110 in the mobile digital device 100 for transport purposes, it is possible to dispense with other module-holding or -clamping constructions (not shown) so that a relatively easy and fast mechanical and electrical coupling and decoupling, respectively, of the input device 110 or other modules is possible.

Depending on the level of security requirements, provisions such as e.g. latching mechanisms (not shown) can be constructed in the input device 110 itself which makes it possible to market such modules 110 as a security input device at a later time. Thus, an inexpensive basic configuration of the mobile digital computer 100 with a simple input device 110 can be produced and sold and the costs for constructing special input devices 110 with, e.g. locking or latching mechanisms, pin or password input capabilities, display, possibly with pen input capabilities, integrated memories etc. can be passed on to the input device 110 as special model.

Other constructions of closing, locking and/or fixing mechanisms are possible without restricting the protective cover. In a development, a key 183 can be arranged in the vicinity of the loading bay for unlocking or for ejecting a fixed input device 110 or other fixed modules (not shown).

FIG. 2g3 shows the notebook 100, shown in FIG. 2g2, in a variant provided with touch screen, in a different position for book-like handling, in which the user accommodates a pressure pen 176, by means of which inputs can be performed on the touch screen, in a pressure pin housing 177 arranged in the hinge device 105.

Figure 4:
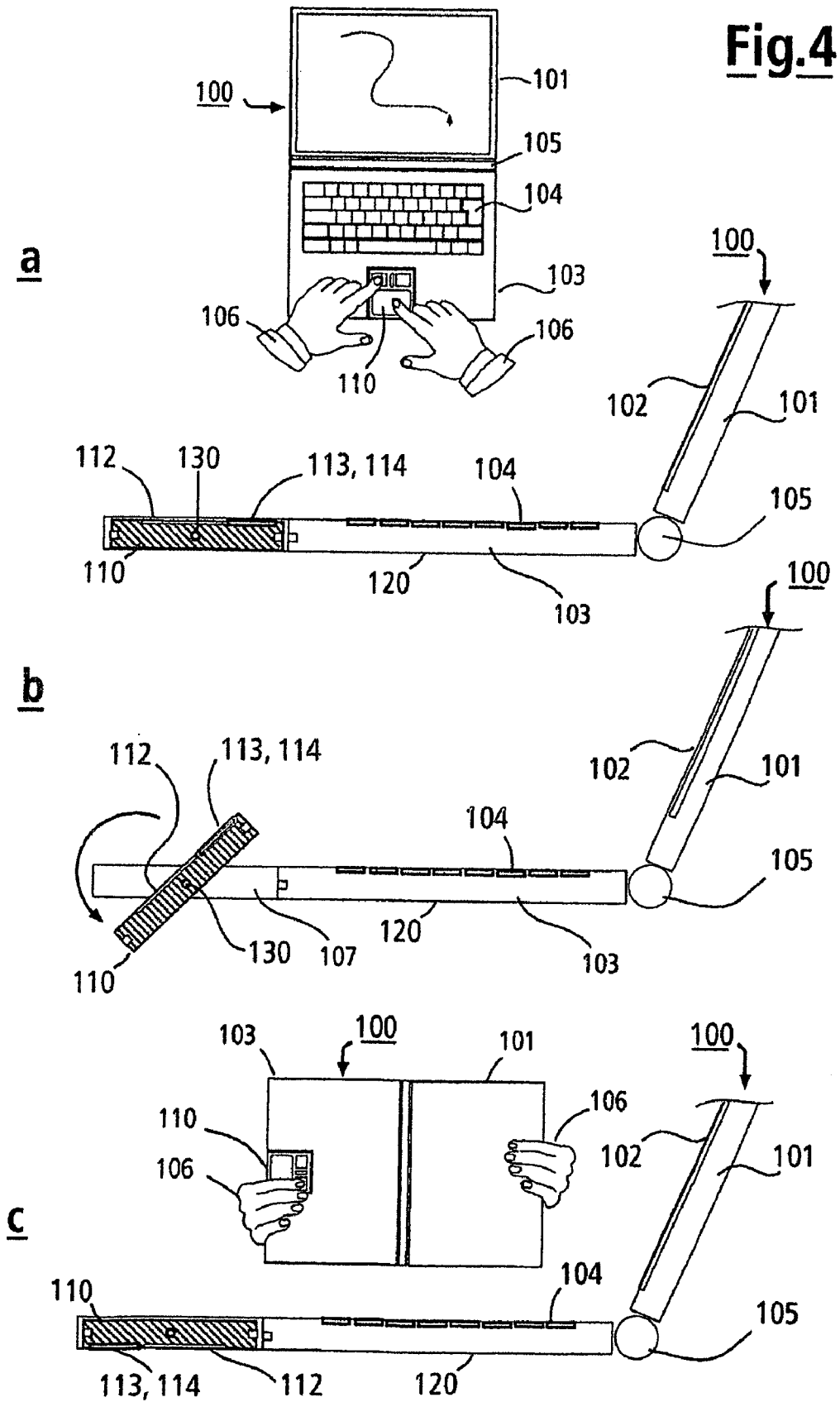
FIGS. 4a-4c are diagrammatic representations of a first advantageous development of the invention according to the first embodiment shown in FIG. 1a-1c.

FIG. 2g4 shows further inventive embodiments, particularly of the input device 110, for improved holding and of a loading bay construction with configuration capability by inserting or removing the input device 110 or other modules (not shown) from the loading bay of the mobile digital computer 100.

FIG. 2g4 a to FIG. 2g4 c show the removal of the input device 110 from an advantageous loading bay 107 of the processor or keyboard part 103 of the mobile digital computer 100. In this arrangement, two possible embodiments are advantageous. To better hold the input device 110 when used as a mouse, for example, two ring-shaped finger supports 111a and 111b which are either permanently arranged at the mouse or can also unfold from the housing of the mouse like scissors, are arranged at the input device 110 (also only called "mouse" in the text which follows). The ring-shaped finger supports 111a and 111b are used so that the hand of the user is better able to hold the input device due to its flat construction or to fix it with the fingers of the holding hand. For this purpose, it is advantageous, as shown in FIG. 2g4 h, to operate the ring-shaped finger supports by means of thumb and ring finger in order to insert the fingertips of the two fingers into the openings provided for the purpose and to operate the keys arranged on the mouse in the conventional manner by means of the index and middle fingers. The ring-shaped finger supports 111a and 111b offer more grip to the mouse-operating hand and stabilize the hand at the input device 110 in such a manner that horizontal movements can be performed without risk of sliding away and weakening torsions of the fingers at the input device 110.

FIG. 2g4 f and FIG. 2g4 g show a first possibility of the ring-shaped finger supports 111a and 111b, supported pivotably in the housing of the input device 110, which can be moved out of the housing 110 for the purpose of a mouse-like operation, the ring-shaped finger supports 111a and 111b being parked in the housing of the mouse or of the input device 110, respectively, in FIG. 2g4 f and the ring-shaped finger supports 111a and 111b being extended out of the housing of the mouse or the input device 110, respectively, in 2g4 g for more comfortable mouse operation.

In this arrangement, it is possible to extend and to retract the ring-shaped finger supports 111a and 111b manually via a suitable mechanism by operating the means provided for the purpose, or to keep the ring-shaped finger supports 111a and 111b extended out of the housing of the input device 110 by means of a spring-like device 111c so that they can be mechanically inserted or pressed into the housing of the mouse for the case of mechanical coupling into the loading bay 107 of the mobile digital device 100 only in the case of a transport, for example in a jacket or trouser pocket. In this case, a latching or holding mechanism (not shown) can fix the two ring-shaped finger supports 111a and 111b until the user detaches the holder by corresponding action. It is also possible for at least a part and/or a part-force of the elastic ring-shaped finger supports to be used for guiding and/or locking the input device 110 in the loading bay 107, provided and constructed for this purpose, of the digital computer 100. In a simple but robust embodiment of the input device 110 or of a mouse with the ring-shaped finger supports 111a and 111b according to the invention, the ring holders are immovably attached to the input device or mouse so that the finger rings of the supports are permanently in the configuration shown in FIG. 2g2 4. This has the advantage that the housing of the input device 110 or of the mouse provides more space for other components and, in addition, susceptibilities due to permanent mechanical loading or contamination are avoided. In addition, the ring-shaped finger supports 111a and 111b can be sensibly used for guiding and locking the input device 110 in the mobile digital device 100. Other embodiments, especially for fixing the fingertips on a particularly flat mouse or with mechanics for increasing the volume of the housing of a mouse for the purpose of obtaining a better grip and operation by hand are possible. The shape, number and arrangement of finger supports are also exemplary and can be implemented in the most varied embodiments. The solution is expressly also related to computer mice which are not an integrated cursor control device 110 for a mobile computer in the sense of the present patent specification.

FIG. 2g4 a to FIG. 2g4 d show a further particularly advantageous development with respect to the digital computer 100 according to the invention and its decoupleable input device 110. For this purpose, a sliding lid 132 is provided which is provided for covering or for closing the loading bay 107. In a state, in which the loading bay 107 in the leaf part 103 is to remain opened for the input device 110 in the digital computer 100, e.g. due to a coupled input device 110 or other coupled modules, the loading bay lid 132 remains on one side next to the loading bay 107 as shown in FIG. 2g4 a and 2g4 b in its initial configuration. In the case where the loading bay 107 is to be closed, either for visual reasons or so that the interfaces (not shown) arranged in the loading bay 107 should not become soiled, the loading bay lid 132 can be pushed over the opening of the loading bay 107 for this purpose. This makes it possible to construct the area 134 becoming free in a particular manner. For example, the closing of the loading bay 107 by means of the loading bay lid 132 makes it possible to release further connector interfaces, operating elements and/or display elements 135 in the area 134 which are either advantageous in the case of a mouse configuration of the system or which are to be kept predominantly hidden due to the rare but necessary use.

FIG. 2g4 d shows a development of the loading bay lid 132 in which an opening in the form of a cable slot, made in the front side edge of the loading bay lid 132, is arranged which enables cable connectors to be coupled in the loading bay opening 107 even in the closed state. Thus, a multiplicity of connector interfaces can be arranged in the loading bay without visually disturbing the user. In addition, the loading bay lid 132 with cable slot is advantageous for the emergency cable coupling capability shown in FIG. 2g1.3 g of the input device 110 to the mobile digital computer 100 for use as mouse, because it is possible that situations occur in which, although there is sufficient space for using the mouse, data communication via radio is not permitted or a, for example, radio link is rendered impossible due to premature flagging of the battery. In a further embodiment, such an emergency cable, e.g. USB cable, is accommodated in a slot constructed for this purpose (not shown), for example next to the loading bay 107, where it can be reached through its opening. The slot can also be arranged below the closing lid 132 (in the open state), where the closing lid, in a closed state, pushes the emergency cable chamber (not shown) into the loading bay area 107 in the manner of a drawer and makes the cable accessible via the loading bay opening 107 on the underside or rear of the leaf part 103. If the cable is to be stowed, the front loading bay lid 132 is pushed over the loading bay 107, the cable inserted into the drawer (not shown) from behind, after which the drawer (not shown) can be pushed back into its basic configuration over the area 134 by pushing back the loading bay lid 132, in order to close the drawer.

FIG. 3 shows a diagrammatic representation of a second embodiment according to the invention, with a single-leaf "tablet PC" 200 in various operating states. FIGS. 3a1 and 3a2 show a tablet PC 200 in a typical application situation, in a diagrammatic quasi-perspective view from the front (from the point of view of the user 206) and from the top, respectively, the user performing with a pressure pen 220 operating processes on a pressure or touch sensitive screen 202 arranged on the front of the tablet PC 200. FIG. 3b1 shows the rear 203 of the tablet PC 200, the user 206 pushing the pressure pen 220 into a pressure-pen receiving chamber 222 in order to stow the pressure pen 220 safely when it is not used. The rear 203 of the tablet PC also exhibits a recess 250 into which an output device 210 can be inserted. In the exemplary embodiment shown, the input device 210 has on the top a slide pad 212 and a first operating key 213 and a second operating key 214 and a jog dial 215. On its underside, the input device 210 contains a roller ball with associated roller ball motion sensors (neither of which are shown) or an optical underground scanning device (not shown) which could in each case also be encountered in a mouse. Furthermore, the input device 210 contains a power source and a battery (not shown) and a suitable electronic circuit (not shown), by means of its functions can be produced. FIG. 3b2 shows the situation shown in FIG. 3b1 from the top.

FIG. 3c1 shows how the user 206 pulls the input device 210 laterally out of the recess 250 in the housing of the tablet PC 200 in order to be able to use it independently. The invention is not restricted to lateral pulling out; for example, a magnetic holder or a locking mechanism can also be provided by means of which the input device 210 can be pulled away from the recess 250 towards the rear. In the simplest case, for example, the input device 210 can be reversibly mounted in the recess 250 by means of a Velcro fastener (not shown). FIG. 3c2 shows the situation shown in FIG. 3c1 from the top.

FIG. 3d1 shows how the user 206 has taken the input device 210 laterally out of the recess 250 in the housing of the tablet PC 200 in order to be able to use it independently as a mouse on a table top. FIG. 3d2 shows the use of the input device 210 as mouse by the user 206. The special embodiment shows a rear arching in the area of the hand grip which enables the tablet PC to be ergonomically held and certain electronic components can be accommodated in the hollow space of the hand-gripping arching, for example for reasons of size and/or trim. This results in the advantage that a mouse (input device 110) parked in the arching area, which can also act as rear operating means, also has the arching and, as a result, enables ergonomically advantageous handling during mouse operation. In addition, larger components can also be integrated in the mouse. From another point of view, a mouse with ergonomic arching can be used as grip-stabilizing means in the hand-held device 100.

FIG. 4 shows a diagrammatic representation of another advantageous further development of the invention according to the first embodiment, shown in FIG. 1, of the portable digital computer according to the invention with a two-leaf notebook digital computer 100 in three different operating states a, b and c. In this development, the input device 110 is tiltably and pivotably arranged in the bay 107 of the processor part 103 of the notebook 100 by means of a tilting shaft 130 arranged essentially in parallel with the hinge unit 105. Mechanical constructions are preferred in which the tilting shaft 130 can be unlatched from the processor part 103, for example by means of latching mechanisms (not shown) pretensioned by a spring, so that the input device—as already shown in FIG. 1—can be completely removed from the bay 107. Due to the tilting shaft 130, the change of configuration illustrated in FIG. 2 can be simplified with regard to the handling for the user 106. FIG. 4a diagrammatically shows the notebook 100 in cross section in a first operating state in which the slide part 112 and the keyboard are arranged on the same side of the processor part 103 as the keyboard 104. In FIG. 4b, it is shown diagrammatically in cross section of the notebook 100 how the input device 110 is tilted about the tilting shaft 130. FIG. 4c shows the second operating state for rear operation with one or more fingers of a hand, holding the notebook 100, of a user 106 in which the operating elements, particularly the slide part 112 and keys 113, 114 are oriented on the side (the underside 120 of the processor part 103) opposite to the side of the processor part 103 on which the keyboard 104 is located. As already described, it can provided in a further embodiment to render mechanically decoupleable the input device 110, which is rotatable via the tilting shaft 130, for example also by means of pulling (not shown) the input device 110 out of the leaf part 103, the tilting shaft 130 being supported in a guide rail (not shown). It is also possible to construct the tilting shaft of several parts elastically (not shown), the tilting shaft being pulled into the input device 110 or the housing of the leaf part 103 similar to a watch wristband fixing (not shown), in order to remove the input device 110.

Figure 5:
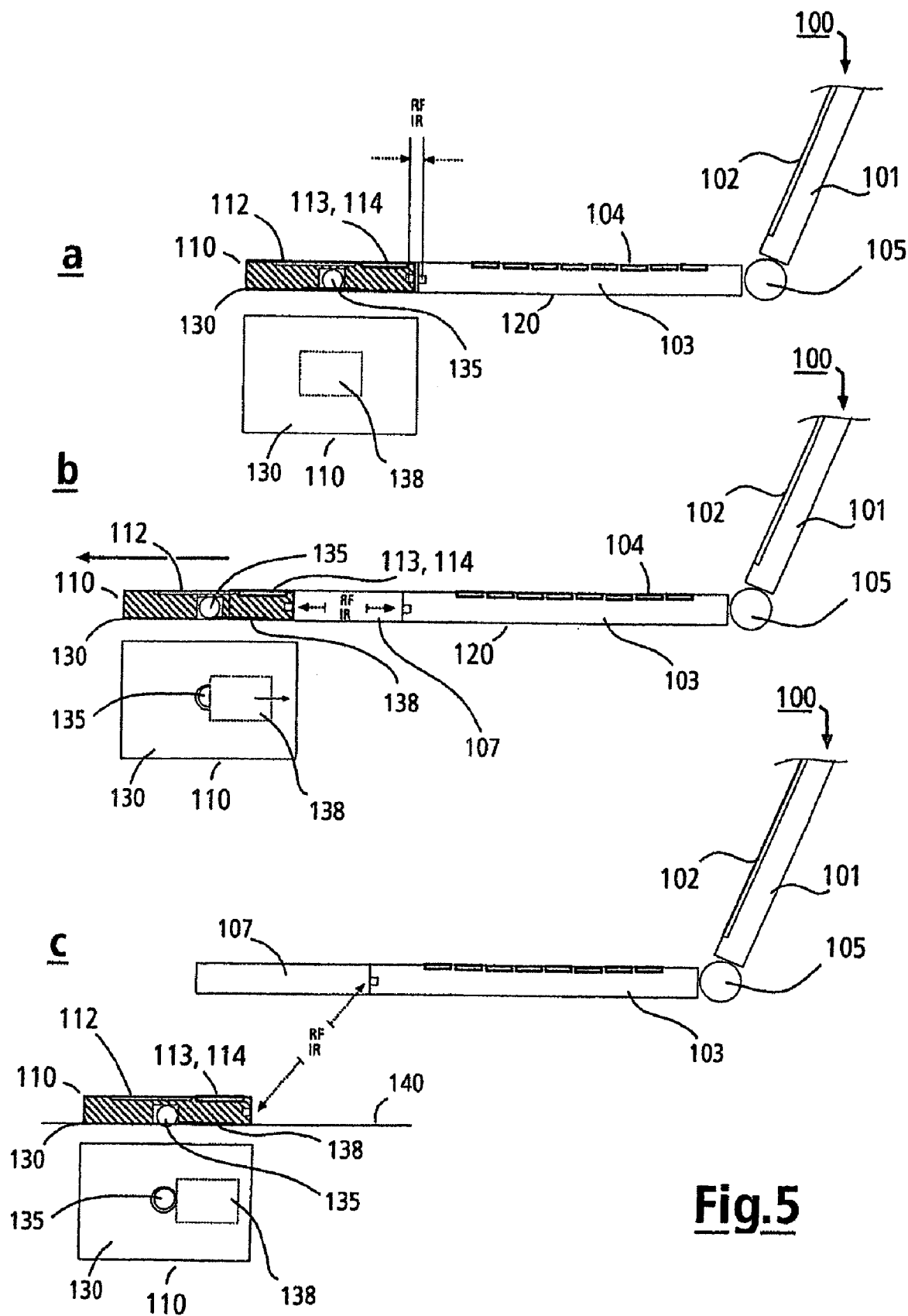
FIGS. 5a-5c are diagrammatic representations of a second advantageous development of the invention according to the first embodiment shown in FIG. 1a-1c.

FIG. 5 shows a diagrammatic representation of another advantageous further development of the invention according to the first embodiment, shown in FIG. 1, of the portable digital computer according to the invention with a two-leaf notebook digital computer 100 in three different operating states a, b and c. FIG. 5 illustrates an arrangement with a mechanical system in the bay 107 of the processor part 103 in which the input device 110 is equipped to be retractable and extendible in the manner of a drawer. FIG. 5a diagrammatically shows a cross sectional view of the notebook 100 with input device 110 pushed in. The input device 110 is provided on its underside 130 with a roller ball device 135. With the input device 110 inserted, the roller ball device 135 is protected against soiling by a protective slider 138. FIG. 5b diagrammatically shows a cross sectional view of the notebook 100 with the input device 110 partially pulled out. The protective slider 138 releases a part of the roller ball device 135. FIG. 5c diagrammatically shows a cross sectional view of the notebook 100 with the input device 110 completely pulled out. The input device is now lying on a level surface 140 in the manner of a mouse, for example a table top. The protective slider 138 completely releases the roller ball device 135. Another embodiment (not shown) provides to construct the underside of the loading bay, which is the rear of the leaf or processor part 103, without penetration, i.e. the rear of the leaf part 103 is a closed surface. Here, too, a lid part (not shown) can be pushed on by means of a pushing device in order to render corresponding input means such as keys, trackball or display visible and/or operable in a further configuration of the input device 110. The advantage of the sliding lid (not shown) lies in the protective effect against soiling or mechanical loads on input means on the side of the leaf part 103 remote from the keyboard, which are arranged at the input device 110 and should be accommodated in the protective housing of the mobile digital computer for transport purposes or when not in use. Naturally, a variant of the embodiment can also provide for a corresponding protective lid to be arranged so that it can be pushed on or off (not shown).

Figure 6:
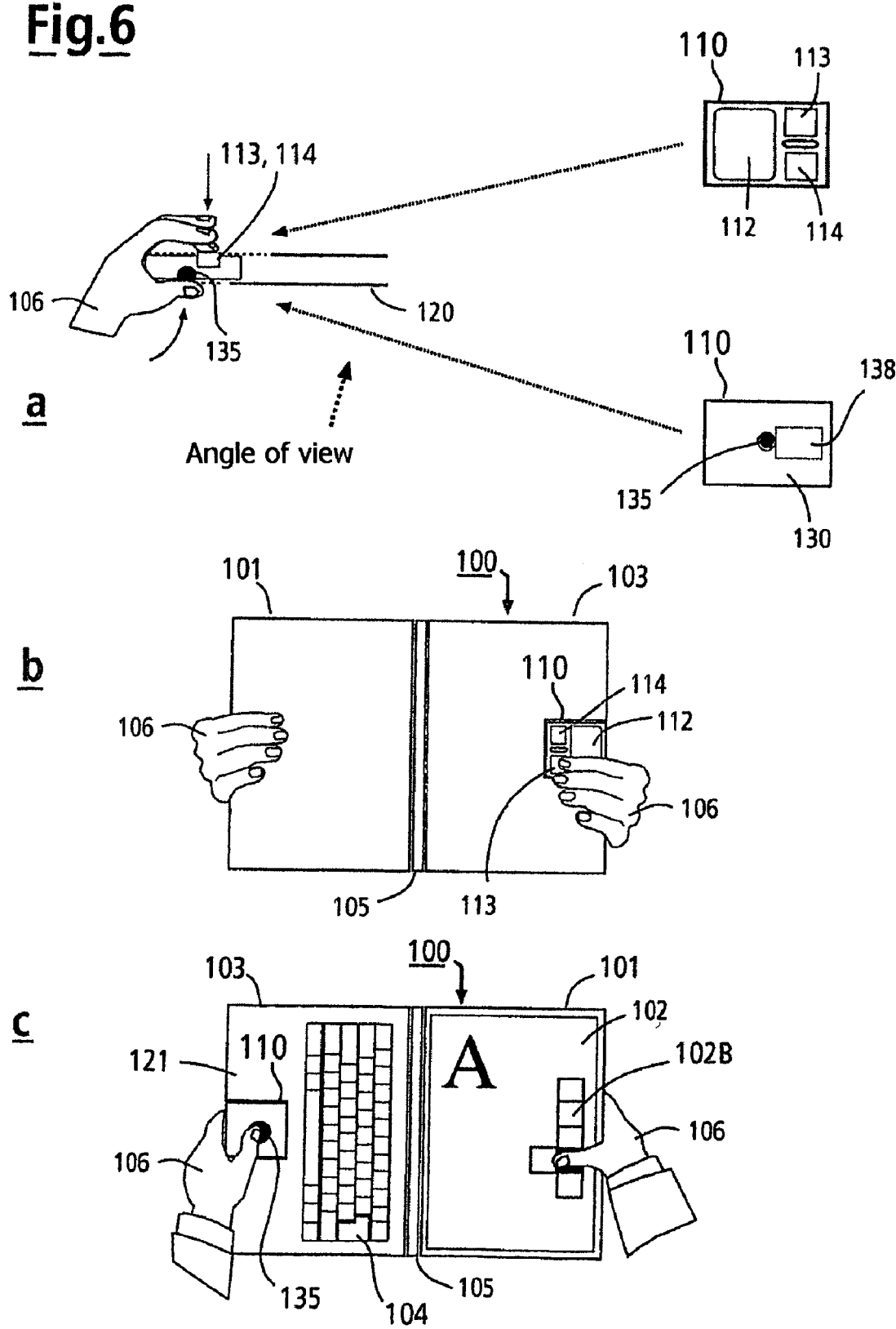
FIGS. 6a-6c are diagrammatic representations of a first aspect of the front and rear operation of the invention according to the first embodiment shown in FIG. 1a-1c.

FIG. 6 shows a diagrammatic representation of a first aspect of the front and rear operation of the invention according to the first embodiment shown in FIG. 5. In a development of the embodiment shown in FIG. 5, the input device 110 can be brought into a second orientation, for example by replugging as shown in FIG. 2 or by tilting as shown in FIG. 4, in which the operating elements, particularly the slide pad 112 and the keys 113, 114 are oriented on the side opposite to the side of the processor part 103 on which the keyboard 104 is located (the underside 120 of the processor part 103). FIG. 6b shows how due to this property, the input device 110 can be operated at the rear with the fingers of a hand 106 holding the notebook 110 when the notebook 110 is held in the manner of a book with the hinge unit 105 oriented essentially vertically. As a result, the roller ball device 135 on the keyboard side 121 of the processor part 103 is then accessible to a trackball-like operation by one or more fingers of a hand of the user 106 holding the notebook 100 as shown in FIG. 6c in order to execute by this means certain operating operations whilst the keys 113, 114 on the rear 120, facing away from the keyboard 104, of the processor part 103 are accessible to an operation by one or more fingers of a hand of the user 106 holding the notebook 100 as shown in FIG. 6b. If the display is constructed as a touch-sensitive, so-called "touch screen display" as shown in FIG. 6c, it is possible to use the other hand of the user 106 which is not operating the input device 110 for carrying out further operating operations on the display in the hand gripping area. For this purpose, for example, a selection information item 102b can be inserted in the hand gripping area of the screen-holding hand in such a manner that it can be selected and operated by means of the thumb of the device-holding hand. Thus, a number of operating operations in addition to paging and/or scrolling pages or inserting selection information (menus) are possible. In another embodiment, it is provided, as will be shown later in FIG. 9c, to also create a possibility for arranging the input device on the rear of the leaf part 101 which is equipped with a screen. Thus, it is also possible to perform the operating operations described above or on an input-sensitive screen by means of the thumb of the device-holding hand, the fingers of the same hand which are arranged on the rear being able to operate the input means, e.g. the keys 113 and 114 of the input device 110. It is expressly pointed out that the operating elements or input means of the input device 110 can also be located on a side edge so that, even if the patent document mentions rear operation, side operation can also be meant. This refers to all exemplary embodiments shown or even just mentioned. As well, input means and interfaces of the most varied function, construction and number can be located on the input device 10 or the mobile digital computer 100.

Figure 7:
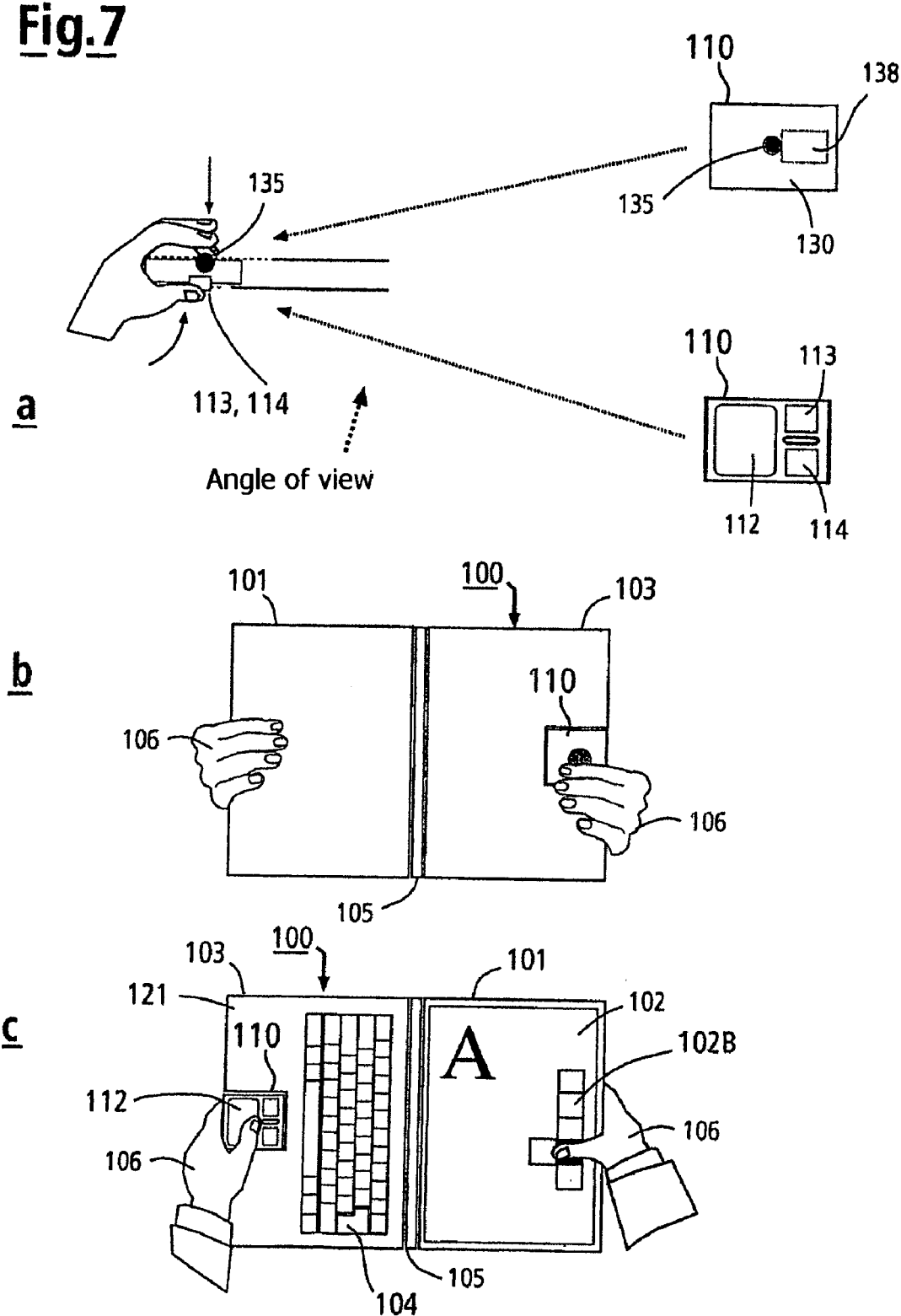
FIGS. 7a-7c are diagrammatic representations of a second aspect of front and rear operation of the invention according to the first embodiment shown in FIG. 1a-1c.

FIG. 7 shows a diagrammatic representation of a second aspect of the front and rear operation of the invention according to the first embodiment shown in FIG. 5, in which, as in FIG. 6, the input device 110 can be operated at the rear with the fingers of a hand 106 holding the notebook 110 when the notebook 110 is held in the manner of a book with essentially vertically oriented hinge unit 105. Compared with FIG. 6, the input device 110 is here inserted in a different orientation into the bay 107 of the processor part 103, in which the operating elements, particularly the slide pad 112 and the keys 113, 114 are oriented on the side opposite to the side of the processor part 103 on which the keyboard 104 is located (the underside 120 of the processor part 103). Here, too, the input device 110 can be operated at the rear with the fingers of a hand 106 holding the notebook 110 when the notebook 110 is held in the manner of a book with essentially vertically oriented hinge unit 105. As a result, the roller ball device 135 on the rear 120 of the processor part 103 is accessible to a trackball-like operation by one or more fingers of a hand of the user 106 holding the notebook 100 whilst the keys 113, 114 on the side 121 corresponding to the keyboard 104, of the processor part 103 are accessible to operation by one or more fingers of a hand of the user 106 holding the notebook 100. If the display is constructed as a touch-sensitive, so-called "touch screen display", it is possible to use the other hand of the user 106, which is not operating the input device 110, for carrying out further operating operations on the display in the hand-gripping area. The possibilities of operation described in FIG. 6, particularly the gripping-hand operation for operating on information items 102b on a screen 102 with input possibilities are similarly possible in this case.

Figure 8:
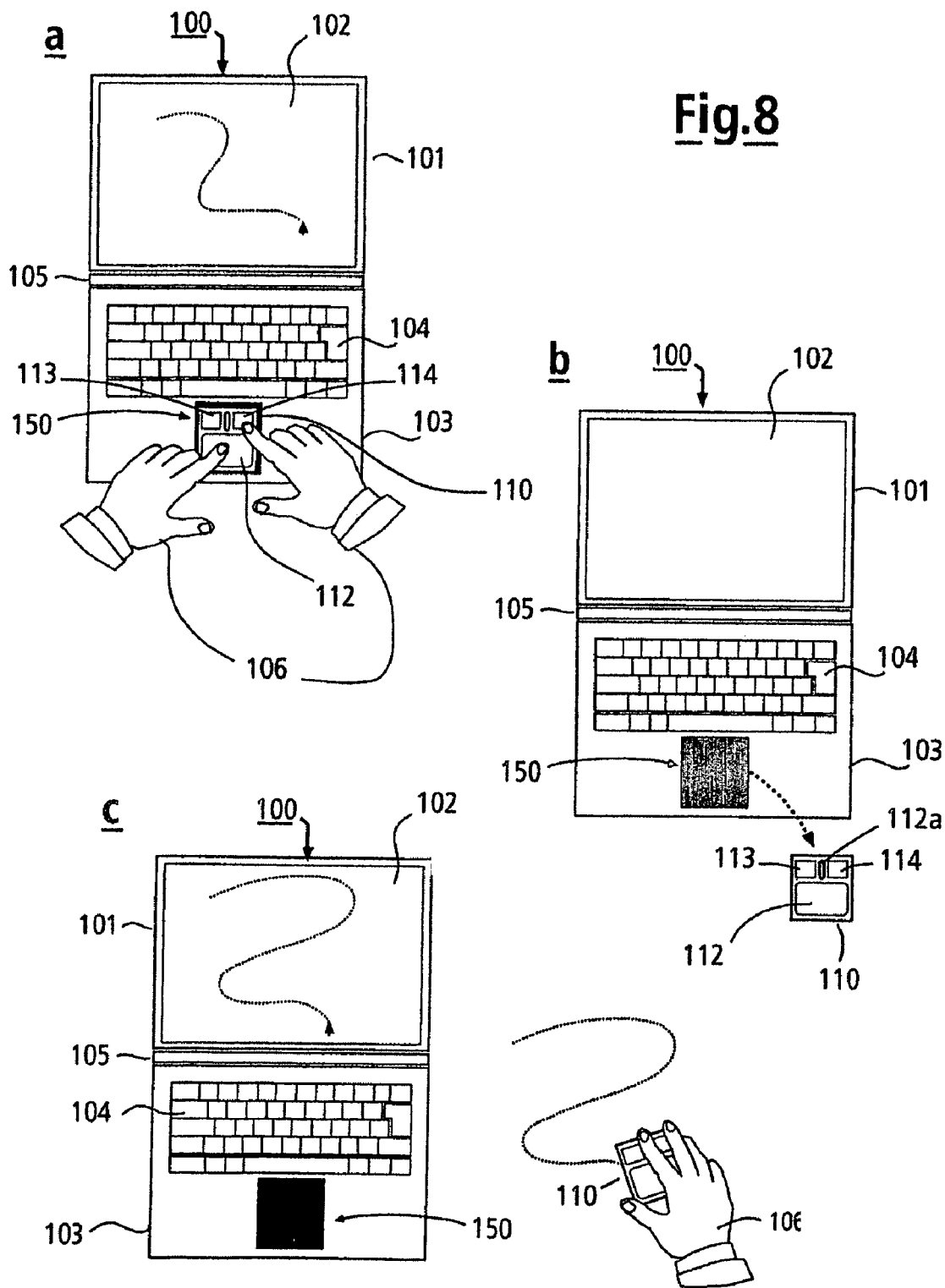
FIGS. 8a-8c are diagrammatic representations of a third embodiment according to the invention with a two-leaf notebook digital computer in three different operating states.

FIG. 8 shows a diagrammatic representation of a further embodiment according to the invention with a two-leaf notebook digital computer 110 in three different operating states a, b and c. FIG. 8 essentially corresponds to the arrangement shown in FIG. 1. The two-leaf notebook 100 comprises a lid part 102 with a display 102 inserted therein, and a processor part 103 with a keyboard 104 arranged thereon. The lid part 102 and the processor part 103 are mechanically coupled with one another by means of a hinge device 105 so as to be capable of being opened and shut in the manner of a book. The processor part 103 comprises in its interior system components, not shown in greater detail, such as a main board with a central processing unit, with working and mass storage and other components customary for a notebook. As generally customary in notebooks, the display 102 is electrically connected to the electronic component in the processor part 103 through the hinge unit 105.

The housing of the processor part 103 exhibits in its area facing away from the hinge unit 105 and facing towards the user 106 a receptacle 150 which, for example, is set up as a deepening in the keyboard side of the processor part 103 for receiving an input device 110. In the exemplary embodiment shown, the input device 110 has on its top a slide pad 112, a jog dial 112a and a first operating key 113 and a second operating key 114. On its underside, the input device 110 contains a roller ball with associated roller ball motion sensors (neither of which are shown) or an optical underground scanning device (not shown) which could also be encountered in a mouse in each case. Furthermore, the input device 110 contains a power source like a battery (not shown) and a suitable electronic circuit (not shown) by means of which the functions described in the text which follows can be produced.

When the input device 110 is inserted into the receptacle 150 as shown in FIG. 8a, the input device 110 can be locked in this receptacle 150 by means of suitable latching devices (not shown). The latching device can comprise mechanical latching devices such as, for example, one or more latching noses or other elements like permanent magnets. In this operating mode, shown in FIG. 8a, the user 106 can influence the notebook 100 for operating the slide pad 112, the jog dial 112a and/or the keys 113, 114.

The processor part 103 and the input device 110 in each case exhibit a suitable device for wireless data transmission (not shown) such as, for example, a device for transmitting data via a short-range radio link (for example according to the Bluetooth standard, etc.) or a device for transmitting data via an infrared link (for example according to the IRDA standard).

It may be provided that, in the operating mode shown in FIG. 8a, the processor part 103 and the input device 110 are electrically coupled to one another by means of at least an electrical plug-in connector device (not shown) or other suitable contact arrangements (not shown) in order to feed the information signals resulting from the operating processes of the user 106 to the components arranged in the processor part 103. In this operating mode, the power supply of the input device 110 can be handled by the processor part 103 through the plug-in connector device or through other contact arrangements.

If, as shown in FIG. 8b, the input device 110 is detached from the processor part 103 and taken out of the receptacle 150, the user 106 can use it in the manner of a mouse as shown in FIG. 8c. The motion signals generated by the roller ball sensors or by the optical scanning device, respectively, and signals which indicate an operation of the keys 113 and/or 114, are transmitted via the device for wireless data transmission (not shown) to the processor part 103 and are there evaluated like conventional mouse signals.

After it has been used, the user again locks the input device 110 in the receptacle 150 of the processor part 103, as shown in FIG. 8a, for the purpose of transport. Here, too, it is possible to construct the rear of the housing, i.e. the side facing away from the keyboard, with a window opening (not shown) which, in another embodiment, can be closed by means of a sliding lid (not shown) or a flap or a coupleable lid for visual reasons and for protecting input means.

Figure 9:
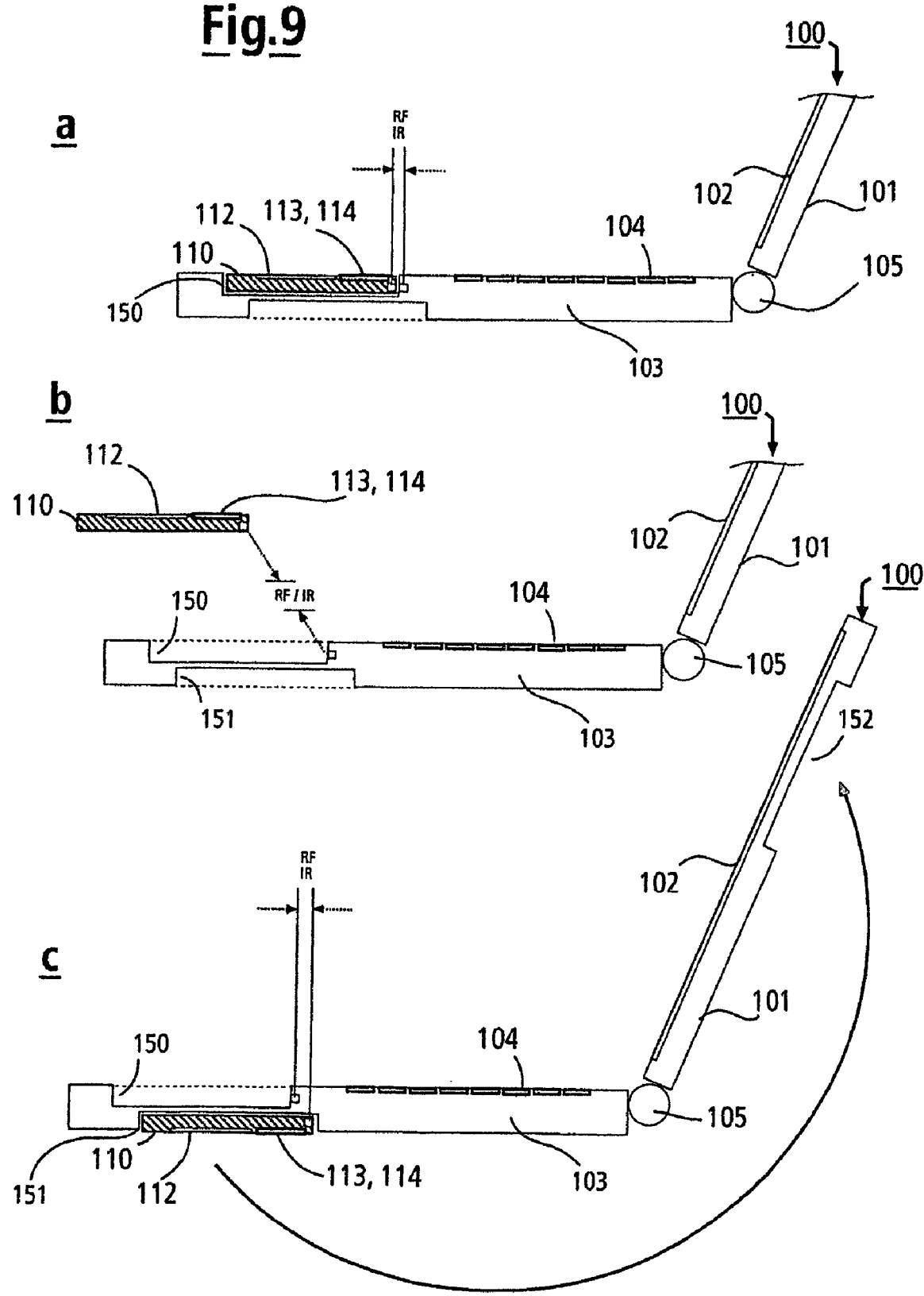
FIGS. 9a-9c are diagrammatic representations of a first advantageous development of the invention according to the third embodiment shown in FIG. 8.

FIG. 9 shows a diagrammatic representation of a first advantageous development of the invention according to the third embodiment, shown in FIG. 8, of the portable digital computer according to the invention, with a two-leaf notebook digital computer 100 in three different operating states a, b and c. In this development, the input device 110 can be mounted in the rear of the processor part 103 or of the lid part 101, respectively, by means of a second receptacle 151 or a third receptacle 152.

FIG. 9a diagrammatically shows the notebook 100 in cross section in a first operating state in which the input device 110 is inserted in the first receptacle 150 so that the slide pad 112 and the keys are arranged on the same side of the processor part 103 as the keyboard 104. FIG. 9b diagrammatically shows in a cross section of the notebook 100 how the input device 110 is taken out of the first receptacle 150. FIG. 9c shows the second operating state for rear operation with one or a number of fingers of a hand of the user 106 holding the notebook 100, in which the operating elements, particularly the slide pad 112 and the keys 113, 114 oriented on the side opposite to the side of the processor part 103 on which the keyboard 104 is located (the underside 120 of the processor part 103). In this arrangement, the input device can be inserted into a second receptacle 151 in the rear 120 of the processor part or into a third receptacle 152 in the rear of the lid part 101.

Figure 10:
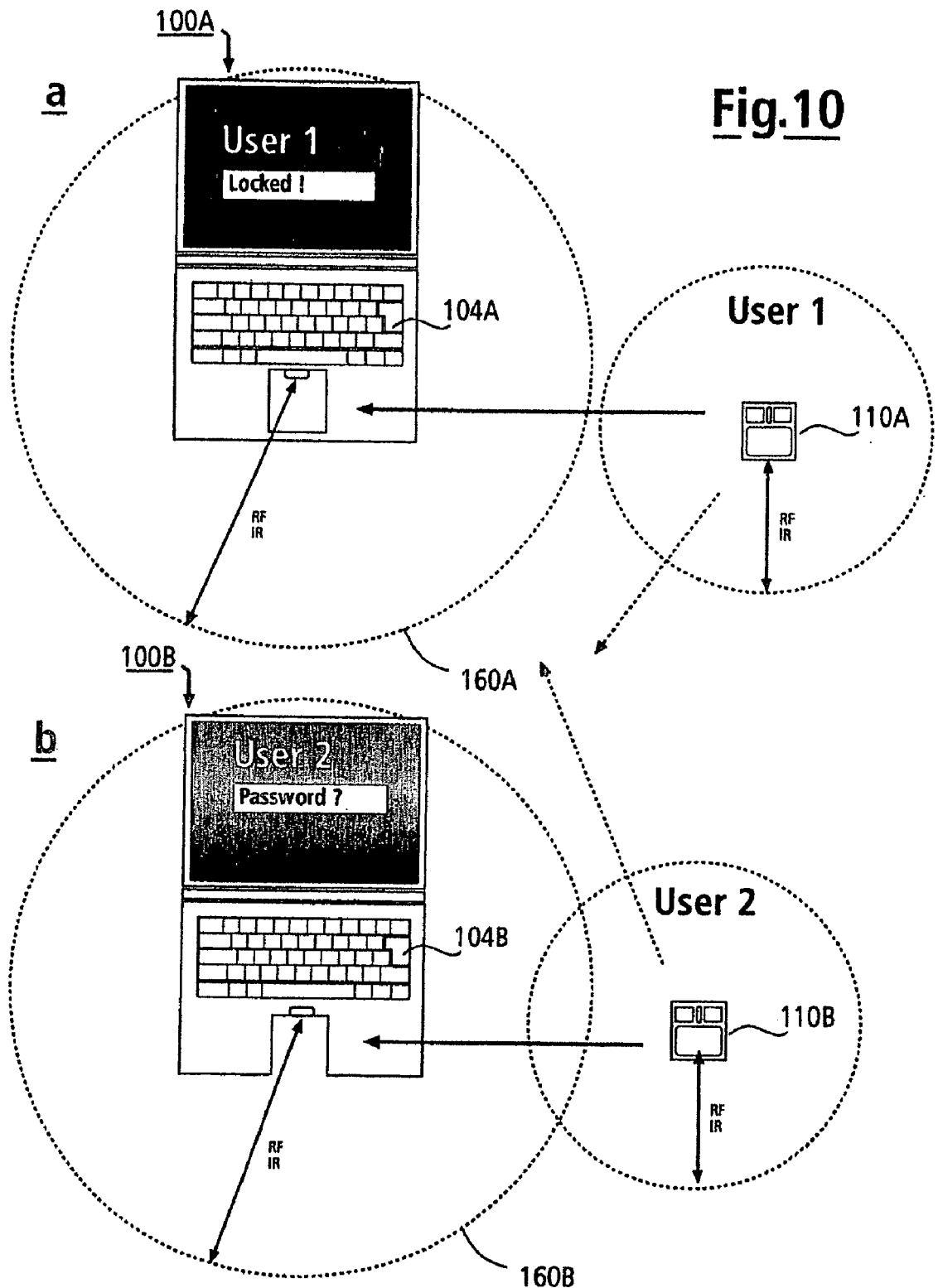
FIGS. 10a & 10b show a first development of the solution according to the invention, in which the input device is provided with an electronic device for user identification and/or user authentication.

FIG. 10 shows a first development of the solution according to the invention, in which the input device 110 is provided with an electronic device for user identification and/or user authentication. In the example shown, a first notebook 100A made in the manner shown in FIG. 8, and a second notebook 100B made in the manner shown in FIG. 1, is shown. With regard to the two notebooks 100A, 100B, it is assumed that the user has been absent for a time and the respective operating systems of the notebooks 100A and 100B, respectively, are holding the respective keyboards 104A and 104B until the authorized user has again authenticated himself. In a further development of the invention, this authentication can occur in such a manner that an input device 110A, 110B is used as authentication token for authenticating the authorized user. If the user wishes to leave his notebook for a period, for example in order to take a refreshment, he can simply take along the relatively small and compact input device 110A, 110B. Due to their hardware and software, the notebooks 100A, 100B are constructed in such a manner that the keyboard 104A and 104B, respectively, is automatically blocked as soon as the respective input device 110A, 110B has been removed from the maximum range 160A, 160B of the short-range cableless data link (for example by radio or by infrared). The respective notebook 100A, 100B must be put into a position so that it can reliably authenticate the respective input device 110A and 110B belonging to it. The expert knows technical means by means of which this can be achieved. For example, "challenge-response" methods can be used for authenticating the input devices 110A, 110B. It is also possible to implement more complex mathematical schemes. For example, a number of input devices of various users can be known to a single mobile digital computer so that various users can be identified and authenticated by the input device in each case carried by him. As a precaution, it is pointed out that other possibilities of identification of the input module or modules are possible, the only deciding factor is that the mobile digital computer 100 recognizes the decoupled input device 110 or the input devices (not shown) or, respectively, a module (not shown) predetermined for this purpose, and responds in accordance with predetermined rules. This can include the following: logging certain processes authorizing for utilizing at least a part-area of possible functions, documents and/or applications, prohibiting (blocking) possibilities of use, setting up the user interfaces in accordance with preset user profiles, immediately informing the authorized person about attempts at misuse, e.g. via SMS, e-mail, a call, e.g. via pager, or simply only warning him by means of loud signaling tones. In the case of extremely security-related information items, deleting corresponding data or secrets and possibly also destroying memory components (not shown) or other software and/or hardware parts (not shown) can even be considered if required. The target group of these users could include the military, research laboratories, secret services and also managers of undertakings which want to avoid economic espionage, company espionage or even national espionage. In daily use, too, especially in the private area, there are information items in the case of which it may be undesirable or even unpleasant and embarrassing if, after briefly leaving one's notebook, an unauthorized person gains access to one's stored or displayed data.

In this context, other possible embodiments are of significance:

In the input device, a data memory is advantageously arranged in which confidential information or secrets can be stored. This has the advantage that the user protects not only his digital computer by the solution described above against the access of unauthorized persons but, at the same time, keeps his data with him by taking along the relatively flat mouse. Via the USB solution, described previously by way of example, a simple connection of the data memory (not shown) is possible even when other computers (not shown) are currently operating, if they are not equipped with the same system for wireless communication and/or identification or the user has not been registered on the required computer. For this purpose, directly inserting the input device 110 into the USB port of an outside device (not shown) may be possible, or the input device 110 can be connected to the corresponding USB port of the outside computer (not shown) by means of a, e.g. USB cable. Naturally, it may not be possible to read out a security area (not shown) which may have been set up, in the case of a simple cable connection via the aforementioned cable, if this is not wanted by the user or owner of the input device 110 for controlling a cursor. Other constructions as USB are also possible.

By appropriately designing the input means (not shown) and by appropriately designing the mobile digital computer 100, the input device 110 can also be used as locking unit (not shown) in order to keep a two-leaf mobile computer closed both with respect to hardware and to software. The locking mechanism (not shown) is advantageously contained here in the input device 110 for cursor control since this locking mechanism would represent a special form and would increase the costs of a series-produced mobile digital computer. As already described in earlier Figures, the input device can thus be subsequently marketed with locking mechanism if required by a corresponding number of potential users. The construction in FIG. 2g1.1 and FIG. 2g2, described above, can be advantageously used for this purpose since the latching nose of a foldable leaf part of the mobile digital computer into the latching recess of the coupled input device can be used for locking lid and input device. The latching nose from FIG. 2g2 can be relatively simply locked in the housing of the input device by a suitable mechanism from the prior art. The locking can be produced automatically during the closing of the mobile digital computer or also after a corresponding input in the digital computer or after an input into the input device. Conversely, the locking mechanism can also be opened by a corresponding input. The loading bay opening (FIG. 2g1.1 and FIG. 2g2) of the digital computer 100 can be advantageously used for making inputs into the input device 110 even in the closed state of the two-leaf digital computer, if this input device, in turn, is equipped with corresponding input capabilities. This includes, for example, at least input means such as keys for inputting a security code or a PIN number, respectively, or a password (not shown) and/or an input display for inputting by means of screen pen (not shown), the input means being arranged on the rear of the input device in accordance with the trackball 135 shown in FIG. 5.

For all solutions described above, it holds true that, when a corresponding security system has been installed and activated, effective connection or utilization of other data interfaces at the digital mobile device is not possible or only in a restricted manner (not shown) after activation of the blocking mode (not shown).

Figure 11:
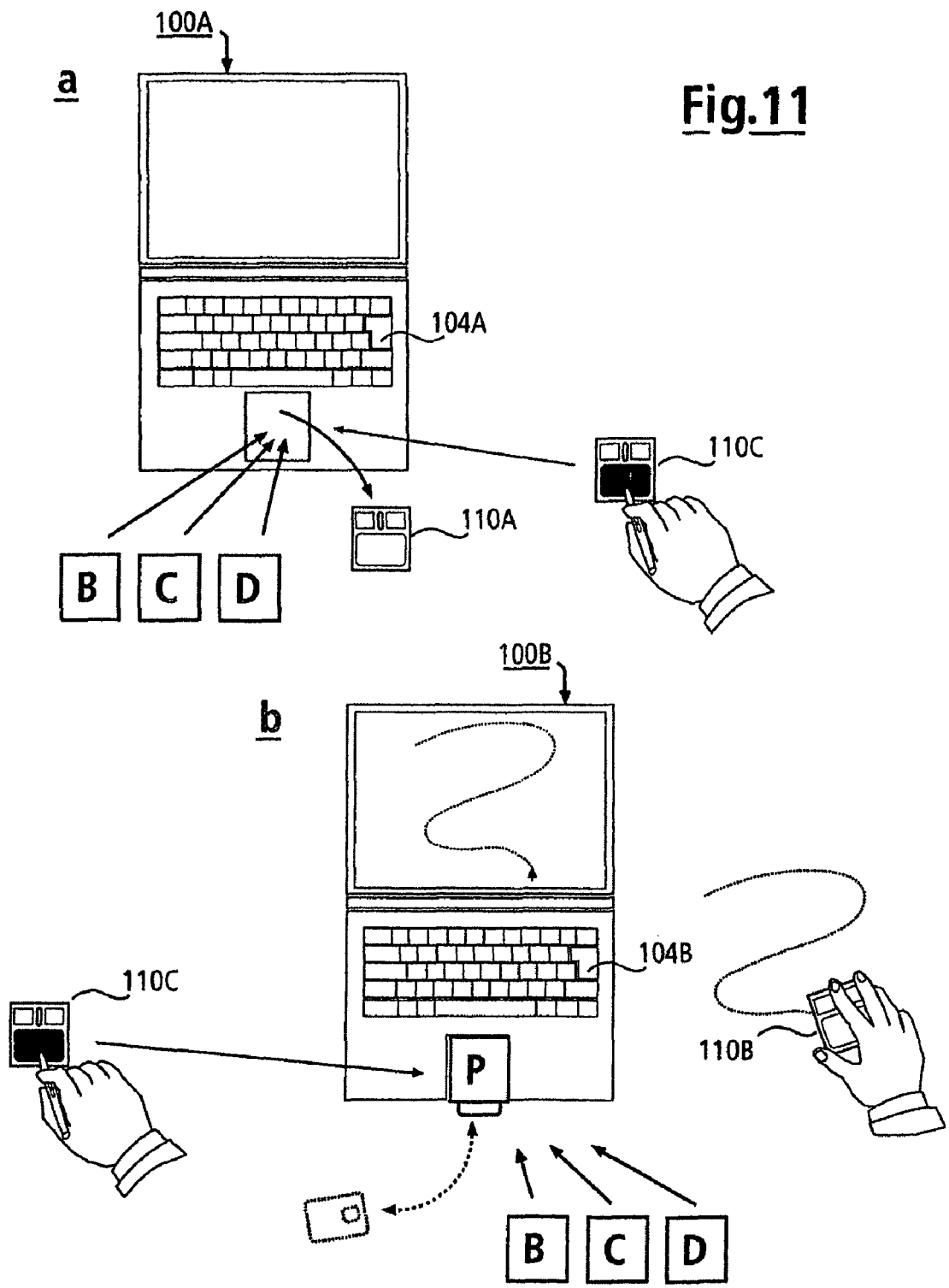
FIGS. 11a & 11b show a second development of the solution according to the invention, in which the input device is provided with an electronic device for user identification and/or user authentication.

FIG. 11 shows another further development of the solution according to the invention illustrated in FIG. 10, in which the input device 110A, 110B is provided with at least one additional-function module, for example an electronic device for user identification and/or user authentication. Furthermore, other modules can be provided, for example a special module B with a joystick (not shown), a special module C with a different design of slide pad and keys (for example a three-key slide pad for Linux users) or a trackball module D. As well, a chip card receiving module P can be provided. Other modules from the prior art are also possible, for example adapter cards for storage modules, for network connections and other system expansion modules. It is also possible, especially, to use modules with or without mouse functions for receiving and/or sending satellite signals (information). Other telecommunication modules (GSM, modems, GRPS, ISDN, UMTS etc. pp.) or position locating modules (GPS, Galileo) can also be used. As well, mobile radio telephones, PDAs, remote controls and other mobile devices as well as USB or firewire interface modules can be used or coupled.

For example, it is possible to control selection functions via a display module to be coupled, with pen and/or key input 110c, for example in a telephone or plant directory, in such a manner that the coupled mobile digital device 100 or the like carries out and/or displays on the display corresponding processes. Naturally, a large variety of possible embodiments are conceivable, thus, each of the enumerated modules can be constructed in a supplementary manner with or without cursor control input means or with other functionalities. Accordingly, certain functions and functionalities of the modules mentioned (not shown) can be constructed and arranged in supplementary manner in the input device 110.

FIG. 12 shows another development of the solution according to the invention, in which the portable digital computer is provided with a removable keyboard. In FIG. 12a, a notebook 100 generally made in accordance with the type shown in FIG. 1, exhibits a keyboard receptacle 160 in which the keyboard 104 is removably inserted. The keyboard 104 is connected to the processor part 103 via a cableless data transmission link (not shown) so that keyboard stroke signals can be transmitted to the processor part 103. FIG. 12b diagrammatically shows working with the notebook shown in FIG. 12a with a mechanically decoupled keyboard 104 and mechanically decoupled input device 110. It is also possible, after mechanically decoupling keyboard 104 and input device 110 from the mobile digital device 100, to connect these by means of cables in order to use, if necessary, a common power source in the keyboard 104 or in the output device 110 and, if necessary, also to combine the cableless data communication. If required, for example with a flagging of the battery, the keyboard and/or input device can also be connected to the mobile digital computer via a preferably USB or firewire cable. The interfaces necessary for this are described in earlier Figures, particularly in FIGS. 2g1.1 and 2g1.2. The interfaces at the keyboard 104 for connecting to the input device 110 and/or the mobile digital computer are not shown, but do not need any further discussion, particularly in the case of USB or firewire design, since such keyboards are known from the prior art with respect to personal computers.

Figure 13:
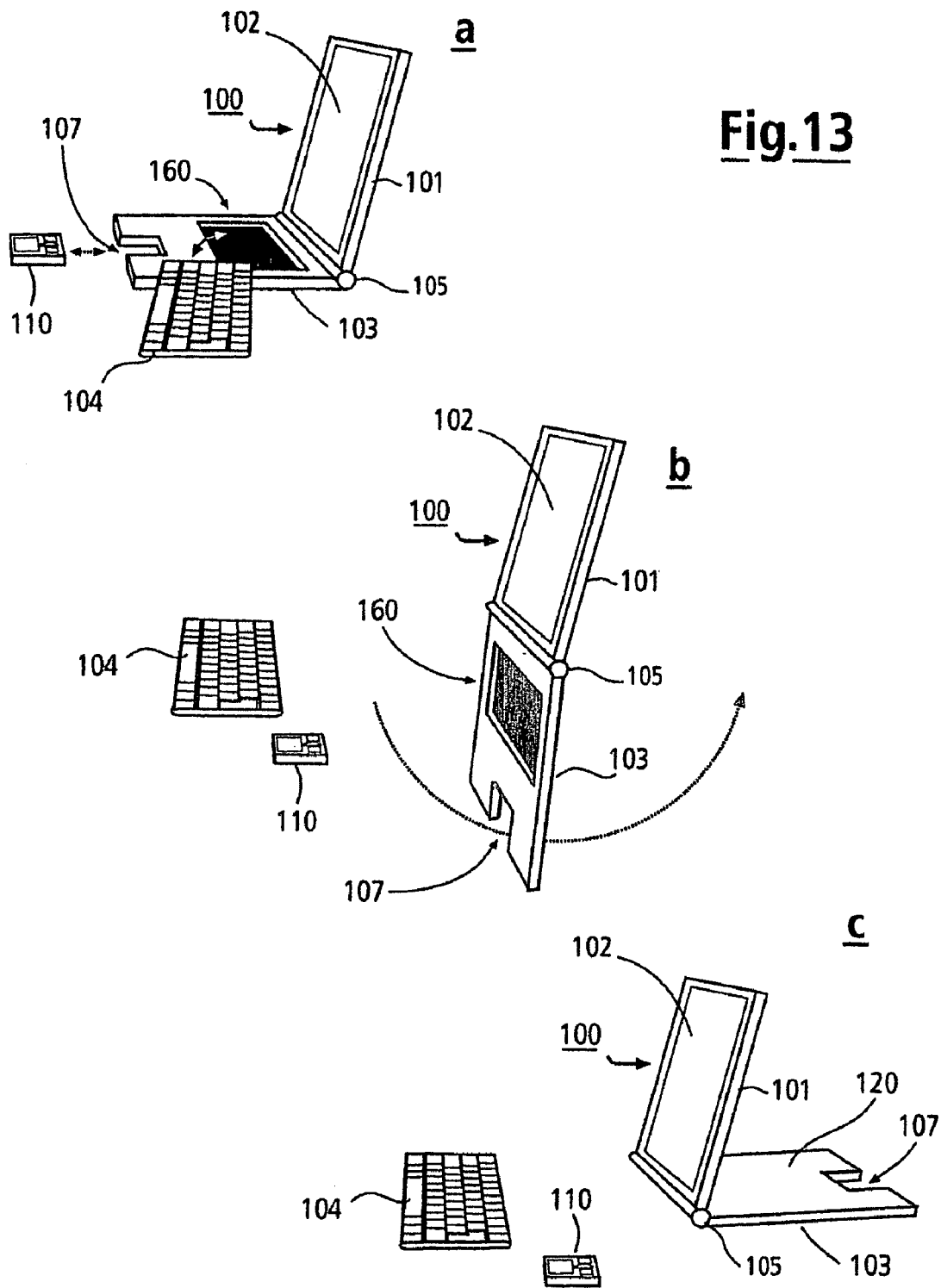
FIGS. 13a-13c are diagrammatic perspective representations various operating states of the embodiment shown in FIG. 12a-12b.

FIG. 13 shows a diagrammatic perspective representation of various operating states of the embodiment shown in FIG. 12 and, in particular, illustrates the transition from the state shown in FIG. 12a in which the input device and the keyboard are mechanically decoupled, to the final operating state shown in FIG. 12b. By opening the notebook 100 about the hinge device with an angle of distinctly more than 180°—as shown in FIG. 13b—the notebook can be placed into a state which is illustrated both in FIG. 12b and in FIG. 13c, in which the keyboard side of the processor part 103 is resting on a level base, for example a table top, the hinge unit 105 resting on the table top in parallel with the table top and the lid part with the display 102 standing upright inclined perpendicularly or slightly to the rear 120 of the processor part 103 so that the user can comfortably recognize the contents shown on the display 102.

FIG. 14 shows in a diagrammatic perspective representation various operating states of a development of the embodiment shown in FIG. 12. In this context, the operating state shown in FIG. 14a1 corresponds to the situation illustrated in FIG. 12b, and FIG. 14a2 corresponds to FIG. 13c. A further development then consists in that the notebook 100 is set up in such a manner that it can stand on a level surface, for example a table top even with the hinge unit 105 essentially set perpendicularly—as can be seen in FIG. 14b1 from the point of view of the user and in FIG. 14b2 from a side view. Another development consists in that the notebook automatically adapts the representation of the content displayed on the display unit 102 to whether the operating mode shown in FIG. 14a1 or the operating mode shown in FIG. 14b1 prevails. For this purpose, the processor unit 103 can be equipped with one or more gravity switches.

FIG. 15 shows a perspective view or, respectively, a top view of another embodiment of the solution according to the invention for a two-leaf notebook digital computer 100 with a display part 101, a keyboard part 103 and with a multi-functional coupling bay 107 into which an input device 110 according to the invention can be inserted. In this arrangement, FIG. 15a represents a perspective view of the notebook digital computer 100 with the input device 110 removed, whereas FIG. 15b shows a diagrammatic top view of the keyboard part 103 and the input device. The special feature of this embodiment consists in that in at least one wall of the coupling bay 107, at least one further electrical interface 1501a, 1501b, 1501c, 1501d is provided, for example in a side wall 107a, 107b of the coupling bay 107. The at least one electrical interface 1501a, 1501b, 1501c, 1501d can be constructed, in particular, as electrical plug-in connector arrangement for connecting one or more cables provided with one plug each. The cables can lead, for example, to a periphery device such as a scanner or printer or the like.

Figure 16:
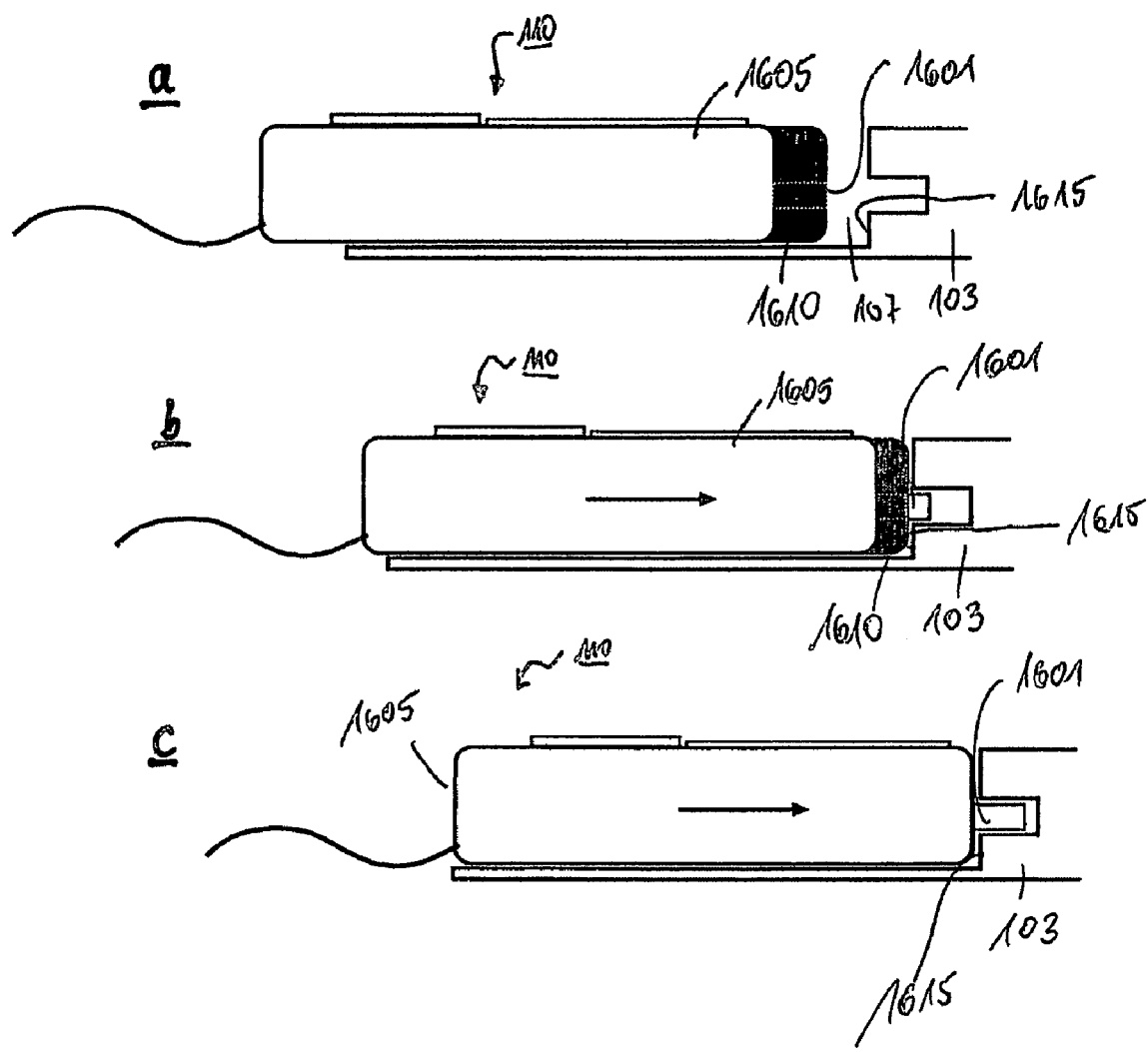
FIGS. 16a-16c are diagrammatic cross-sectional views of a development of a solution according to the invention with an improved electrical plug-in connector interface.

FIG. 16 shows a diagrammatic cross sectional view of a development of a solution according to the invention for an input device 110 according to the invention with an improved electrical plug-connector interface. When an input device 110 according to the invention is constructed with a protruding electrical plug connector device 1601, there is the problem that the plug connector device 1601 mechanically protrudes from the housing 1605 of the input device depending on the type of construction of the electrical plug-connector device. To solve this special problem, it is proposed to provide the input device with a suitably shaped and elastically mounted covering shield 1610 which mechanically covers the electrical plug connector device 1601 when the input device 110 is located outside the coupling bay 107 and mechanically elastically retreats when the input device 110 is inserted into the coupling bay 107 and, at the same time, allows the electrical plug connector device 1601 to mechanically project outwards. FIG. 16a shows a correspondingly developed input device 110 in a first phase of inserting the input device 110 into the coupling bay 107. In this phase, the covering shield 1610 is still completely extended and completely covers the protruding plug-connector device 1601. FIG. 16b shows a second phase of the insertion of the input device 110 into the coupling bay 107. In this phase, the covering shield 1610 abuts against an end-side wall 1615 of the coupling bay 107 and is pushed back into the housing 1605 for a distance. FIG. 16c shows a third phase, concluding the process of insertion, of inserting the input device 110 into the coupling bay 107 in which the covering shield 1610 is essentially completely pushed into the housing 1605 due to the counterpressure of the end-side wall 1615 of the coupling bay 107.

FIG. 17 shows a top view of a further embodiment of the solution according to the invention with a two-leaf notebook digital computer 100 and a two-part input device 110. FIG. 17a shows the developed two-part input device 110 according to the invention, inserted into the coupling bay 107, whereas FIG. 17b shows the scenario shown in FIG. 17a when the two-part input device 110 has been taken out of the coupling bay 107 of the notebook digital computer 100. The two-part input device 110 comprises a first part 110a, which, as a rule, is located at the bottom, and a second part 110b which can be placed on or inserted on this first part 110a. In particular, the first part can be equipped in the manner of a charging shell and is then mechanically equipped in such a manner that the second part 110b can rest on the first part 110a or even accommodate it by the first part 110a in the manner of a shell. As an alternative, the top of the first part 110a can also be provided with an outward-arching (not shown) which is met by a corresponding inward-arching in the second part 110b. In this last-mentioned variant, it is possible to select the constructional height of the second part 110b essentially to be of the same height as the height of the keyboard part 103 of the notebook 100 which can significantly improve the handling of the second part 110b for a user, particularly with slender notebooks of small constructional height. The second part 110b can be functionally constructed, in particular, as a mouse, slide pad or the like. In a preferred embodiment, the two parts 110a, 110b are provided with electrical contacts (not shown in FIG. 17), by means of which the two parts 110a, 110b can be coupled with respect to power supply and/or electrical signals when the second part 110b is resting on the first part 110a. For example, the first part 110a can be constructed as power-supplying charging shell. FIG. 17b shows such a variant in which the first part 110a is connected to the keyboard part 103 of the notebook 100 by means of a cable 1701 in order to provide the power supply for the input device 110. Instead of the electrical contacts (not shown in FIG. 17), the two parts 110a, 110b can also in each case have an induction coil via which the electrical energy and/or data signals are transmitted when the second part 110b is resting on the first part 110a. FIG. 17c shows the scenario shown in FIG. 17b where the second part 110b has been taken off the first part 110a in order to be used, for example, as slide pad or mouse by the user (not shown). The position data can be transmitted, in particular, either wirelessly from the second part 110b—for example by radio or infrared transmission— directly to the notebook 100 or first wirelessly from the second part 110b to the first part 110a, where the data can be transmitted via the cable 1701 to the notebook 100 in the last-mentioned case.

In a preferred embodiment, the input device 110 can be used with its two parts 110a, 110b both in the state inserted in the notebook housing 103 and in the removed state (FIG. 17c) by a user (not shown).

FIG. 18 shows a cross sectional view of the two-part input device 110 from FIG. 17. In FIG. 18a, the second part 110b of the input device 110 is resting on the top of the first part 110a of the input device 110. The first part 110a and the second part 110b are electrically connected to one another by electrical contact pairs 1801, 1802. In differing embodiments, another number of contact pairs can also be provided. FIG. 18b reproduces the scenario shown in FIG. 18a when the second part 110b has been taken off the first part 110a. A roller ball or optical unit 1805 enables relative changes in location of the second part 110b with respect to a level surface (not shown) to be detected.

FIG. 19 shows a top view and, respectively, a diagrammatic cross sectional view of a notebook digital computer 100 according to the invention with a development of a two-part input device 110 from FIG. 17. FIG. 19a shows a diagrammatic top view of a keyboard leaf 103 of a notebook 100 with an input device 110 inserted into a coupling bay 107 which is partly inserted into the coupling bay 107 in the illustration. FIG. 19b shows a cross sectional view corresponding to FIG. 19a. In the development shown, the two-part input device 110 is equipped in such a manner that with the first part 110a and second part 110b assembled, the resultant external form of the entire input device 110 exhibits external side walls 1901a, 1901b which are convexly arched outward. The corresponding side walls 1910a, 1910b of the coupling bay 107 exhibit a corresponding concave inward arching. As a result, the input device 110 is mechanically reliably guided during inserting and removal into/out of the coupling bay 107 without the coupling bay 107 having to exhibit an upper and/or lower wall in order to prevent the input device from falling out. As a result, it is possible, in particular, for the entire height of the keyboard part 103 of the notebook 100 to be selected as constructional height of the input device 110. Naturally, this feature can also be applied to one-part input devices 110. Furthermore, instead of the outward-arching of the input device, shown in FIG. 19 and also ergonomically advantageous, a different type of tongue/groove combination can be used in the side walls 1901a, 1901b of the input device 110 and in the side walls 1910a, 1910b, respectively, of the coupling bay. The outward-arching of the input device shown provides for an advantageous gripping with the hand of a user (not shown).

FIG. 20 shows the notebook digital computer 100 according to the invention from FIG. 19 with input device 110 inserted (FIG. 20a) and pulled out (FIG. 20b), respectively. In FIG. 20b, an electrical interface 2010 can be seen at the end wall of the coupling bay 107.

FIG. 21 shows a development of the notebook digital computer 100 according to the invention from FIG. 19 with a first part (under part), coupled to the end wall of the coupling bay 107 of the notebook digital computer 100 through a cable 2101, of the input device 110, the input device 110 having been removed from the coupling bay 107 and the second part (top part) 110b also having been taken off the first part 110a.

FIG. 22 shows a development of the notebook digital computer 100 according to the invention from FIG. 19 with an input device 110 which can be turned over. FIG. 22a functionally corresponds to the representation in FIG. 20a. In FIG. 22b, two electrical interfaces 2201a, 2201b arranged symmetrically on the end wall of the coupling bay 107 can be seen with the input device 110 removed, in comparison with FIG. 20b. As shown in FIG. 22c, this makes it possible that the input device can be operated even in the turned-over position by a user (not shown) which, for example, enables a notebook digital computer to be handled in the manner of a digital book device. In this arrangement, for example, a slide pad or a roller ball and possibly also keys can be operated on the side of the housing of the notebook 100 facing away from the user.

FIG. 23 & FIG. 24 show a development of an input device 100 according to the invention, which is assembled of two parts 110a, 110b and in which the first part 110a and the second part 110b are connected to one another pivotably by a spherical hinge device 2301. FIG. 23 shows the input device 110 in the closed state whilst FIG. 24 shows the input device in the opened state. FIG. 23 shows in the right-hand part of the Figure a diagrammatic representation of the mechanical configurations possible due to the spherical hinge 2301.

Figure 25:
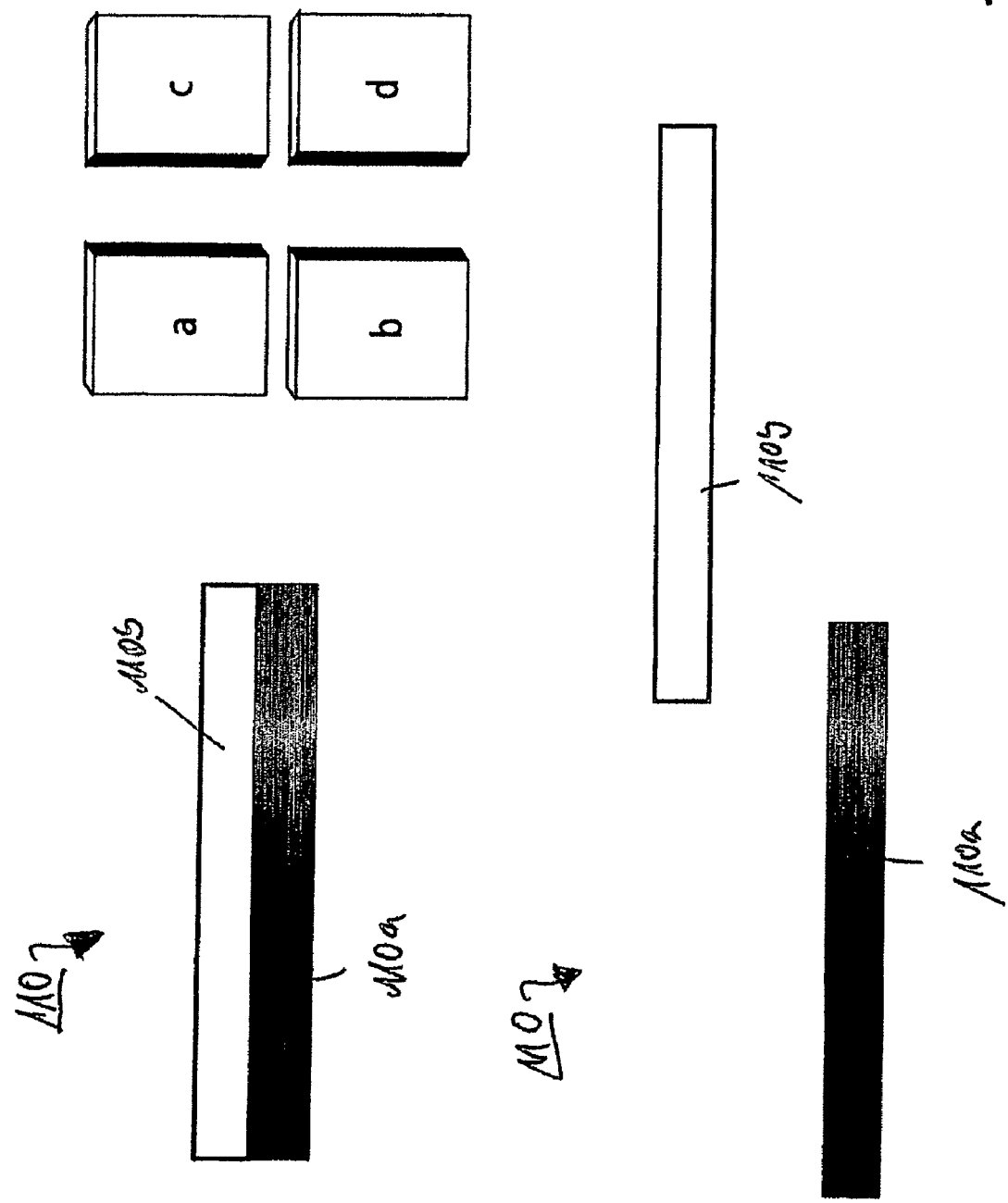
FIG. 25 shows another development of an input device according to the invention assembled from two parts.

FIG. 25 shows another development of an input device 110 according to the invention, assembled from two parts, in which the first part 110a and the second part 110b are not connected to one another via a hinge but are only loosely placed on top of one another. Other multi-part variants can also be provided. In the right-hand part of FIG. 25, the mechanical configurations (orientations of the first part 110a/the second part 110b) which can be achieved as a result, are shown diagrammatically.

Figure 26:
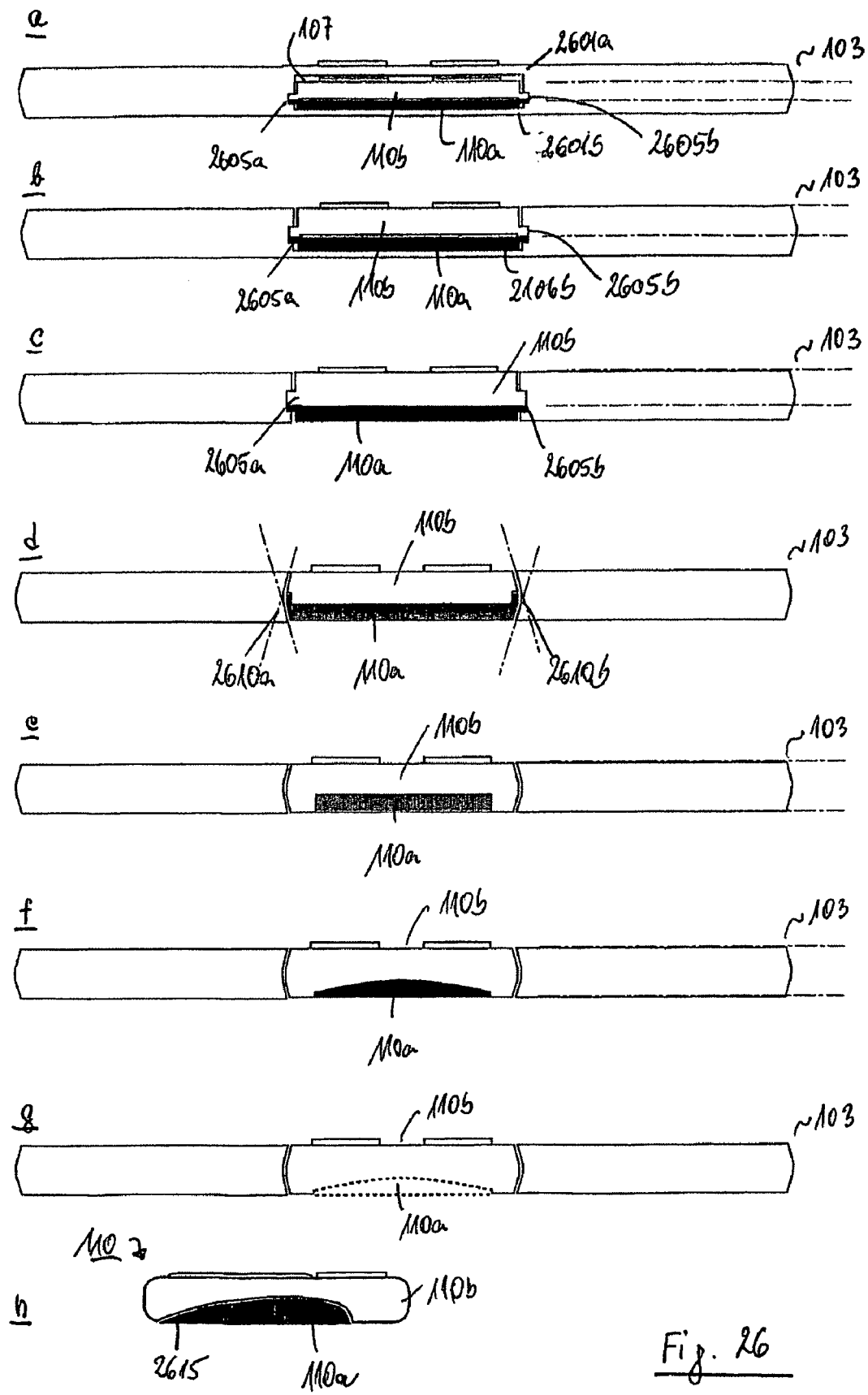
FIGS. 26a-26h diagrammatically show an overview of various variants of the integration of the input device into the keyboard part of a notebook.

FIG. 26 diagrammatically shows an overview of various variants of the integration of the input device 110 in the keyboard part 103 of a notebook 100. FIG. 26a shows a configuration in which the input device 110 is inserted into a coupling bay 107 which is closed off in the manner of a well both to the top and to the bottom by a cover plate 2601a and 2601b, respectively. The input device 110 is held by a tongue/groove holder 2605a, 2605b in the coupling bay 107 in the keyboard part 103 of the notebook 100. The top cover plate 2601a covers the operating elements on the top of the input device 110 so that they cannot be used. It is therefore necessary to provide a further set of operating elements on the top of the cover plate 2601a. However, the useful constructional height for the input device 110 is considerably reduced by the thickness of the cover plates 2601a, 2601b and the space needed by the additional electronic component. A modification of the arrangement shown in FIG. 26a consists in displacing the well 107 laterally (not shown) so that the second set of operating elements no longer reduces the maximum constructional height of the input device 110. In this case, too, however, two sets of operating elements are needed.

In FIG. 26b, the well is opened towards the top by leading off the top cover plate 2601a. This enlarges the maximum construction height of the input device 110 and a second set of operating elements is no longer required. The input device 110 is held by a tongue/groove holder 2605a, 2605b in the coupling bay 107 in the keyboard part 103 of the notebook 100.

In FIG. 26c, the bottom cover plate 2601b has also been left off as a result of which the maximum constructional height of the input device 110 is enlarged further. The input device 10 is held by a tongue/groove holder 2605a, 2605b in the coupling bay 107 in the keyboard part 103 of the notebook 100.

In FIG. 26d, the tongue/groove holder 2605a, 2605b is replaced by an ergonomically more advantageous outward-arching/inward-arching 2610a, 2610b.

In FIG. 26a, the first part of the input device 110 is no longer constructed as shell-like construction as in FIGS. 26a to 26d which accommodates the second part of the input device 110. Instead, the first part 110a of the input device 110 is constructed as an elongated part extending from the front end of the coupling bay 107 perpendicularly forward to the user (not shown), onto which the second part 110b is placed pulled over laterally on the left and on the right.

In FIG. 26f, a modification of the arrangement shown in FIG. 26e is shown, the first part 110a of the input device 110 being convexly arched outward towards the top.

In FIG. 26g, a modification of the arrangement shown in FIG. 26f is shown, the first part 110a of the input device 110 being convexly arched outward towards the top but extending flat on the front facing the user (not shown) so that the user essentially only sees the second part 110b of the input device when the input device 110 is pushed into the coupling bay 107.

FIG. 26h shows a diagrammatic sectional drawing through the input device 110 in FIG. 26g perpendicularly to the plane of section of FIG. 26g. The side 2615 extending flatly of the first part of the input device 110 can be seen.

Figure 27:
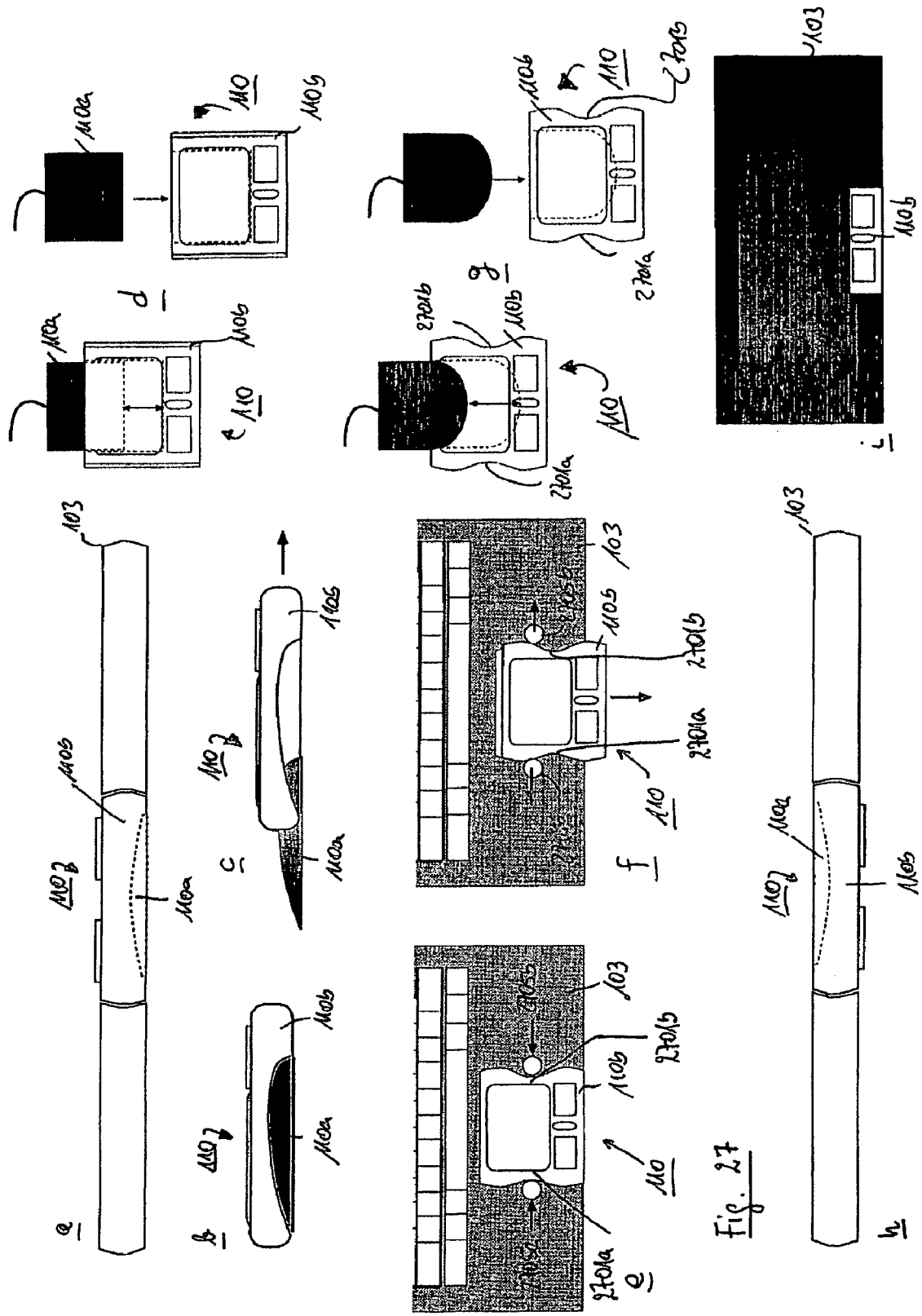
FIGS. 27a-27i diagrammatically show an overview of other variants of the embodiment of the housing form of the input device and of the integration of the input device into the keyboard part of a notebook.

FIG. 27 diagrammatically shows an overview of further variants of the embodiment of the housing form of the input device 110 and of the integration of the input device 110 into the keyboard part 103 of a notebook 100. FIG. 27a corresponds to FIG. 26g. FIG. 27b corresponds to FIG. 26h. FIG. 26c diagrammatically illustrates the process of removing the second part 110b of the input device 110 from the first part 110a by an essentially horizontal pushing movement in the direction of the arrow. Replacement correspondingly occurs in the reverse direction of the arrow. Due to the special arching of the two parts 110a, 110b of the input device, an ergonomically advantageous secure positioning of both parts 110a, 110b with respect to one another by the user (not shown) is made possible. FIG. 27d shows the process of pushing the input device 110 into the coupling bay 107 according to FIG. 27c diagrammatically from the top. FIG.

27e shows a further variant in which the external shape of the second part 110b is ergonomically advantageously improved by a left-hand and right-hand, respectively, grip a indentation 2701a, 2701b. Two gripping fingers 2705a, 2705b, mechanically pretensioned, for example, by springs (not shown) can be advantageously provided in order to reliably fix the input device 110 in the keyboard leaf 103 of the notebook 100 in the pushed-in state. FIG. 27f shows the arrangement shown in FIG. 27g when the input device 110 is pulled out. FIG. 27g shows the process of pushing-in/pulling-out shown in FIGS. 27e and 27f diagrammatically from the top.

FIG. 27h shows the arrangement shown in FIG. 27a with the input device 110 rotated; compare FIG. 22 and the associated description. FIG. 27i shows a top view, belonging to FIG. 27h, of the underside of the keyboard leaf 103 of the notebook 100.

All solutions and aspects described above can be combined with one another and expressly relate to all exemplary embodiments shown or described, the respective solutions being applicable individually or in combination with other solutions to all devices and/or facilities mentioned in the patent specification.

What is claimed is:

1. A digital computer having at least one display for displaying information, comprising:
    a) a housing having at least one front surface, facing a user viewing the display, side edge faces and a rear surface opposite to the front surface,
    b) an input device having input means on at least one surface for at least one of inputting and manipulating information, the input device being an input module,
    c) a coupling bay which receives the input module so that it can be reached from at least two sides,
    the input module being movable from a position accessible at the front face of the computer with respect to the housing to a position in an oppositely facing orientation by removing the input module from the coupling bay and inserting it into the coupling bay in the oppositely facing orientation that enables the inputting or manipulating of information at the rear surface of the digital computer housing instead of at the front surface of the computer housing, and is electrically connected to the digital computer via at least one interface, said input device also being operable for inputting or manipulating of information in a decoupled state disengaged from the housing wherein at least one of the coupling bay and the input module is provided with at least one further interface for use with said oppositely facing orientation.

2. The digital computer as claimed in claim 1, wherein the input module is usable as an external mouse device when it is mechanically decoupled from the digital computer.

3. The digital computer as claimed in claim 1, wherein the input module is constructed as at least one of
    a special module having a joystick,
    a chip card receiving module,
    an adapter card module for network connections and other system expansion modules,
    a module for receiving and/or transmitting satellite signals,
    a telecommunication module,
    a position finding module (GPS, Galileo),
    a mobile radio telephone,
    a PDA,
    a remote control,
    a USB or FireWire interface module,
    a display module with pin and/or key input,
    a media player, and
    a laser pointer.

4. The digital computer as claimed in claim 1, wherein the at least one of inputting and manipulating of information by means of the input module comprises means for performing at least one of the functions from the following group of functions :
    inputting of relative location data for controlling a cursor on the display of the digital computer by a corresponding movement of a hand or of at least one finger of a hand of a user,
    inserting of menus and selection information,
    paging,
    scrolling
    switching into another operating mode,
    setting up at least one of device and software characteristics,
    providing information on the display,
    selecting information on the display,
    at least one of selecting and marking information displayed on the display,
    moving information displayed on the display,
    confirming marked information or information input,
    inputting PIN or password information,
    switching the digital computer on and off,
    switching the screen on and off,
    activating and deactivating of a pen input mode, and
    activating and deactivating of an energy saving mode.

5. The digital computer as claimed in claim 1, wherein the input module, as operating element, has at least one of a slide pad, a key, a jog dial, a rollerball, a capacitive sensor, a pressure-sensitive screen, a multifunction key, a 4-WAY rocker key and other keys.

6. The digital computer as claimed in claim 1, wherein at least one of the input module and the digital computer is configured by means of a relative movement of the input module which is movable with respect to the housing.

7. The digital computer as claimed in claim 1 wherein the positions between which the input manual is movable are rotated with respect to each other about a vertical or a horizontal axis.

8. The digital computer as claimed in claim 6, wherein the input module is pivotable about a pivot axis which is located parallel to the input surface for producing the relative movement for configuring.

9. The digital computer as claimed in claim 1, wherein the input module has input means on at least two sides for operating thereof from at least two sides in the coupled state in the coupling bay.

10. The digital computer as claimed in claim 1, wherein the digital computer and the input module have a plurality of input means which are operatable in combination for inputting.

11. The digital computer as claimed in claim 1, wherein the operating mode of at least one of the input means and of the display are settable in dependence on at least one of the configuration of the input device and the device attitude or position.

12. The digital computer as claimed in claim 1, wherein the input module has its own battery which, in the inserted state, is chargable via the mobile digital computer.

13. The digital computer as claimed in claim 1, wherein means for establishing an effective coupling between the digital computer and the input module for data transmission by at least one of a radio signal, an infrared signal and in wire-connected manner is provided.

14. The digital computer as claimed in claim 1, wherein at least one interface of the input module provides both for power supply and data traffic.

15. The digital computer as claimed in claim 1, wherein the input module has means for switching, when mechanically decoupled, to a wireless data connection and remains effective as external input module.

16. A digital computer having at least one display for displaying information, exhibiting, comprising:
   a) a housing having at least one front surface, facing a user viewing the display, side edge faces and a rear surface opposite to the front surface,
   b) wherein the digital computer is adapted to receive an input module detachably connected to the digital computer via at least one interface, the input module being provided with at least one input means which may be operated on the rear surface,
   c) wherein the digital computer has a coupling bay which detachably receives the input module so that it can be reached from at least two surfaces,
   wherein the input module may be removed from the coupling bay and turned with respect to the housing in a turning operation between a first position and a second position of two opposite positions such that input means of the input module are operable from the rear surface in said first position and may be operated from the front surface after the input module has been turned to said second position and reinserted into the coupling bay; and wherein said at least one interface comprises at least one of the coupling bay and the input module being provided with at least one interface for use with the first of said two opposite positions and another for use with the second of said two opposite positions.

17. The digital computer as claimed in claim 16, wherein the input module is turnable from the first position to the second position or vice versa while inside the housing of the digital computer.

18. The digital computer as claimed in claim 16, wherein the input module is usable as an external mouse device in a third position when it is mechanically decoupled from the digital computer.

19. The digital computer as claimed in claim 16, wherein the coupling bay is provided with the at least one interface for connecting the input module.

20. The digital computer as claimed in claim 16, wherein the coupling bay is provided with at least one additional interface for connecting further additional equipment with the digital computer rather than the input module.

21. The digital computer as claimed in claim 16, wherein at least one of the input module and the digital computer is configured by means of the turning operation.

22. The digital computer as claimed in claim 16, wherein the input module is constructed as at least one of
   a special module having a joystick,
   a chip card receiving module,
   an adapter card module for network connections and other system expansion modules,
   a module for receiving and/or transmitting satellite signals,
   a telecommunication module,
   a position finding module (GPS, Galileo),
   a mobile radio telephone,
   a PDA,
   a remote control,
   a USB or FireWire interface module,
   a display module with pin and/or key input,
   a media player, and
   a laser pointer.

23. The digital computer as claimed in claim 16, wherein the at least one of inputting and manipulating of information by means of the input module comprises means for performing at least one of the functions from the following group of functions:
   inputting of relative location data for controlling a cursor on the display of the digital computer by a corresponding movement of a hand or of at least one finger of a hand of a user,
   inserting of menus and selection information,
   paging,
   scrolling
   switching into another operating mode,
   setting up at least one of device and software characteristics,
   providing information on the display,
   selecting information on the display,
   at least one of selecting and marking information displayed on the display,
   moving information displayed on the display,
   confirming marked information or information input,
   inputting PIN or password information,
   switching the digital computer on and off,
   switching the screen on and off,
   activating and deactivating of a pen input mode, and
   activating and deactivating of an energy saving mode.

24. The digital computer as claimed in claim 16, wherein the input module, as operating element, has at least one of a slide pad, a key, a jog dial, a rollerball, a capacitive sensor, a pressure-sensitive screen, a multifunction key, a 4-WAY rocker key and other keys.

25. The digital computer as claimed in claim 16, wherein the digital computer and the input module have a plurality of input means which are operatable in combination for inputting.

26. The digital computer as claimed in claim 16, wherein the operating mode of at least one of the input means and of the display are settable in dependence on at least one of the configuration of the input module and the input module attitude or position.

27. The digital computer as claimed in claim 16, wherein the input module has its own battery which, in the connected state, is chargable via the mobile digital computer.

28. The digital computer as claimed in claim 16, wherein means for establishing an effective coupling between the digital computer and the input module for data transmission by at least one of a radio signal, an infrared signal and in wire-connected manner is provided.

29. The digital computer as claimed in claim 16, wherein at least one interface of the input module provides both for power supply and data traffic.

30. The digital computer as claimed in claim 16, wherein the input module has means for switching, when mechanically decoupled, to a wireless data connection and remains effective as external input module.

31. The digital computer as claimed in claim 16, wherein at least one of the display and inputting means of the digital computer are blocked in an inoperative status when the input module is removed from the digital computer and brought into a certain distance apart from the digital computer.

32. The A digital computer as claimed in claim 16,
   wherein a plurality of input modules are provided for connection to the at least one interface of the digital computer, each input module being dedicated to a certain user and adapted to receive and store user specific access information for getting access to the digital computer or for getting access to specific information or programs stored in the digital computer.

* * * * *